United States Patent [19]

Sakata

[11] Patent Number: 5,528,361
[45] Date of Patent: Jun. 18, 1996

[54] IMAGE FORMING APPARATUS WITH INTERLEAVED PRINTING FROM PLURAL SOURCES

[75] Inventor: Seiji Sakata, Kawasaki, Japan

[73] Assignee: Ricoh Company, Ltd., Tokyo, Japan

[21] Appl. No.: 31,882

[22] Filed: Mar. 16, 1993

[30] Foreign Application Priority Data

| Mar. 19, 1992 | [JP] | Japan | 4-064155 |
| Mar. 19, 1992 | [JP] | Japan | 4-064156 |
| Feb. 3, 1993 | [JP] | Japan | 5-016268 |

[51] Int. Cl.$^6$ .................................................. H04N 1/21
[52] U.S. Cl. ................................................... 358/296
[58] Field of Search ................................ 358/400, 401, 358/468, 42, 296, 437, 442, 407; 395/114, 106, 112; 250/584

[56] References Cited

U.S. PATENT DOCUMENTS

| 4,789,782 | 12/1988 | Ohara | 250/584 |
| 4,935,955 | 6/1990 | Neudorfer | 358/407 |
| 4,998,213 | 3/1991 | Suzuki et al. | 395/112 |
| 5,065,254 | 11/1991 | Hishida | 358/400 |

FOREIGN PATENT DOCUMENTS

| 0410668 | 1/1991 | European Pat. Off. |
| 0465179 | 1/1992 | European Pat. Off. |
| 0473374 | 3/1992 | European Pat. Off. |

OTHER PUBLICATIONS

Patent Abstracts of Japan, vol. 12, No. 35 (E–579), Feb. 2, 1988, JP-A-62 189 878, Aug. 19, 1987.

Primary Examiner—Benjamin R. Fuller
Assistant Examiner—Raquel Yvette Gordon
Attorney, Agent, or Firm—Oblon, Spivak, McClelland, Maier & Neustadt

[57] ABSTRACT

An image forming apparatus capable of executing a plurality of functions at the same time to promote efficient use thereof. The apparatus includes reading means for reading a document, recording means for forming an image on a sheet, and an operating section for setting modes and displaying information. Control means causes the recording means to print simultaneously and continuously image data read by the reading means and a plurality of independent data written to a memory by a plurality of functions.

10 Claims, 60 Drawing Sheets

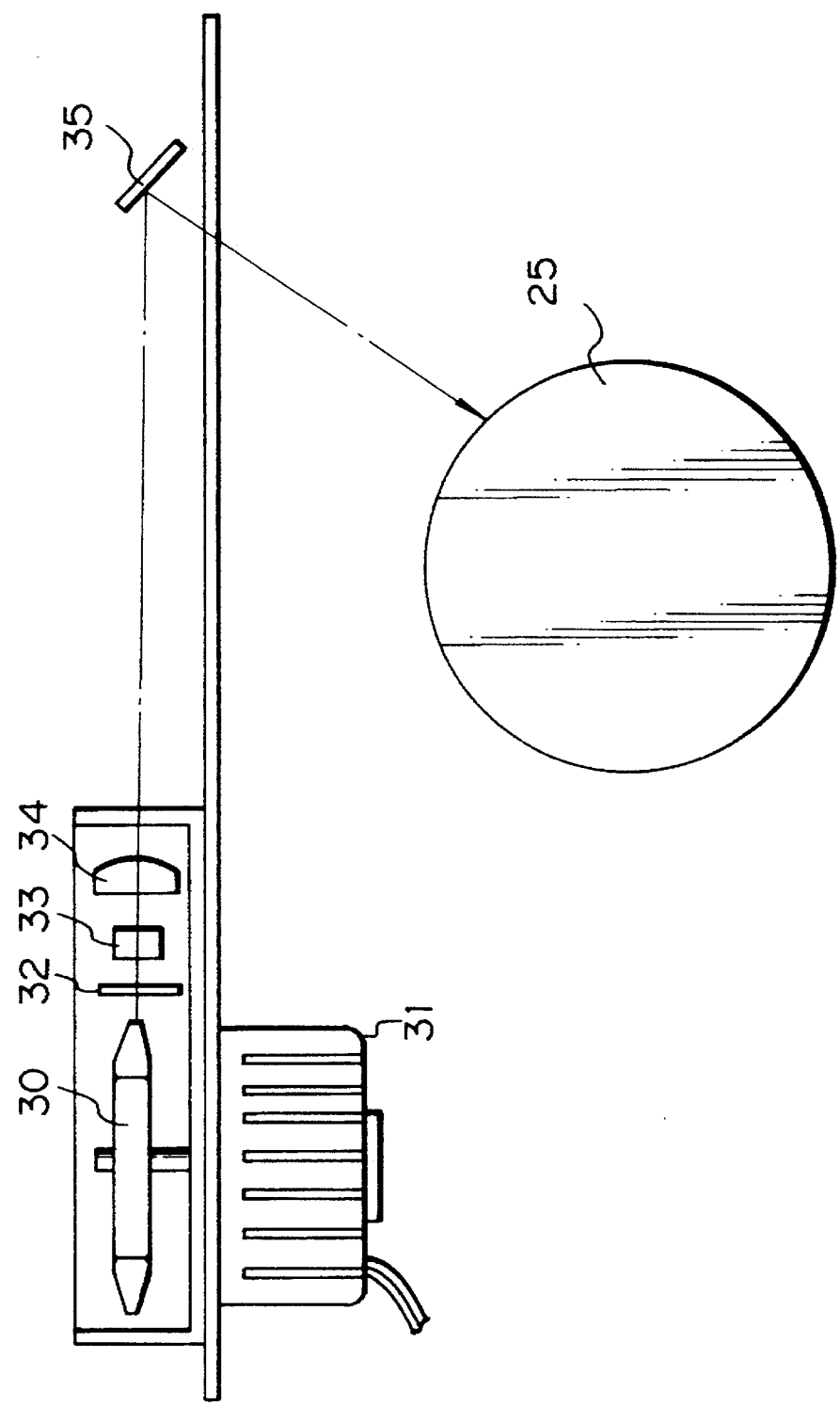

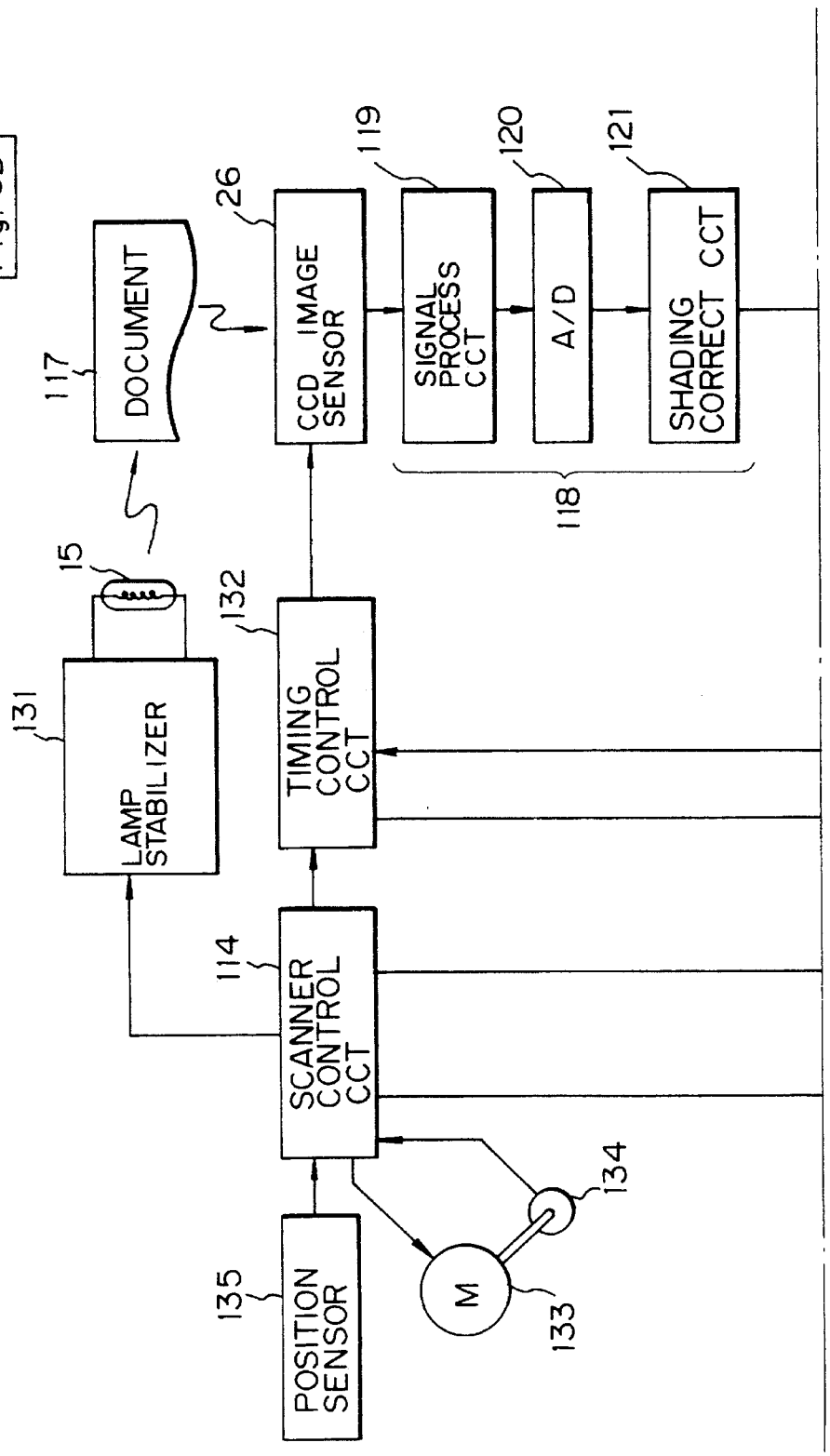

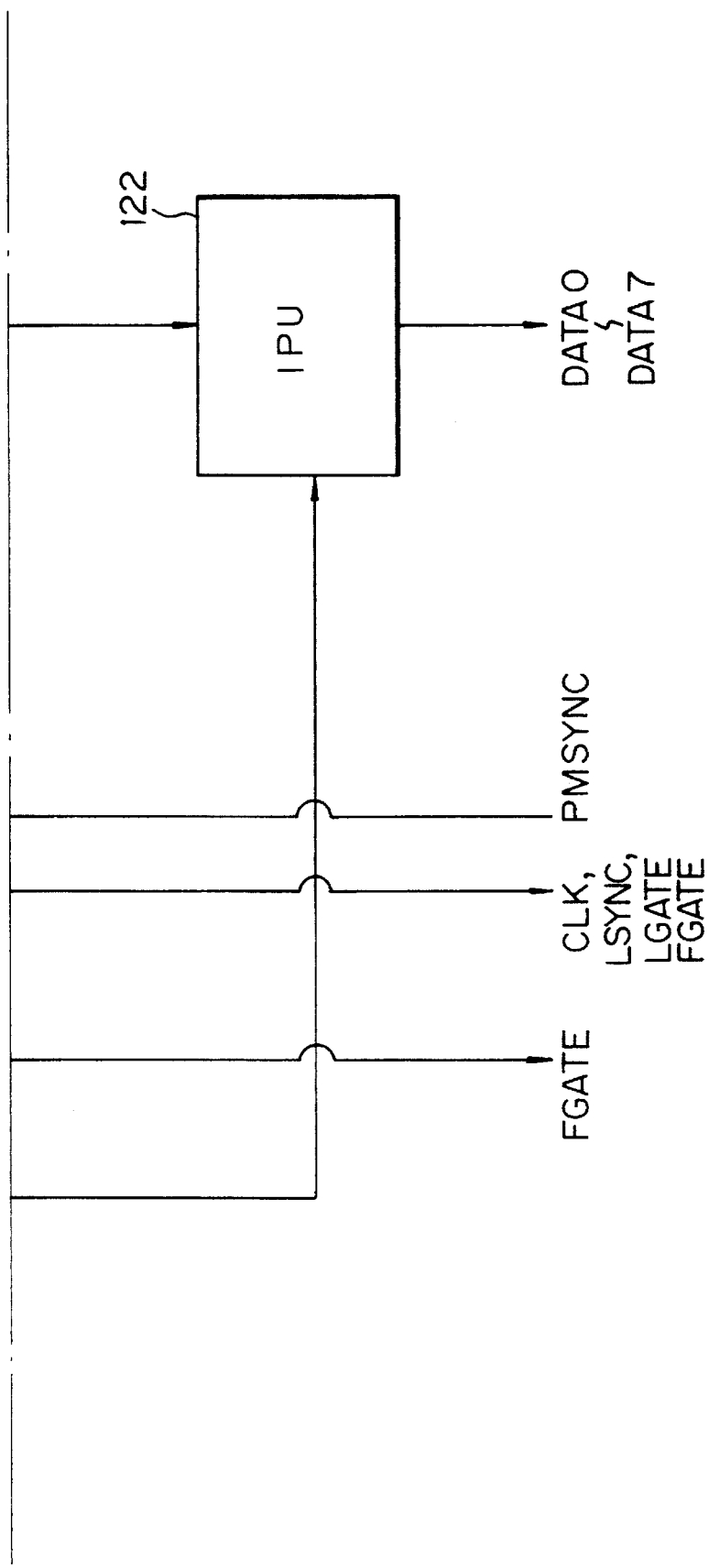

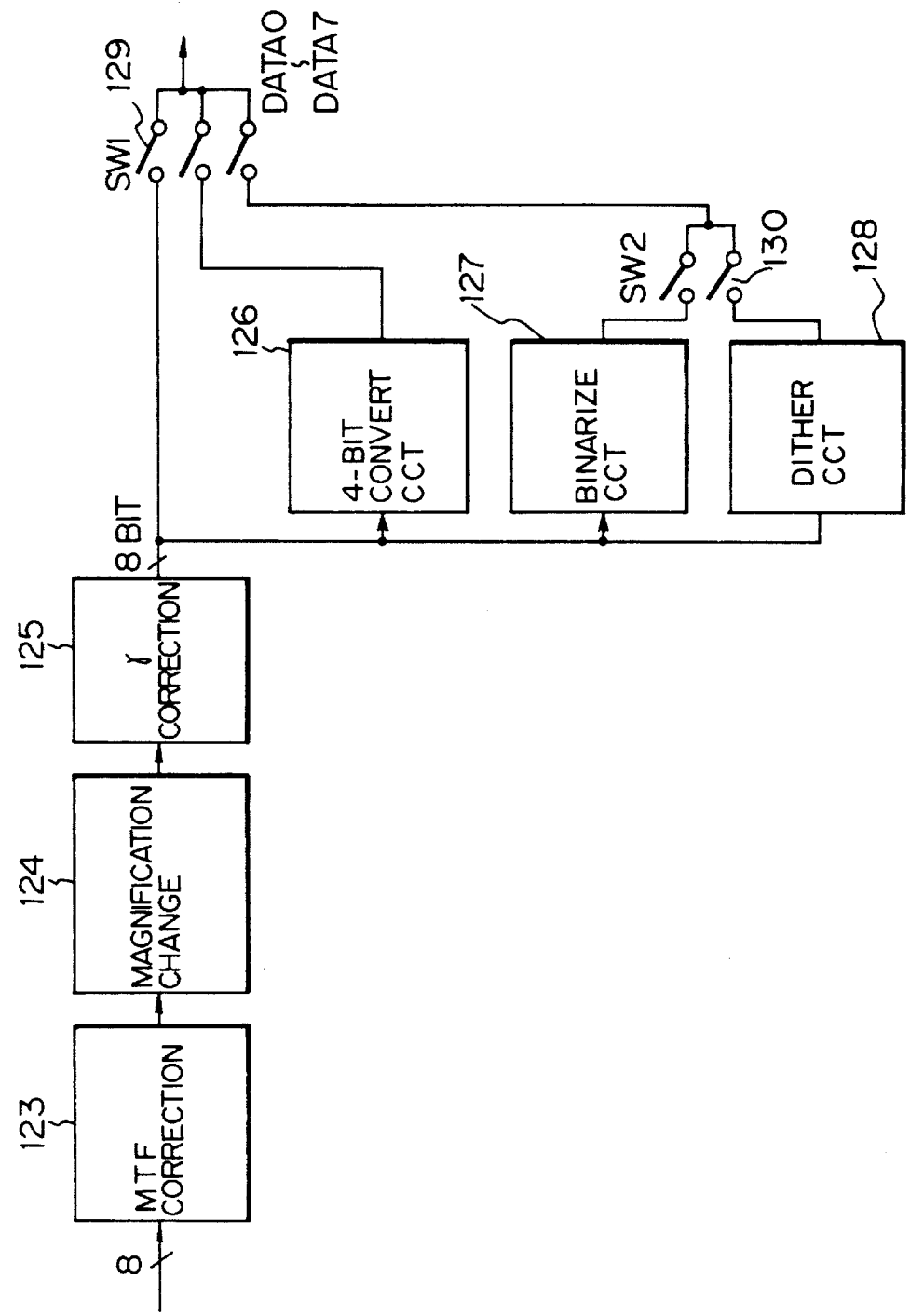

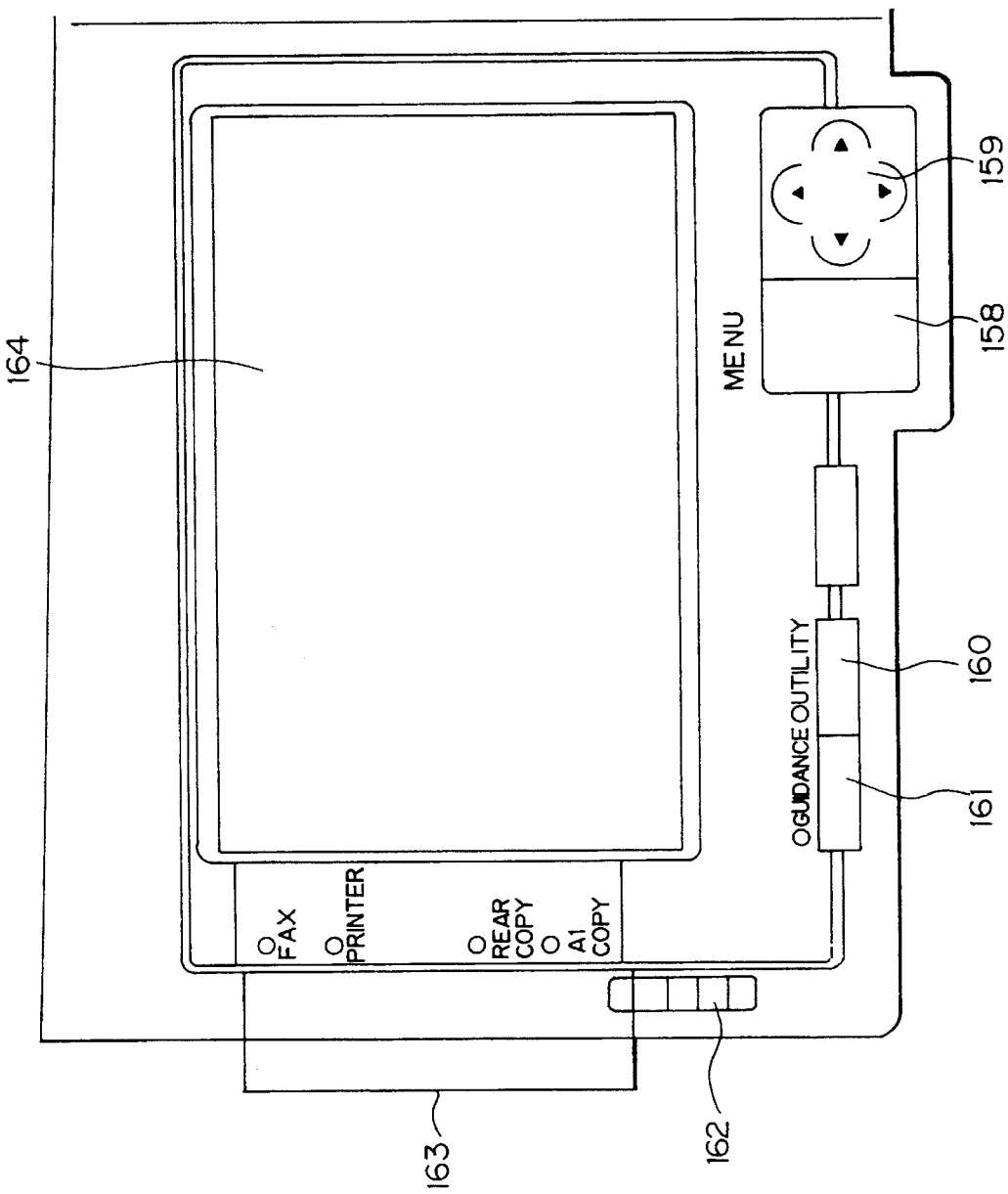

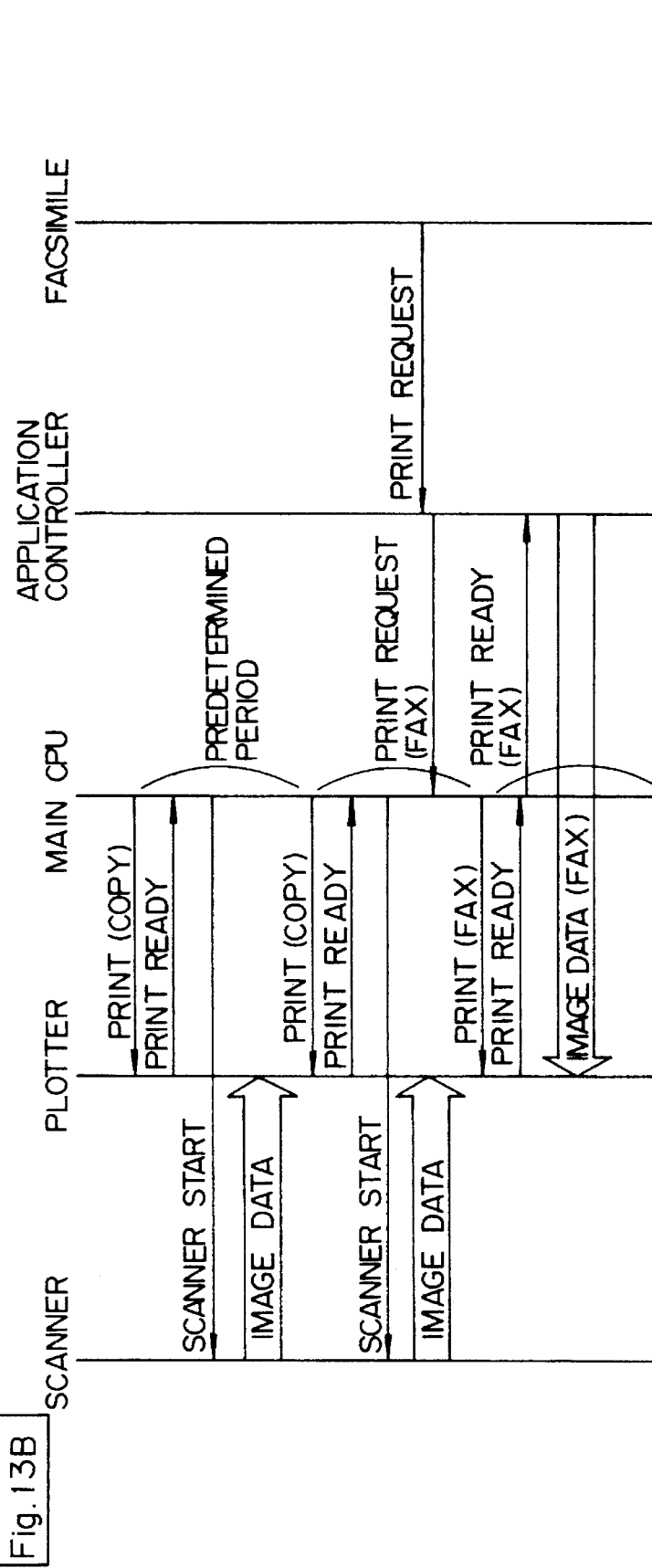

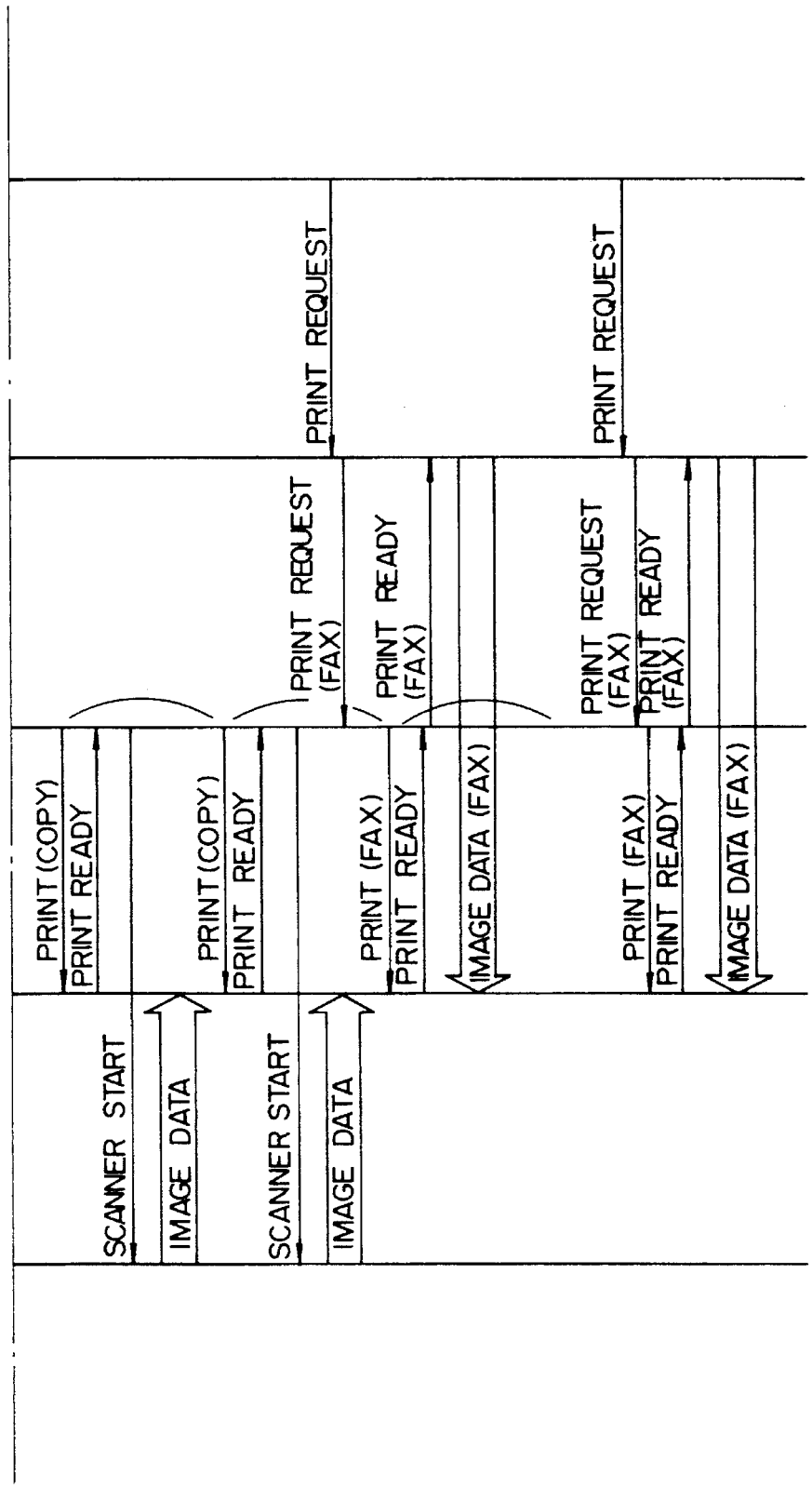

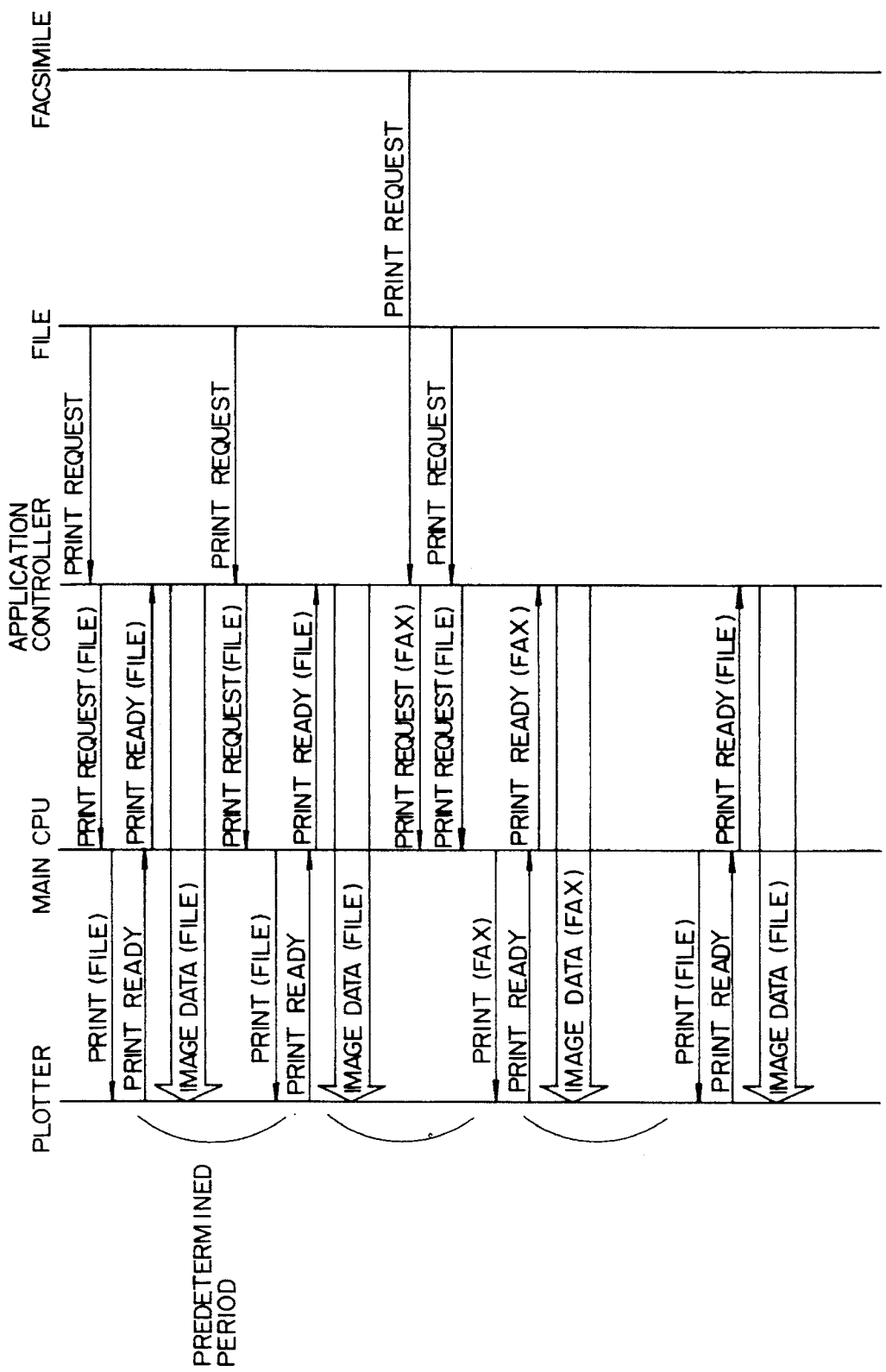

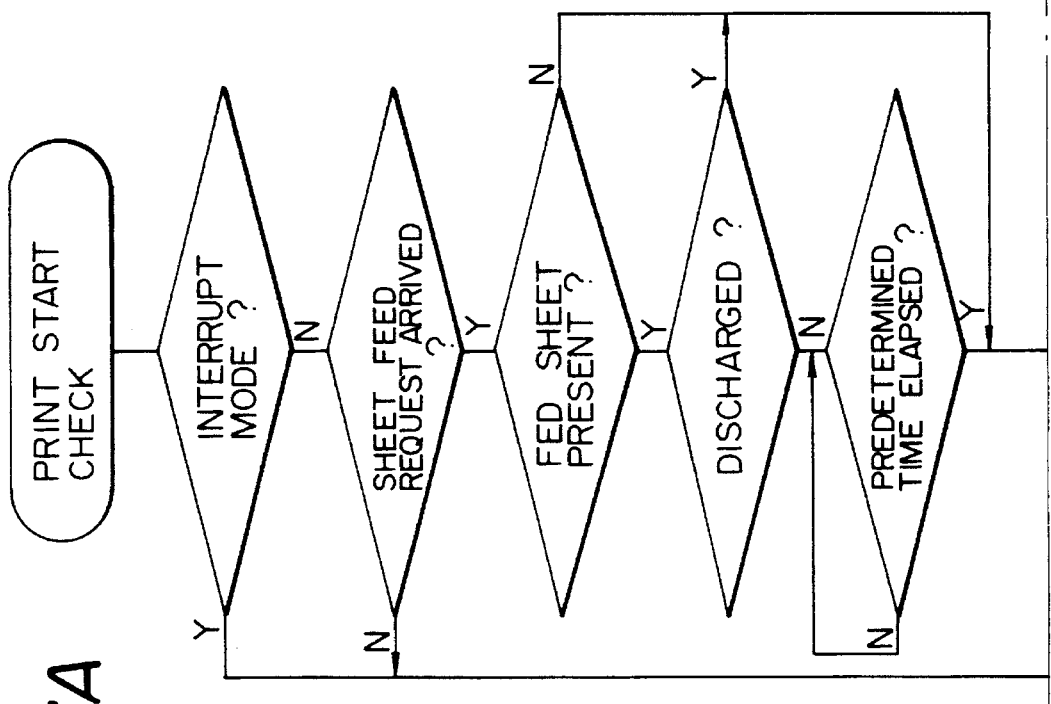

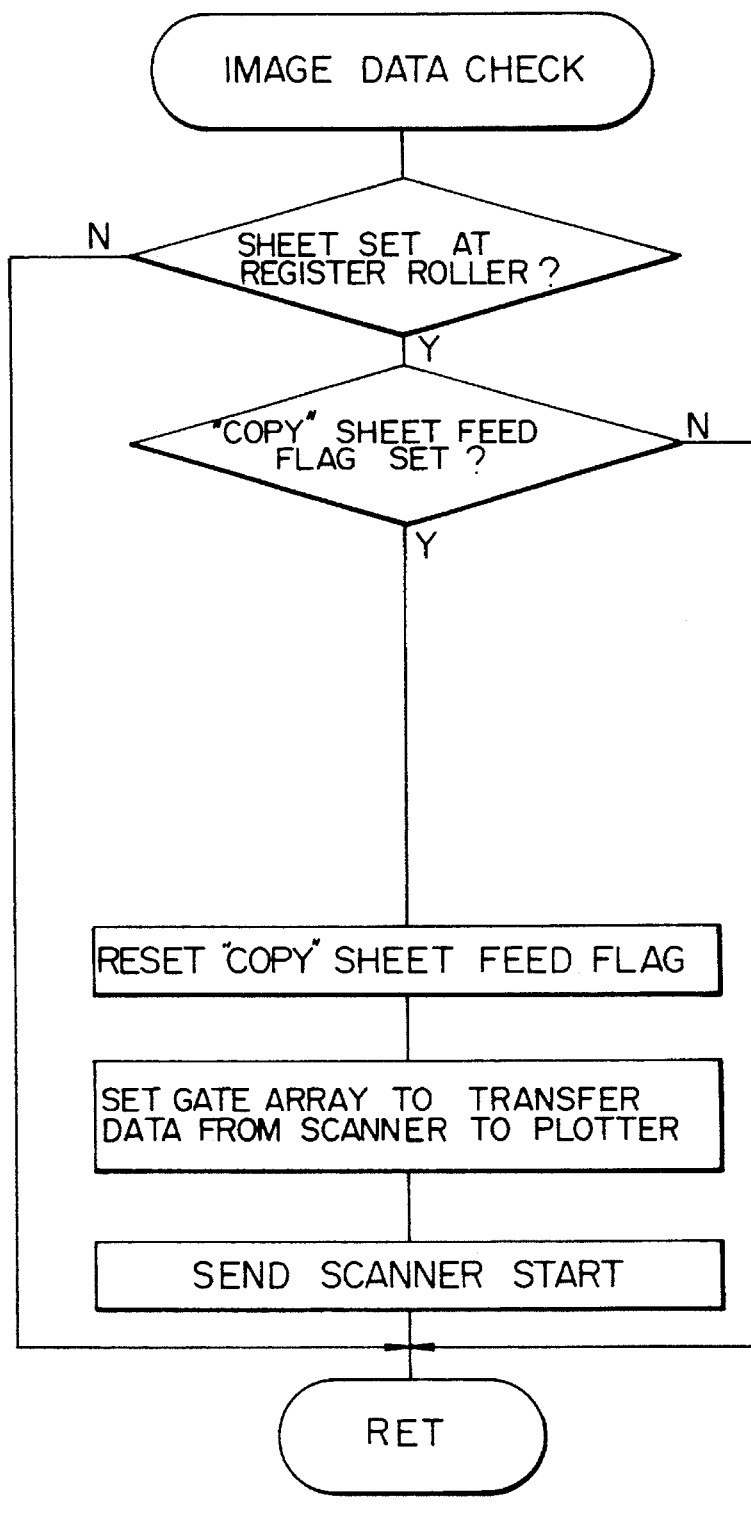

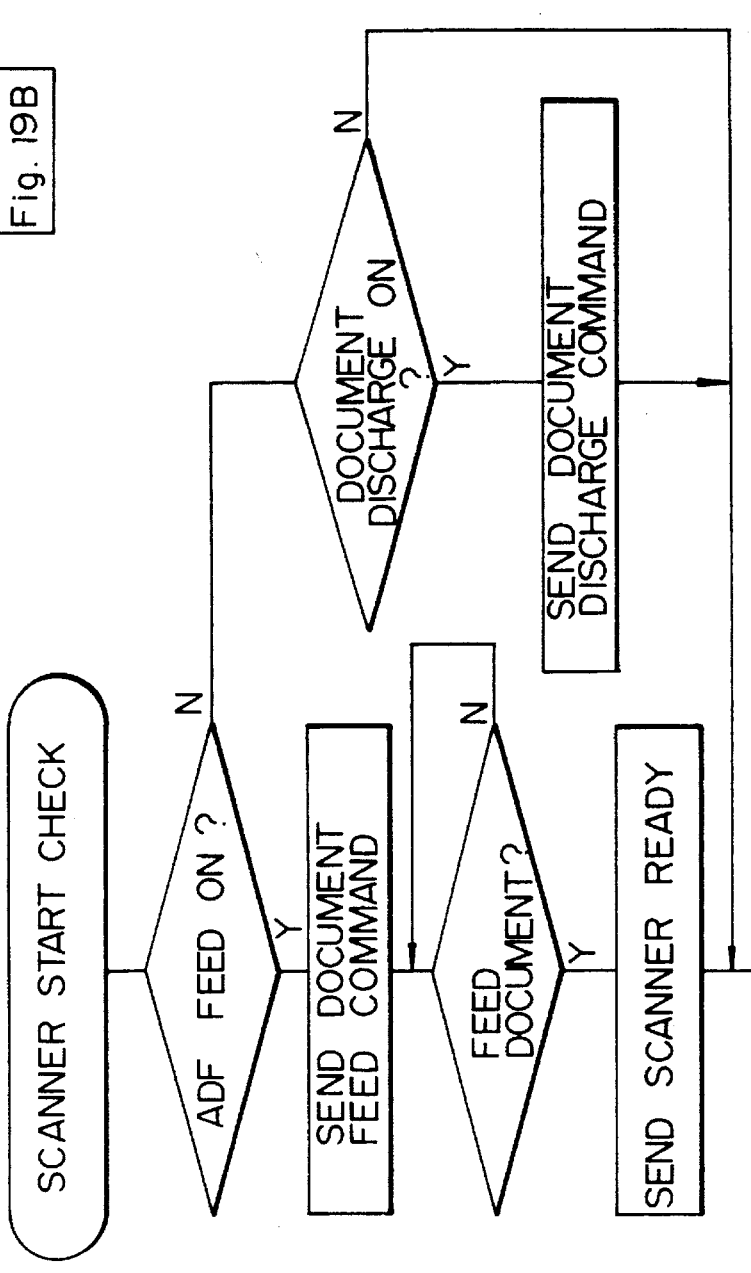

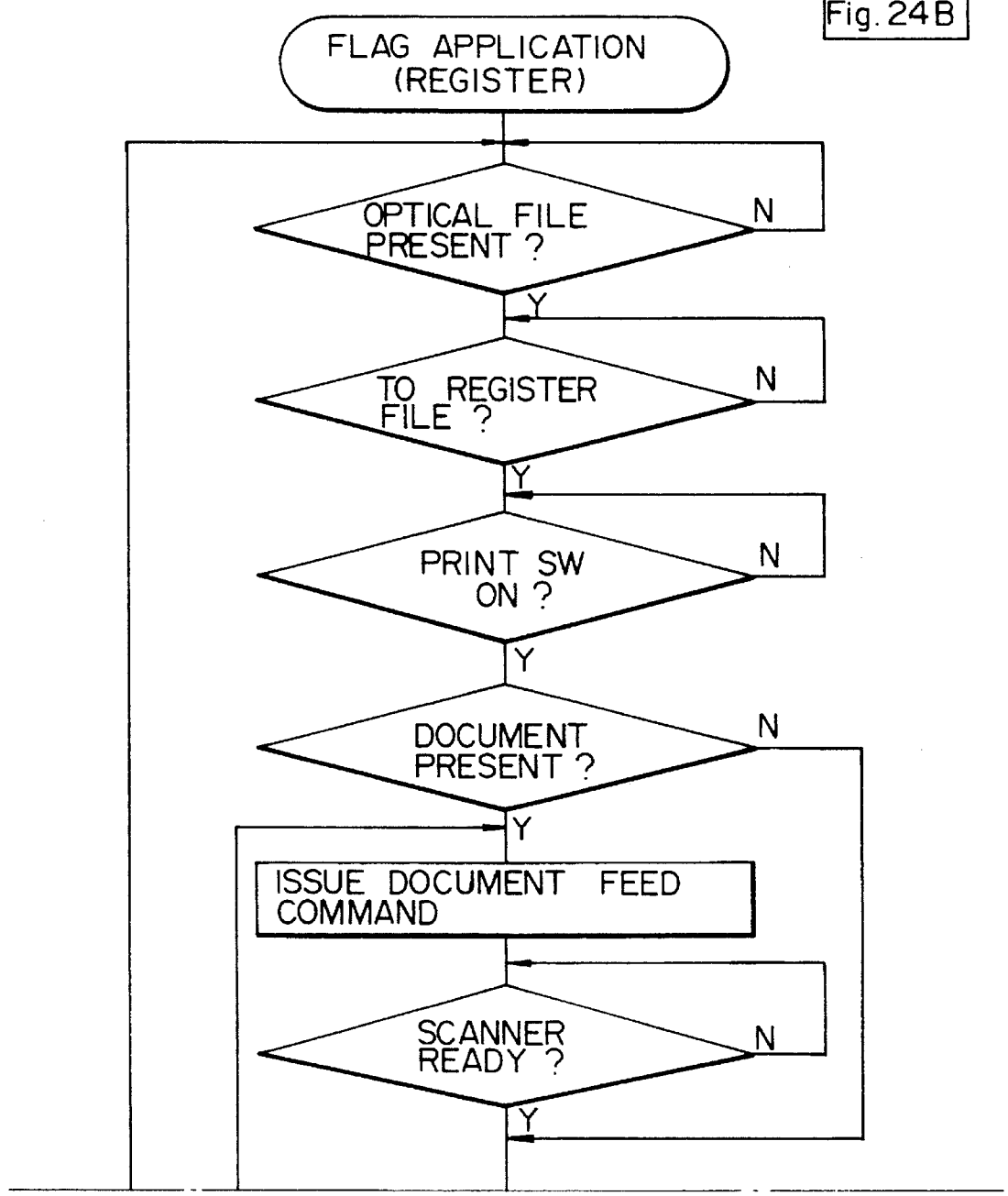

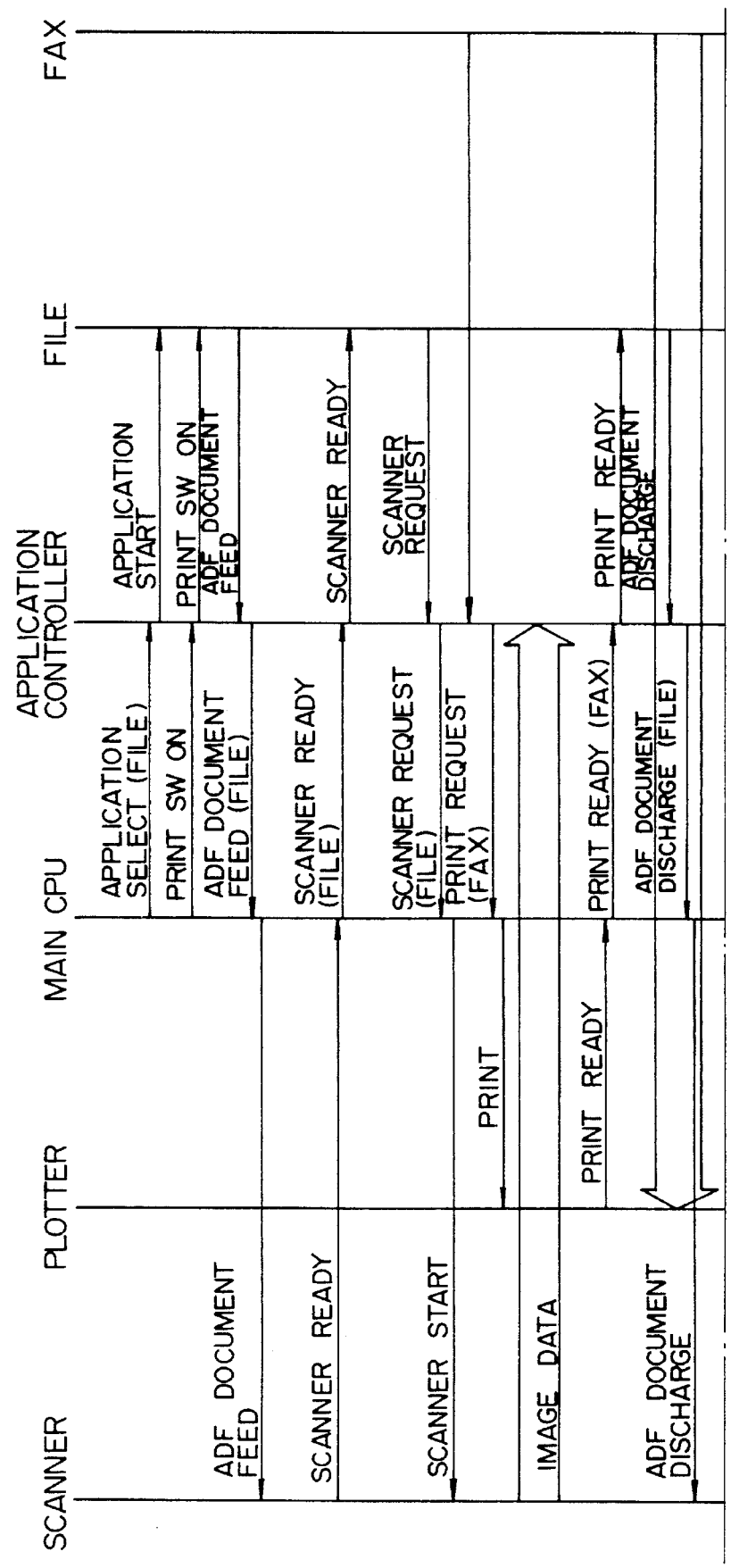

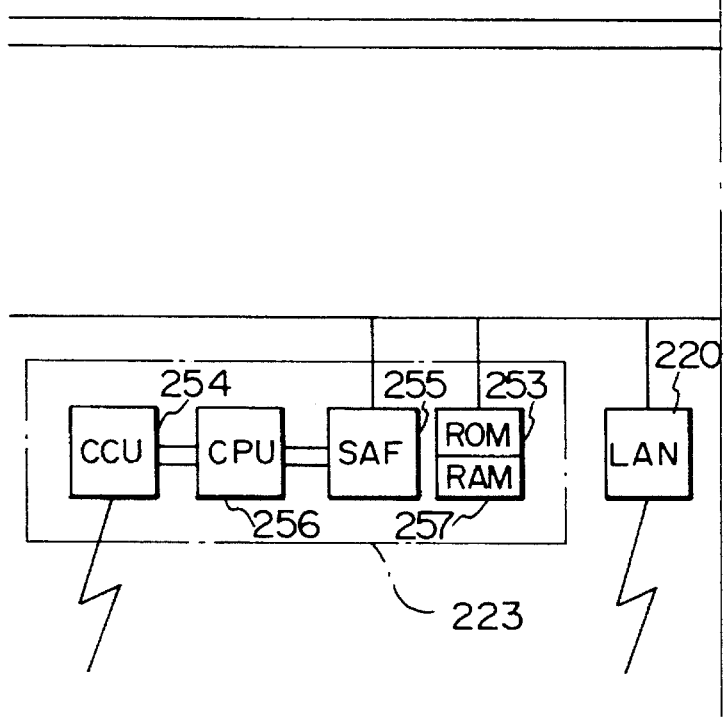

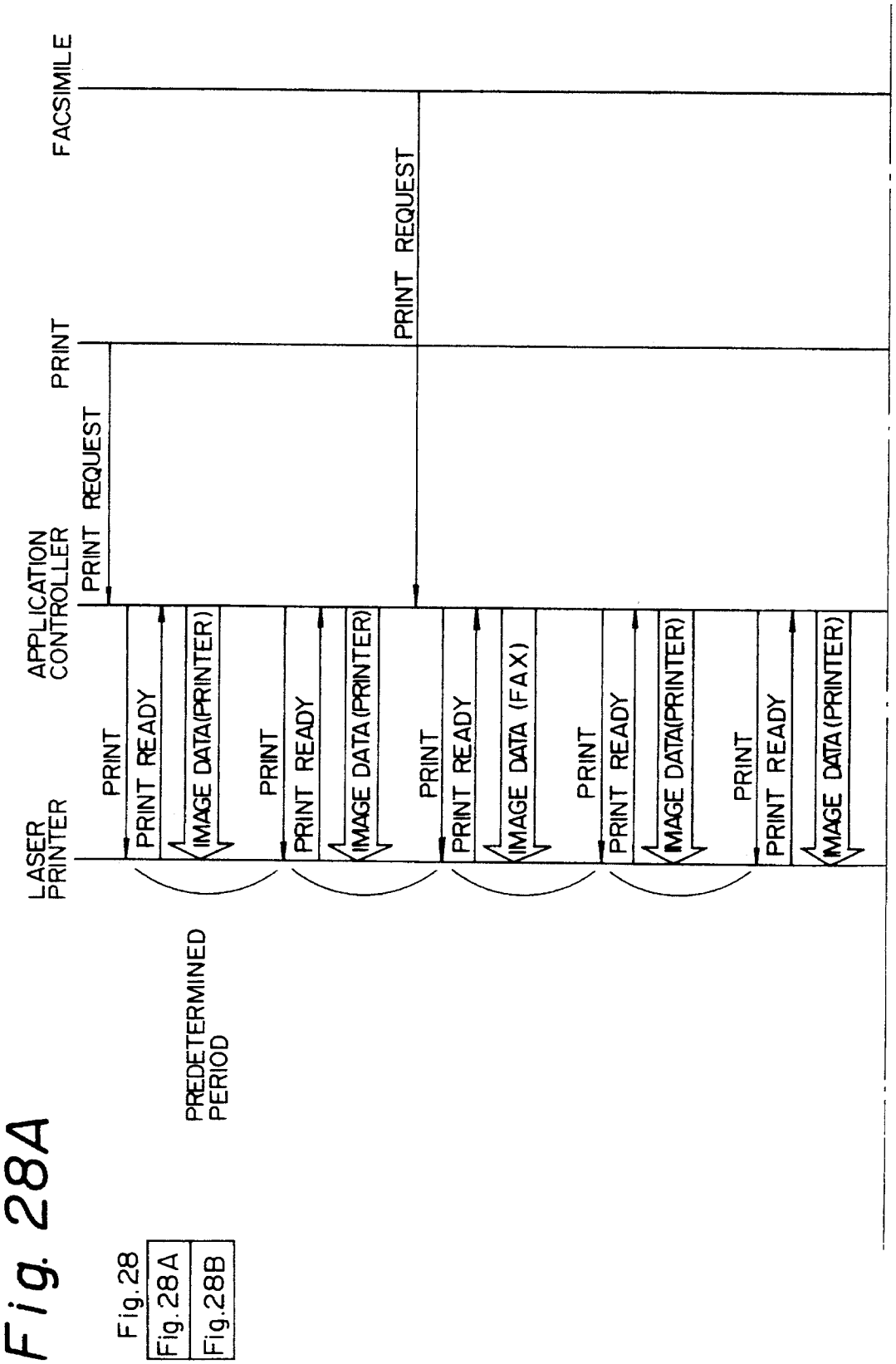

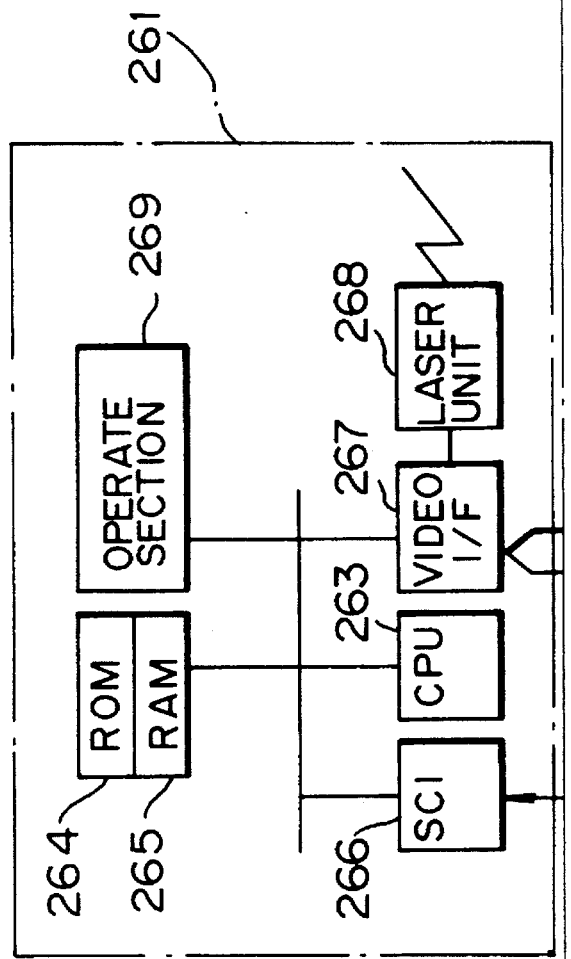

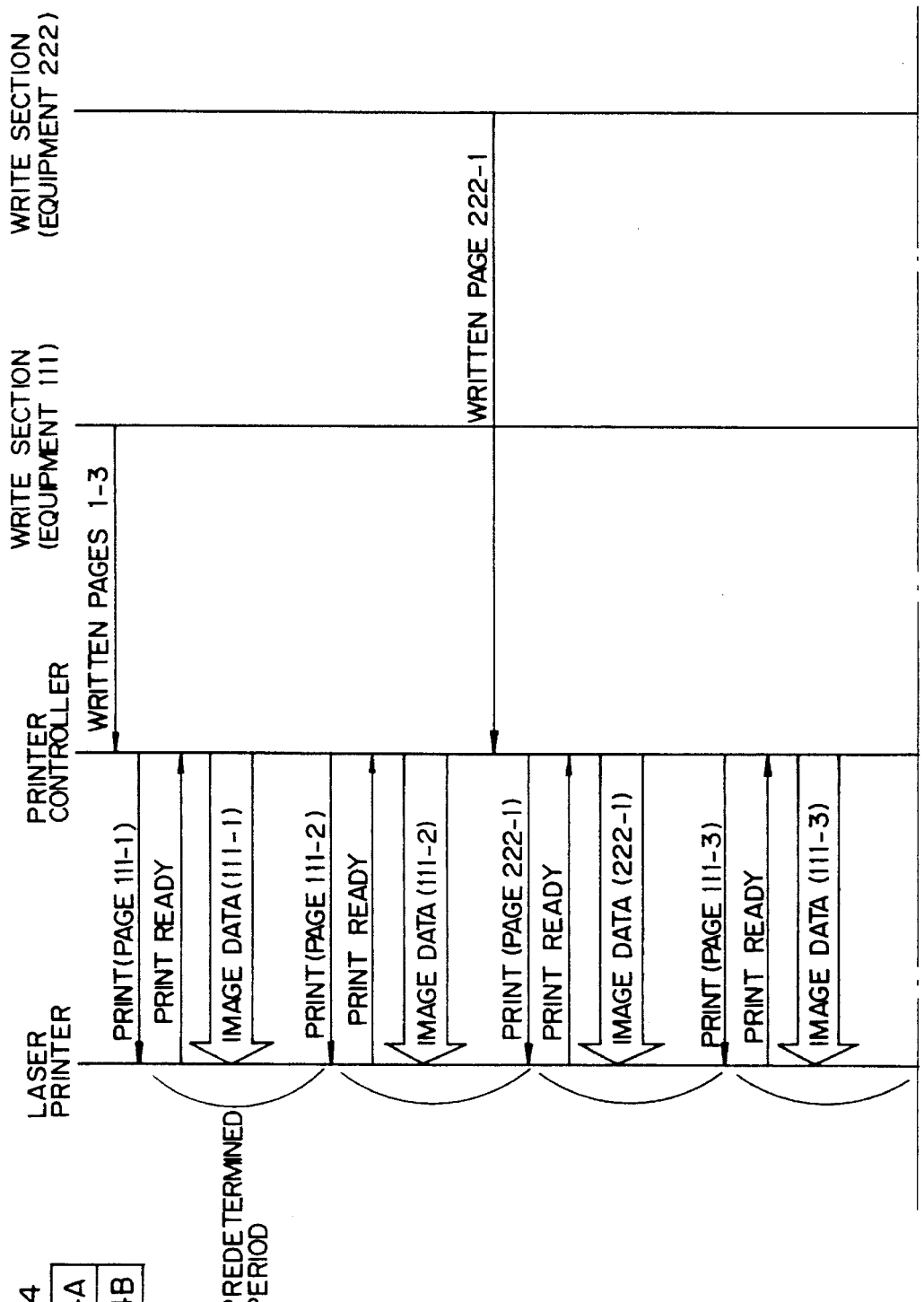

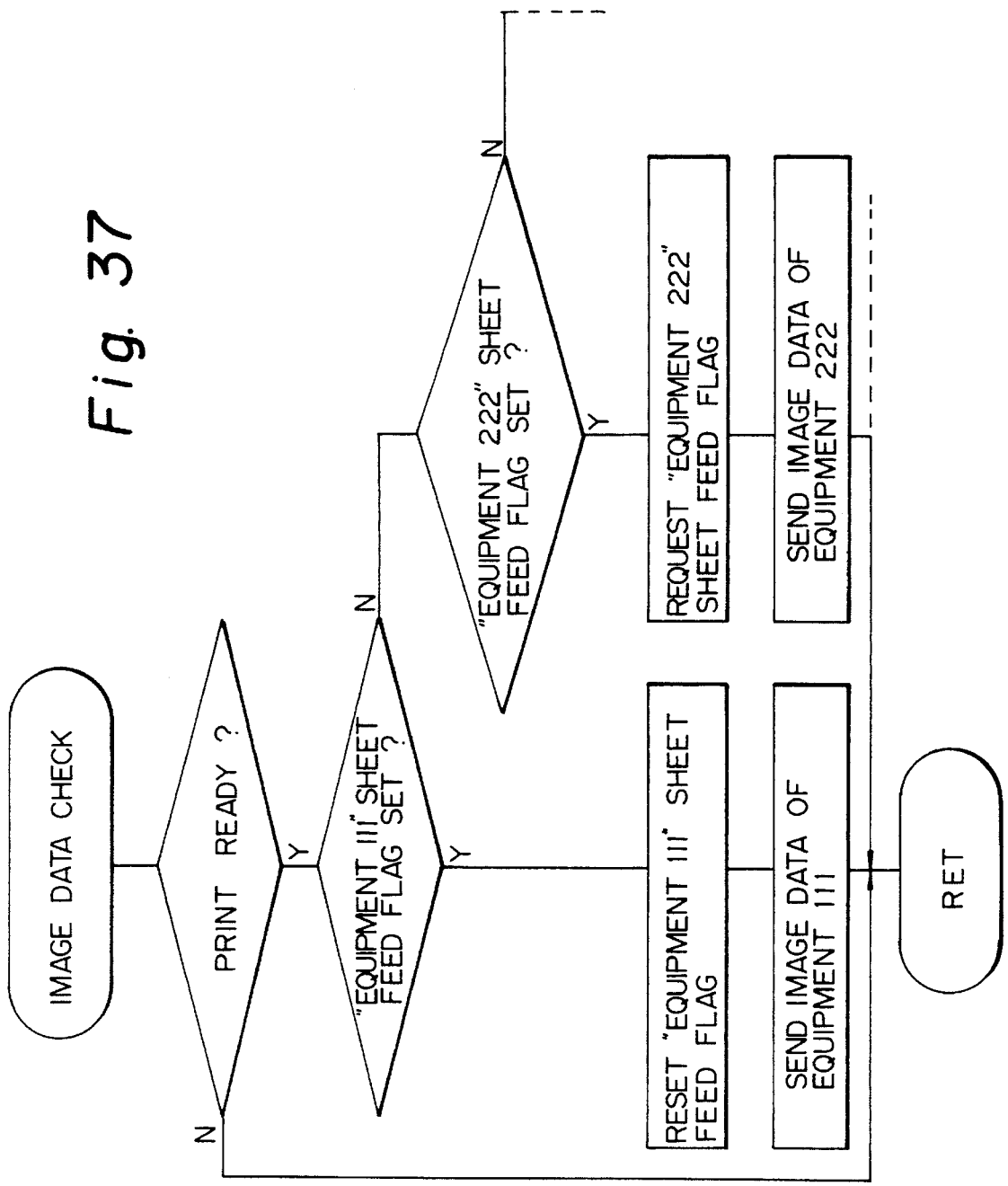

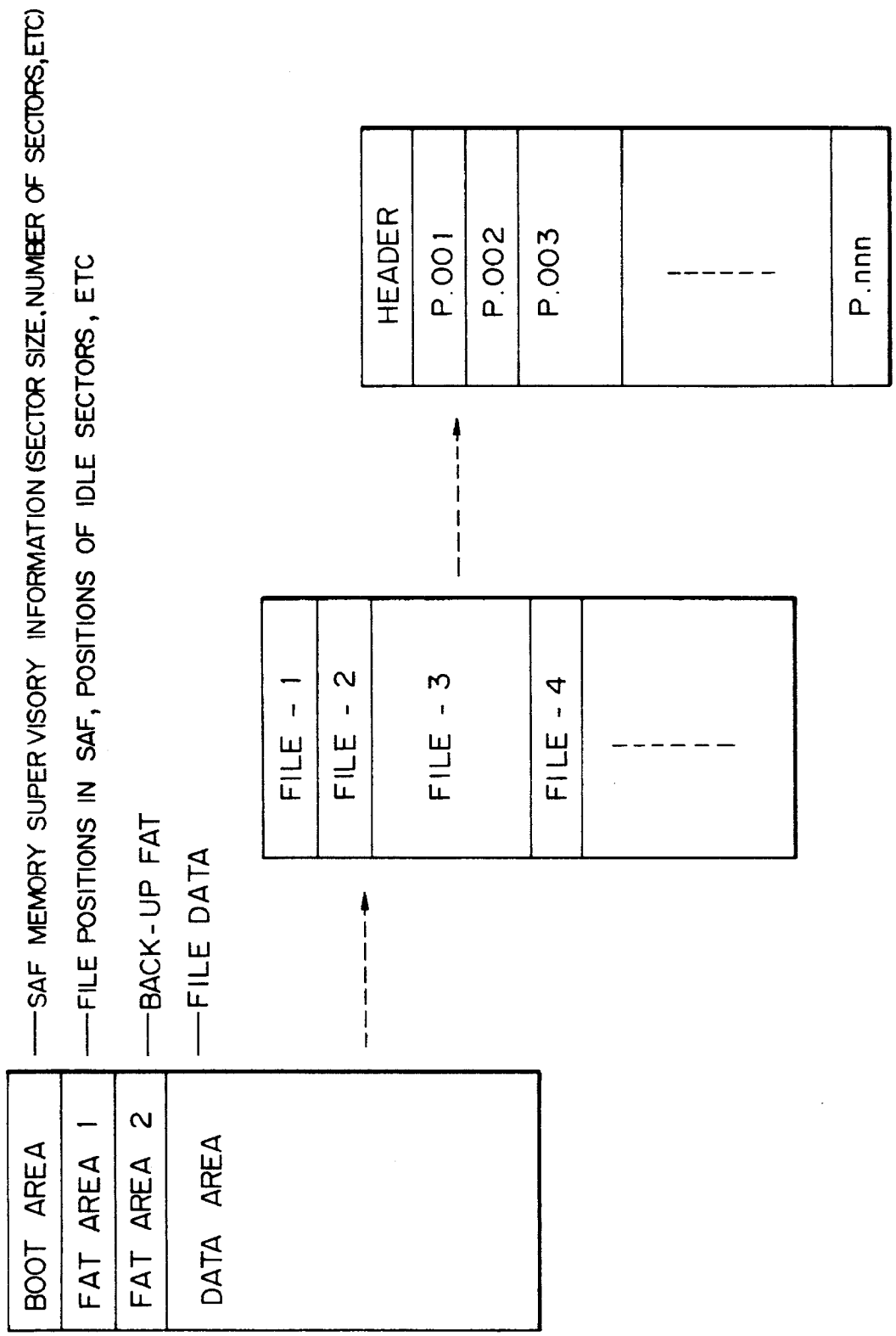

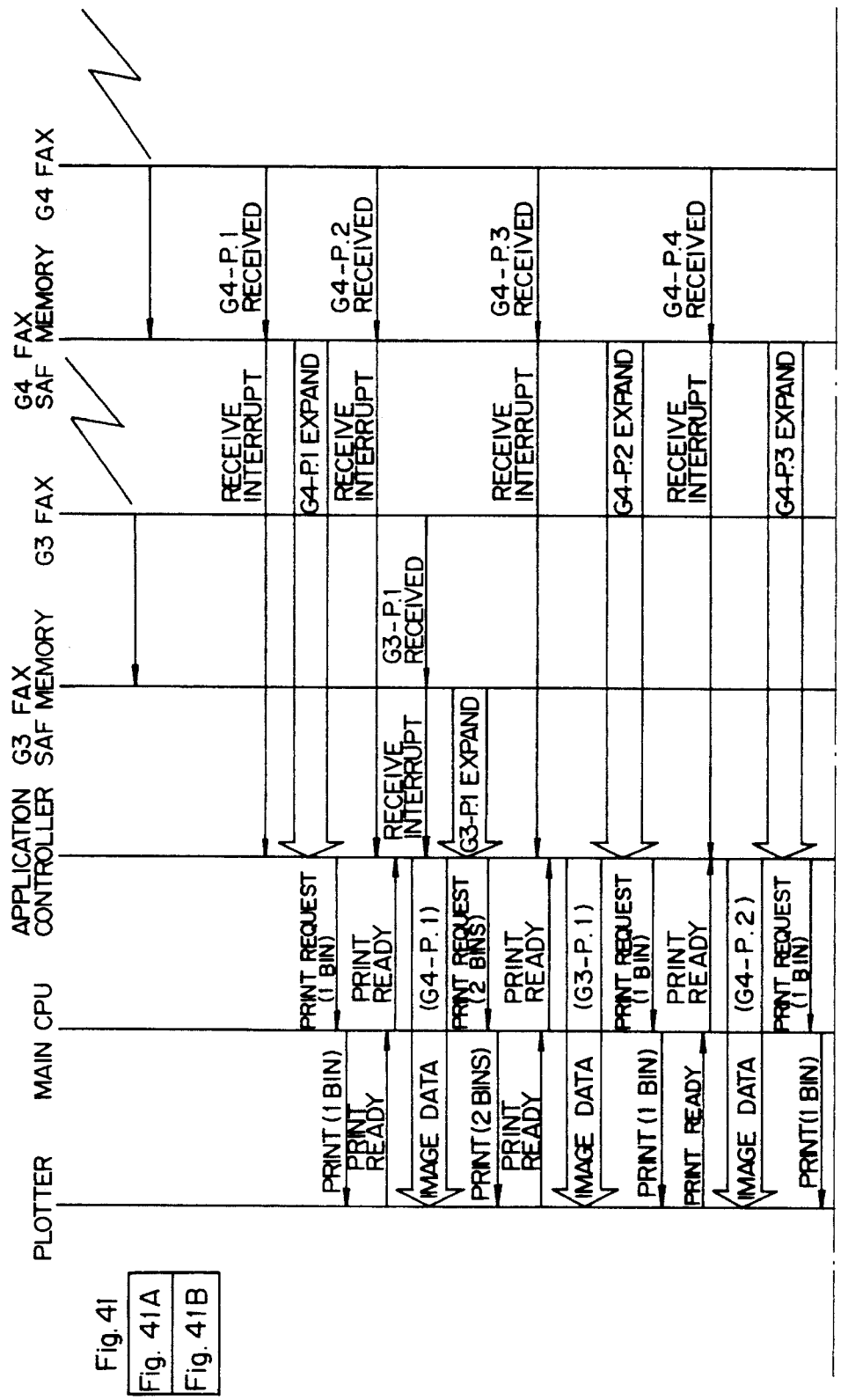

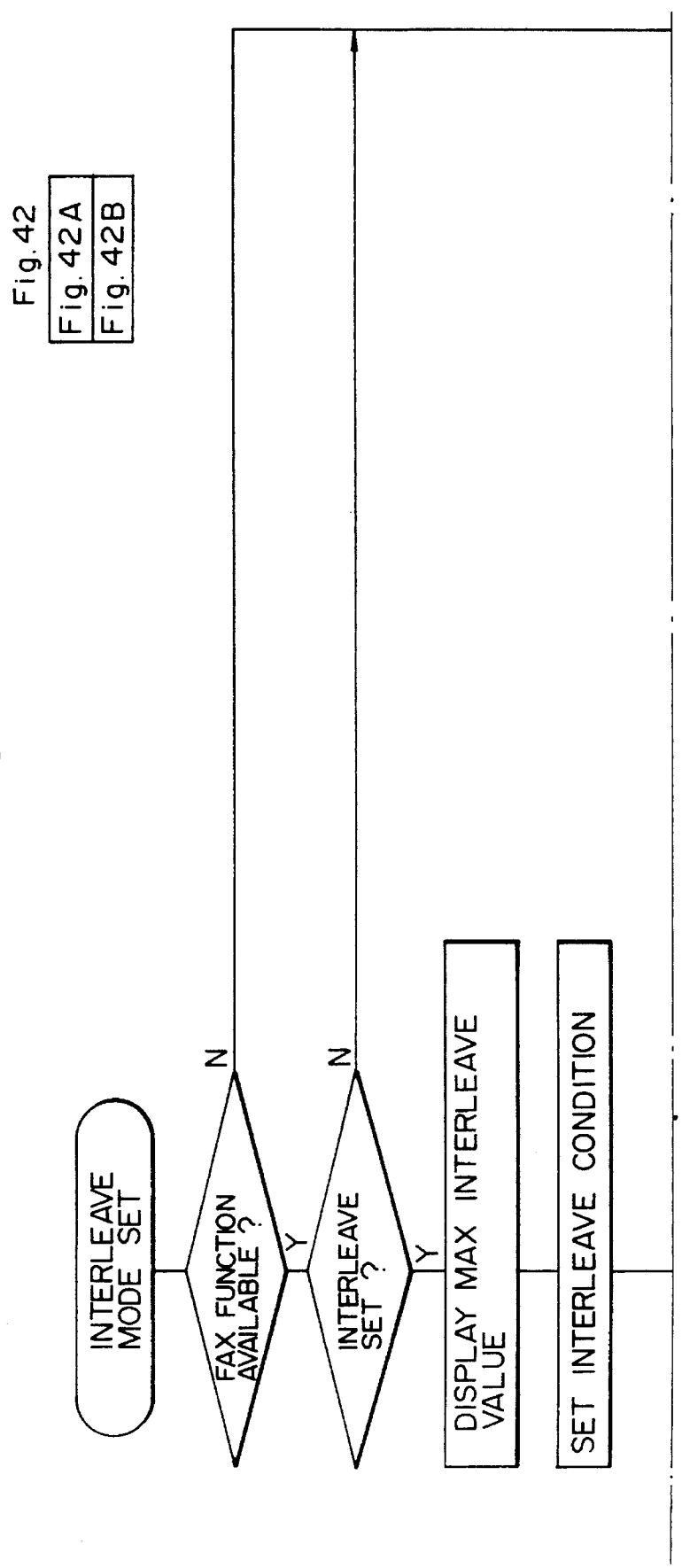

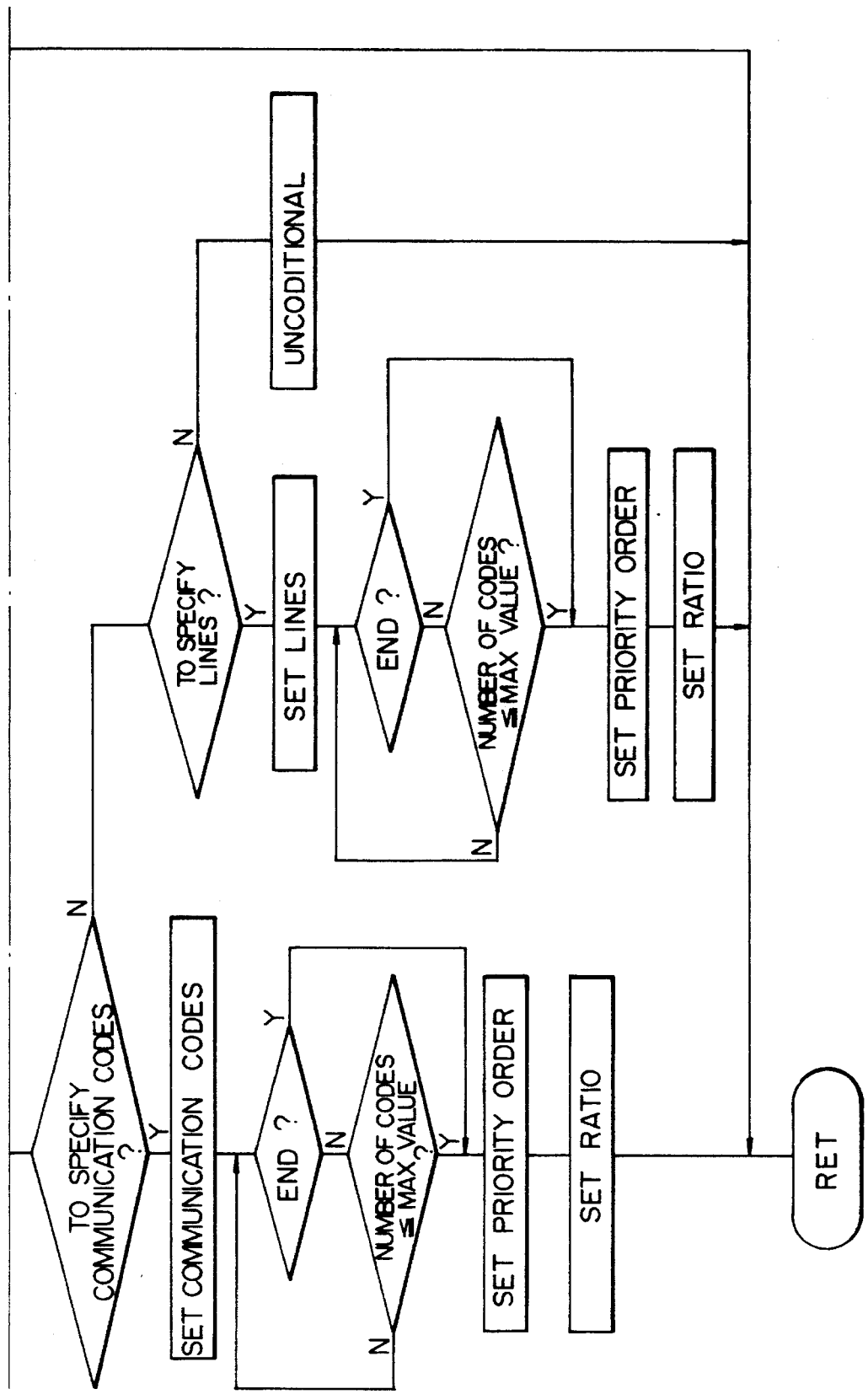

IMAGE FORMING APPARATUS WITH INTERLEAVED PRINTING FROM PLURAL SOURCES

BACKGROUND OF THE INVENTION

1. Field of the Invention

The present invention relates to an image forming apparatus capable of executing a plurality of different functions.

2. Discussion of the Background

A multiplex copier having various functions including a copy function, facsimile function, printer function and file function is available today. This type of copier is designed to execute, among various modes, predetermined modes matching the condition in which the copy function is used. While modes of one function are operative, modes of the other functions are held inoperative. For example, assuming a multiplex copier with a copy function and a facsimile function, there are available a function of switching the print mode to a receive print mode meant for facsimile when the copy function is left unused more than a predetermined period of time and received facsimile data is present, or when a person is absent in front of the copier as determined by operating sensing means and received facsimile data is present. Further, the multiplex copier may be constructed to print document files received from system equipment or to use an optical disk drive as a filing unit.

A convention image forming apparatus having a copy function, facsimile function, printer function and file function as well as other functions has only a single controller. Specifically, the state of the art image forming apparatus with such functions cannot print data with a single laser printer shared by a plurality of functions, to print document files received from a plurality of system equipment by a single laser printer, or to print a plurality of files received by a plurality of facsimile sections by a single laser printer. While an image forming apparatus capable of printing data with a single laser printer shared by a plurality of functions via a network is available, even such an apparatus cannot print data by the laser printer except with a single function.

The multiplex copier allows various functions, i.e., copy function, facsimile function, printer function and file function to exist at the same time and allows each of them to execute a print mode, document read mode and other modes within itself. However, the fact that while the modes of one function are operative, the modes of the other functions are held inoperative as previously mentioned brings about the following problems. Assume that a facsimile section has received data at the time when a person intending to copy documents is about to operate the copier. Then, the facsimile data begins to be printed immediately to prevent the person from copying the documents. Conversely, data received by the facsimile section while a copying operation is under way cannot be printed. Further, assume that the operator continuously registers or files a great number of documents at a photomagnetic disk via a photomagnetic disk drive by using a scanner. Then, data received by the facsimile section cannot be printed until the filing operation ends.

Another problem with the multiplex copier is that while document files received from system equipment are sequentially printed, the other functions, e.g., copy function and facsimile function, are simply left unused. Many of document files to be received from system equipment have several hundred leaves to several thousand leaves, preventing the other functions from being used over a long period of time.

Likewise, the image forming apparatus having only a single controller cannot print document files received from system equipment while the laser printer is printing document files received from another system equipment. Further, this type of image forming apparatus cannot print files received by a facsimile section while the laser printer is printing files received by another facsimile section.

SUMMARY OF THE INVENTION

It is, therefore, an object of the present invention to provide an image forming apparatus capable of executing a plurality of different functions at the same time to promote efficient use thereof.

In accordance with the present invention, an image forming apparatus capable of executing a plurality of functions comprises a reading section for reading a document, a recording section for forming an image on a sheet, an operating section for entering modes and displaying information, and a control section for causing the recording section to continuously and simultaneously print image data read by the reading section and a plurality of independent data written to a memory by a plurality of functions.

Also, in accordance with the present invention, an image forming apparatus capable of executing a plurality of functions comprises a reading section for reading a document, a recording section for forming an image on a sheet, an operating section for entering modes and displaying information, and a control section for causing each of the reading section and recording section to perform respective operations at the same time by entirely different functions.

Further, in accordance with the present invention, an image forming apparatus for forming an image on a sheet and capable of executing a plurality of functions by using a laser printer as a server comprises as operating section accessible for setting modes, and a control section for causing the laser printer to perform printing associated with a plurality of functions at the same time.

Moreover, in accordance with the present invention, an image forming apparatus for forming an image on a sheet and capable of printing data from a plurality of systems by using a recording section as a server comprises an operating section for setting modes, and a control section for causing the recording section to print data from the plurality of systems at the same time.

In addition, in accordance with the present invention, an image forming apparatus comprises a reading section for reading a document, a recording section for forming an image on a sheet, an operating section for entering modes and displaying information, a plurality of facsimile sections for interchanging data with remote stations over respective communication lines, and a control section for causing the recording section to print received files of the plurality of facsimile sections at the same time.

BRIEF DESCRIPTION OF THE DRAWINGS

The above and other objects, features and advantages of the present invention will become more apparent from the following detailed description taken with the accompanying drawings in which:

FIG. 4 is a side elevation of the writing section;

FIG. 6 is a block diagram schematically showing part of the embodiment;

FIG. 7 is a block diagram schematically showing an image processing unit included in the embodiment;

FIG. 11 is a front view of a liquid crystal display section included in the operating sections;

FIGS. 13 and 14 are timing charts each being representative of a specific operation of the embodiment;

FIG. 37 is a block diagram schematically showing a further alternative embodiment of the present invention;

FIGS. 39–41 are timing charts each being representative of a specific operation of the embodiment of FIG. 37; and FIGS. 42 and 43 are flowcharts each demonstrating a particular procedure to be executed by a CPU included in the embodiment of FIG. 37.

DESCRIPTION OF THE PREFERRED
EMBODIMENTS

Figure 1:
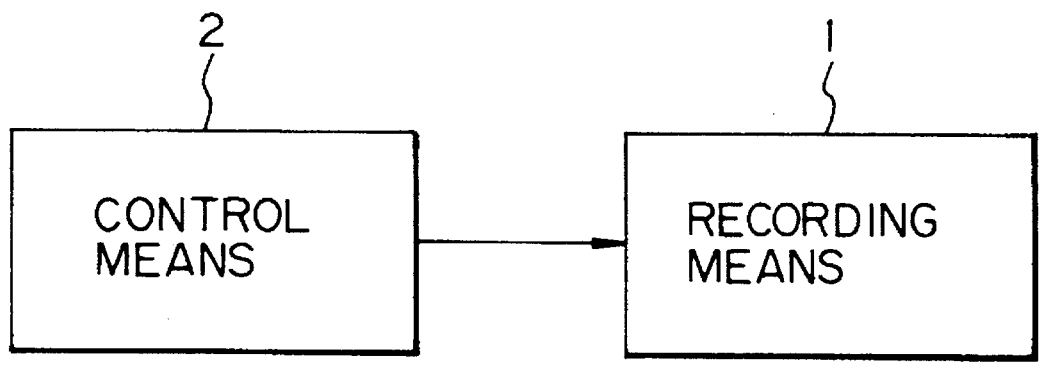
FIG. 1 is a block diagram schematically showing the principle of the present invention.

To begin with, an image forming apparatus in accordance with the present invention is generally made up of reading means for reading a document, recording means for forming an image on a recording sheet, and an operating section for allowing the operator to set desired modes while displaying various kinds of information. As shown in FIG. 1, the apparatus includes control means 2 for causing the recording means 1 to print image data read by the reading means and a plurality of data written to a memory by the plurality of functions continuously at the same time.

Figure 2:
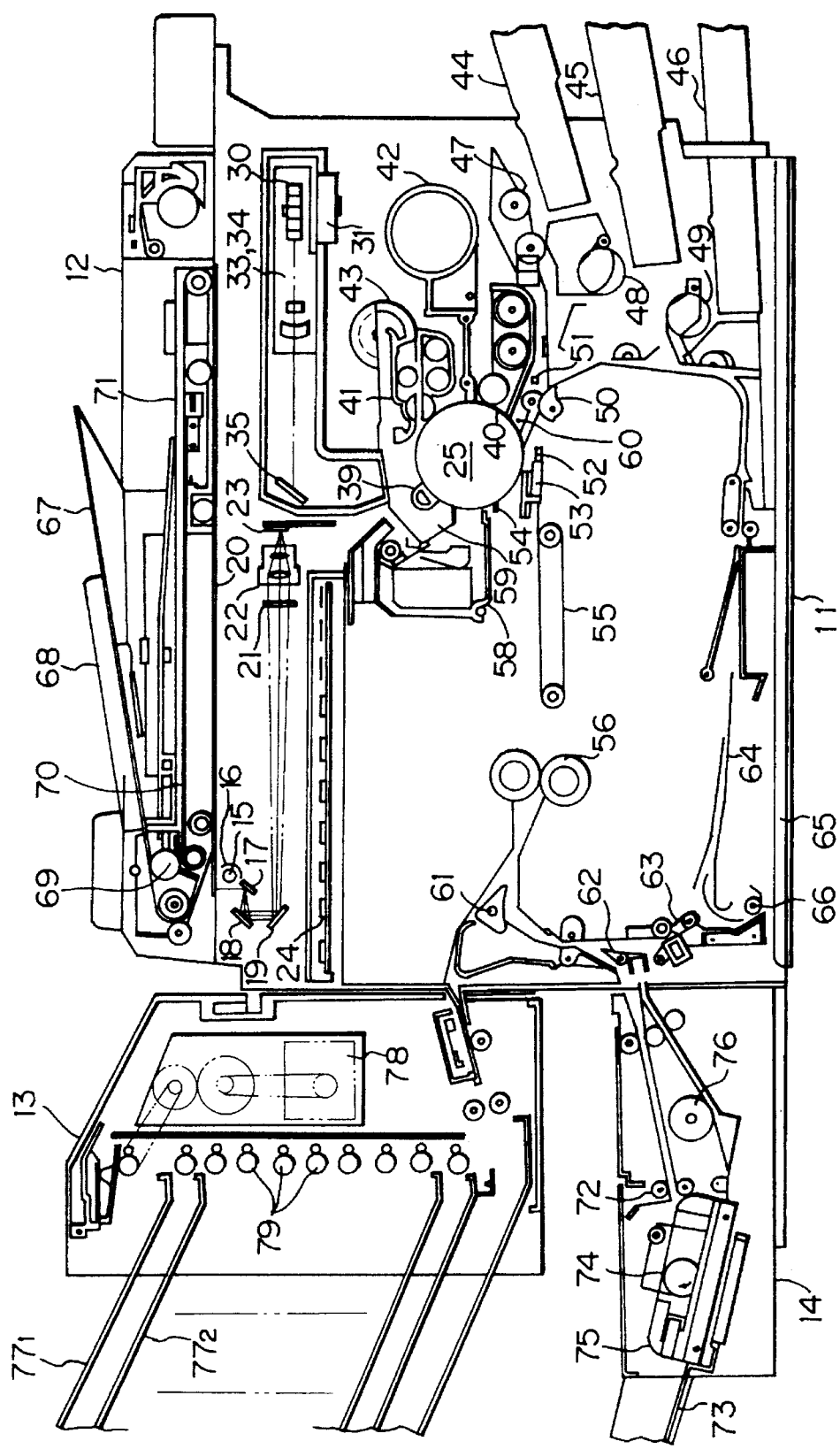
FIG. 2 is a section showing an image forming apparatus embodying the present invention.

FIG. 2 outlines a first embodiment of the image forming apparatus in accordance with the present invention. Implemented as a multiplex digital copier, the apparatus has a copier body 11, an automatic document feeder (ADF) 12, a sorter/stacker 13, and a reversal unit 14 for a two-sided copy mode.

The copier body 11 includes a scanner section, an image processing section, a plotter, etc. The scanner section has a first carriage loaded with a light source 15, a reflector 16, and a first mirror 17 and movable at a constant speed by being driven by a scanner servo motor. The scanner section also has a second carriage loaded with a second mirror 18 and a third mirror 19 and movable along with and at half the speed of the first scanner by being driven by the servo motor. The first and second carriages optically scan a document, not shown, laid on a glass platen 20. The resulting reflection from the document is focused onto a monodimensional solid state imaging device 23 via the mirrors 17, 18 and 19, a color filter 21, and a lens 22. The light source 15 is implemented as, for example, a fluorescent lamp or a halogen lamp, usually a fluorescent lamp due to the inherently long life thereof. While in the embodiment a single light source 15 is used and is provided with the reflector 16, two or more light sources may be used. Since the imaging device 23 has a predetermined sampling clock, the fluorescent lamp has to be turned on at a higher frequency than the sampling clock, otherwise adversely effecting an image. The imaging device 23 is constituted by a CCD (Charge Coupled Device) array and produces an analog image signal. An analog-to-digital converter (ADC) digitizes the analog image signal. An image processing board 24 subjects the resulting digital image signal to various kinds of image processing, e.g., conversion to two levels or multiple levels, tone processing, magnification change and editing, thereby transforming it to a digital signal in the form of a group of spots. The digital signal is sent to the plotter.

To produce color image data, the color filter 21 is movable into an optical path extending from the document to the imaging device 23 and is capable of transmitting only the data of a desired color. Specifically, the color filter 21 is selectively brought into the optical path in synchronism with the scanning of the document. At the same time, a multi-transfer function, a tow-side copy function or similar function is executed to produce any desired kind of copy.

Figure 3:
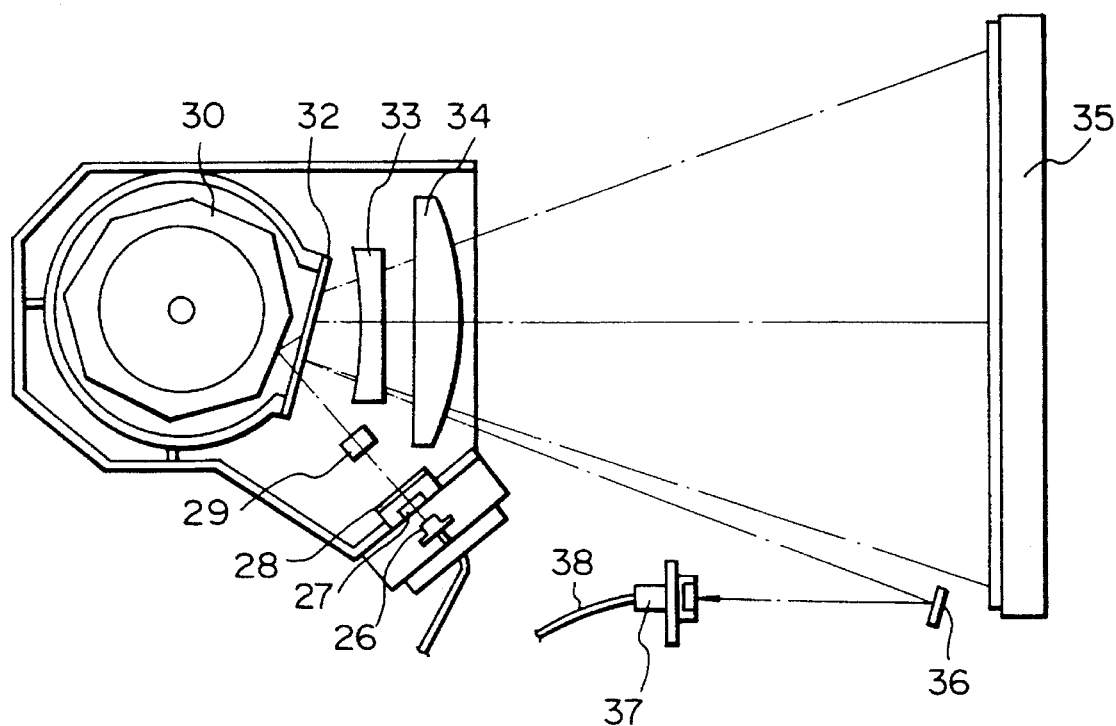
FIG. 3 is a plan view of a writing section included in the embodiment.

In the plotter of the copier body 11, the image data which has undergone the various kinds of image processing at the image processing board 24 is written on a photoconductive drum 25 in the form of a group of beam spots by the raster scanning of a laser beam. Specifically, as shown in FIGS. 3 and 4 also, a laser driver, not shown, modulates a semiconductor laser 26 by the processed image signal from the image processing board 24, thereby causing it to emit a laser beam matching the image signal. The laser beam is collimated by a collimator lens 27, shaped by an aperture member 28 to have a predetermined shape, compressed in the subscanning direction by a first cylindrical lens 29, and then incident on a polygonal mirror 30. The polygonal mirror 30 is configured in an accurate polygon and rotated by a motor 31 at a constant speed in a predetermined direction. The rotation speed of the mirror 30 is dependent of the rotation speed and writing density of the drum 25 and the number of sides of the mirror 30. The laser beam from the first cylindrical lens 29 is steered by the mirror 30 in the main scanning direction and sequentially transmitted through a sound-proof glass 32, f-theta lenses 33 and 34, and a mirror 35. The f-theta lenses 33 and 34 cause the laser beam having a predetermined angle to scan the drum 25 at a constant speed while focusing it in a minimum spot on the drum 25. At the same time, the lenses 33 and 34 compensate for irregularities in the physical configuration of the individual sides of the polygonal mirror 30. The laser beam coming out of the lens 34 is reflected by a mirror 36 toward a synchronization (abbreviated as "sync' hereinafter) beam input section 37 and then propagated through an optical fiber 38 to a sync sensor. In response, the sync sensor produces a sync signal indicative of the beginning of a horizontal line. On the elapse of a predetermined period of time after the sync signal, one line of image data having been processed by the board 24 is outputted. Such a procedure is repeated to form a single image on the drum 25. The drum 25 is provided with a photoconductive layer on the periphery thereof. While the photoconductive layer may be made of any conventional substance sensitive to a semiconductor laser beam (wavelength of 780 nm), e.g., organic photoconductor (OPC), α-Si or Se-Te, the illustrative embodiment uses OPC. Regarding laser writing, two different processes are available, i.e., a negative-to-positive (N/P) process which illuminates an image portion, and a positive-to-positive (P/P) process which illuminates a background portion. The embodiment uses the N/P process by way of example. A main charger 39 uniformly charges the surface of the drum 25 to a negative polarity and is implemented by a scrotron having a grid at the drum side. After the drum 25 driven by a motor has the surface thereof uniformly charged by the main charger 39, the laser beam from the mirror 35 scans it to electrostatically form a latent image. Then, the background portion and the image portion of the drum 40 are respectively provided with a potential ranging from, for example, –750 V to –800 V and a potential of, for example, about –500 V.

Either of a main developing unit 40 and an auxiliary developing unit 41 develops the latent image formed on the drum 25 by a negatively charged toner. At this instant, a bias voltage of –500 V to –600 V is applied to a developing roller included in the developing unit. The main developing unit 40 supplies a developer made up of a black toner and a carrier to the drum 25 by the developing roller thereof while being supplied with a fresh black toner from a toner supply unit 42. Likewise, the auxiliary developing unit 41 supplies a developer consisting of a color toner other than the black toner and a carrier to the drum 25 by the developing roller thereof while being supplied with a color toner from a toner supply unit 43. The main and auxiliary developing units 40 and 41 are selectively moved to a position for developing the latent image formed on the drum 25, i.e., a developing position. Usually, the developing units 40 and 41 are retracted from the developing position. When such developing units 40 and 41 are used, the color data reading, the multiple image transfer by a sheet transport system, the two-sided copy mode and other functions may be combined to produce various kinds of color copies and effect various kinds of color editing. To develop latent images in three or more colors, three or more developing units may be arranged around the drum 25, or use may be made of a revolver accommodating three or more developing units therein and selectively bringing one of them to the developing position.

One of a plurality of sheet cassettes 44, 45 and 46 is selected at a time. As the operator presses a start button provided on the operating section, a sheet is fed from the cassette selected by an associated pick-up roller 47, 48 or 49. The feed of the sheet continues until a lead edge sensor 51 senses the leading edge of the sheet. A register roller 50 drives the sheet such that the leading edge of the sheet meets the leading edge of the toner image carried on the drum 25.

A transfer charger 52 applies a positive charge to the sheet to transfer the toner image from the drum 25 to the sheet. A separation charger 53 separates the sheet carrying the toner image from the drum 25 by AC discharge in cooperation with a separator in the form of a pawl 54. Then, the sheet or copy is transported to a fixing unit 57 made up of a fixing roller and a pressure roller by a transport device 55, whereby the toner image is fixed on the sheet.

The tone remaining on the drum 25 after the image transfer is removed by a cleaning unit 58, and then the charge also remaining on the drum 25 is erased by a discharge lamp 59. A photosensor 60 is located between the main developing unit 40 and the transfer charger 52 for sensing the reflection density from the surface of the drum 25. Specifically, the writing section writes a particular pattern, e.g., a black or mesh pattern on the drum 25 at a predetermined timing so as to form a corresponding latent image. This pattern is developed by one of the two developing units 40 and 41 to form a corresponding toner image. The developing ability f the developing unit 40 or 41 is determined on the basis of a ratio between the output of the photosensor 60 associated with the pattern and the output of the same associated with the background of the drum 25, as will be described later. As a result, the toner is fed from the toner supply unit 42 or 43 to the developing unit 40 or 41 to maintain the developing ability of the developing unit constant.

In an ordinary copy mode, the sheet or copy from the fixing unit 56 is steered by a path selector or pawl 61 toward the sorter/stacker 13. In a multiplex copy mode, the sheet is sequentially steered by path selectors or pawls 61, 62 and 63 downward, routed through a refeed loop 64, and then again fed to the register roller 50. This is again followed by the image forming and image fixing steps. A two-sided copy mode may be implemented by the copier body 11 alone or by the two-sided copy unit 11. In the former case, the sheet from the fixing unit 56 is guided by the path selectors 61–63 to a tray 65. Then, a roller 66 is reversed to drive the sheet in the opposite direction while the path selector 63 steers it to the refeed loop 64. As a result, the sheet is turned upside down and again fed to the register roller 50.

Assume that the operator enters and interrupt mode on the operating section while the above-described usual copy mode operation is under way. Then, after the operator has replaced the document on the glass platen 20 with a desired one and then pressed an interrupt key, the desired document is copied in the same manner. Thereafter, as the operator lays the previous document on the glass platen 20 in lace of the desired one and then again presses the interrupt key, the usual copy mode operation is resumed.

The ADF 12 feeds a stack of documents one by one to the glass platen 20 of the copier body 11 and, after the document has been copied, discharges it. The documents are stacked on a document table 67 and positioned by side guides 68 in the widthwise direction thereof. As one document is picked up and fed by a pick-up roller 69 from the table 67, a transport belt 70 drives it to the glass platen 20. After the document on the glass platen 20 has been copied a number of times corresponding to a desired number of copies, the belt 70 conveys it to a tray 71 out of the copier body 11.

When the two-sided copy mode is effected by the copier body 11 alone, images are reproduced on both sides of a single sheet at a time. On the other hand, when the two-sided copy unit 14 is used, it is possible to reproduce a plurality of documents collectively on one side of sheets.

In the two-sided copy mode using the two-sided copy unit 14, the sheet from the fixing unit 56 is guided by the path selectors 61 and 62 to the unit 14 and then driven out to a tray 73 by a discharge roller 72. At this instant, the sheet is positioned by a roller 74 and side guides 75 in the longitudinal and lateral directions. The sheets sequentially stacked on the tray 73 are again fed by a refeed roller 76 one by one when images are to be reproduced on the other side thereof. The path selectors 62 and 63 steer such sheets to the refeed loop 64 which terminates at the register roller 50. Then, images are transferred to and fixed on the other side of the sheets.

The sorter/stacker 13 is capable of selectively distributing the copies sequentially coming out of the copier body 11 to bins $77_1$, $77_2$, $77_3$ and so forth in order of page or page by page, or distributing them only to predetermined ones of the bins 77. Specifically, a motor 78 drives a transport mechanism 79 so as to transport the copies from the copier body 11. Pawls each being associated with respective one of the trays 77 are selectively switched over to deliver the copies to particular ones of the trays 77.

Figure 5A:
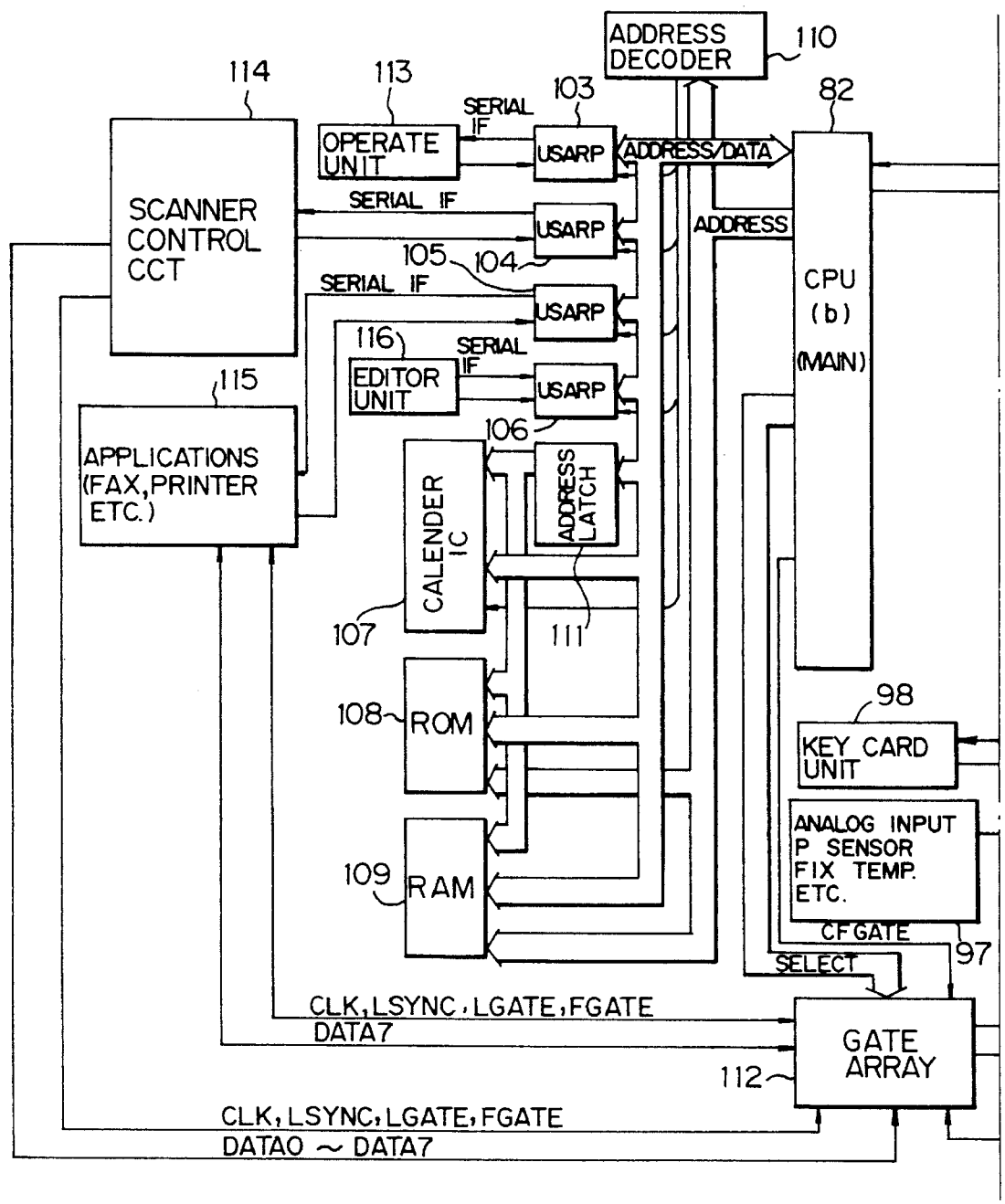
FIG. 5 is a block diagram schematically showing circuitry included in the embodiment.
Figure 5B:
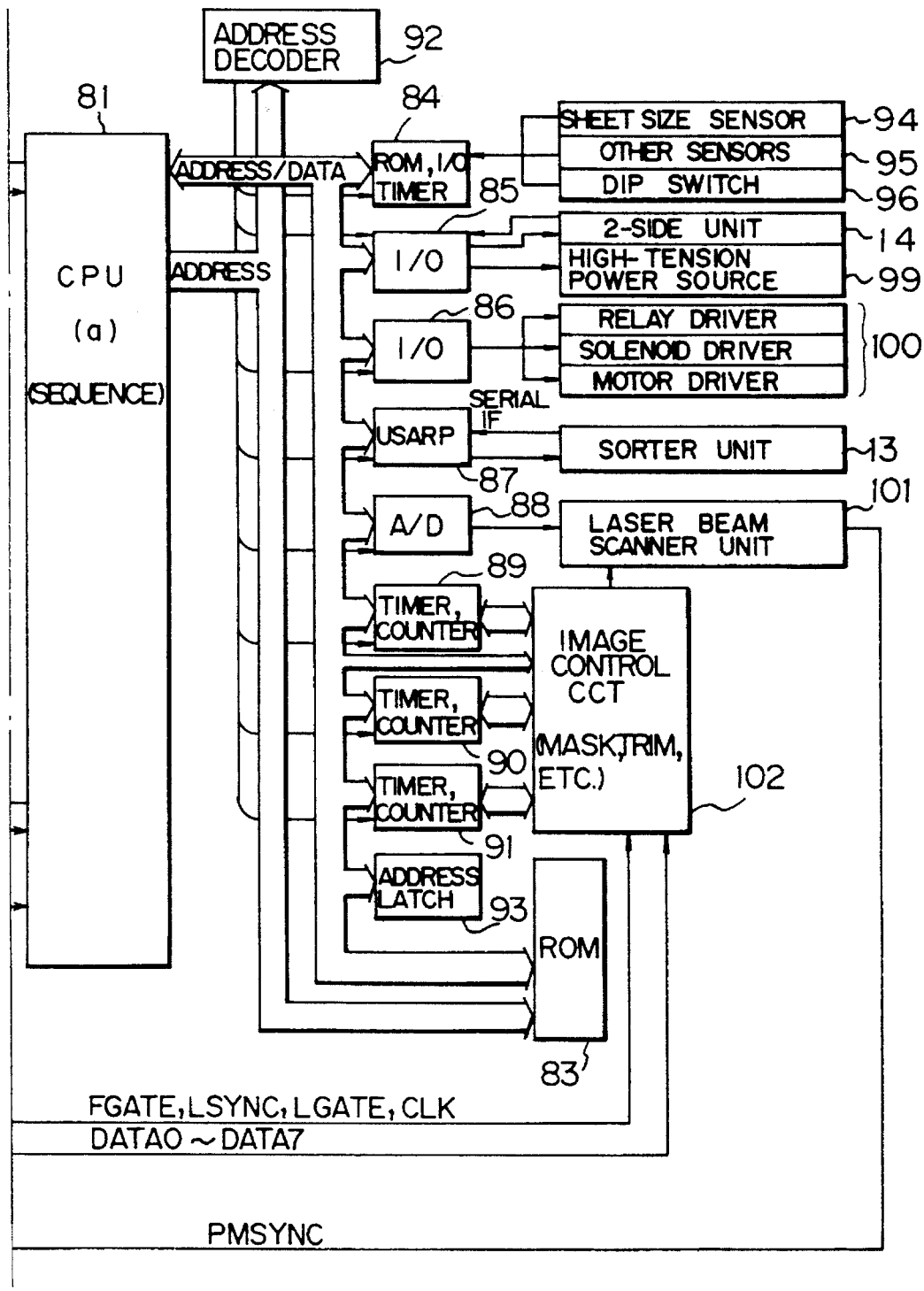

FIG. 5 schematically shows a control system incorporated in the copier body 11. As shown, the control system has two CPUs 81 and 82 which are respectively assigned to sequence control and operation control. The CPUs 81 and 82 are interconnected by a serial interface (RS232C) to interchange signals with each other. Connected to the sequence control CPU 81 are a ROM 83 storing programs and fixed data, a RAM, an input/output port (I/O) and a timer 84, I/Os 85 and 86, a USARP 87, an analog-to-digital converter (ADC) 88, timers/counters 89, 90 and 91, an address encoder 92, and an address latch 93.

The CPU 81 receives via a RAM/I/O/timer 84 the outputs of a sheet size sensor 94 responsive to the size and orientation of sheets stored in the cassettes 44–46, other sensors 95 including a discharge sensor responsive to the discharge of a copy, the lead edge sensor 51 and other sensors associated with the sheet transport, sensors responsive to supplies, e.g., an oil end condition of the fixing unit 56 and to a toner end condition of each of the developing units 40 and 41, and sensors responsive to a door open condition, burn-out of a fuse and other mechanical errors, and a dip switch 96. At the same time, the CPU 81 receives the output of the photosensor 60, the output of a temperature sensor responsive to the temperature of the fixing unit 56, a monitor signal associated with the semiconductor laser 26, and a reference voltage for the laser 26 from an analog input section 97. Further, the CPU 81 interchanges signals with a key card unit 98. The CPU 81 ON/OFF controls (or controls the phase of) a heater included in the fixing unit 56 in response to the output of the temperature sensor to maintain the temperature constant. In response to the output of the photosensor 60, the CPU 81 ON/OFF controls toner supply clutches associated with the toner supply units 42 and 43 to control toner concentrations of the associated developers. In addition, on the basis of the toner concentrations, the CPU 81 determines whether or not the toner supply units 41 and 43 have run out of toner.

Further, the CPU 81 receives the outputs of a sheet sensor responsive to sheets present in the two-sided copy unit 14, a home position sensor responsive to the side guides 75 located at the home position thereof, and sensors relating to the sheet transport via the I/O 85. In response, the CPU 81 controls a motor for driving the side guides 75, a feed clutch for driving the refeed roller 76, and solenoids for selecting a particular sheet transport path via the I/O 85, while controlling a high tension power source unit 99 via the I/O 85. The power source unit 99 applies a particular high voltage to each of the main charger 39, transfer charger 52, separation charger 53, and bias electrodes (developing rollers) of the developing units 40 and 41 at a duty ratio obtained from a PWM signal from the CPU 81.

In the illustrative embodiment, drivers, collectively 100, drive the various sections joining in sheet transport. The drivers 100 include the feed clutches which rotate the pick-up roller 47–49, a register clutch for rotating the register roller 50, counters, motors, toner supply solenoids associated with the toner supply units 42 and 43, power relay, heater of the fixing unit 56, etc. The CPU 81 controls the drivers 100 via the I/O 86 and controls the sorter/stacker 13 via the serial interface (USARP) 87, so that copies may be transported at a predetermined timing and distributed to the bins $77_1$, $77_2$ and so forth. The scanner and writing section 101 is connected to an image control circuit 102 including the image processing board 24. The CPU 81 is connected to the scanner and writing section 101 via the ADC 88. To maintain the output power of the laser 26 constant, the CPU 81 controls it via the ADC 88 such that the monitor signal from the laser 26 coincides with a predetermined voltage (which causes the laser 26 to output power of 3 mW) when the laser 26 is turned on.

The operation CPU 82 is connected to a plurality of serial parts (USARP) 103–106, a calender IC 107, a ROM 108, a RAM 109, an address decoder 110, an address latch 111, and a gate array 112. The serial ports 103–106 are connected to an operating section 113, a scanner control circuit 114, applications 115 (interfacing the CPU 82 and external equipment), and an editor 116.

The operating section 113 includes keys for allowing the operator to enter desired information, and a display and indicators for informing the operator of the statuses of the copier. Key inputs on the operating section 113 are sent to the CPU 82 via the serial port 103 by serial communication. In response, the CPU 82 determines whether to turn on or to turn off the display and indicators of the operating section 112 and then sends the results of decision to the operating section 113 via the serial port 103. On receiving the results of decision, the operating section 113 selectively turns on or turns off the display and indicators accordingly.

The scanner control circuit 114 interchanges with the CPU 82 information relating to the drive of the scanner servo motor of the scanner, image processing and image reading via the serial port 104. At the same time, the control circuit 114 interfaces the CPU 82 and ADF 12 via the serial port 104.

The applications 115 interface the CPU 82 and external equipment, e.g., a facsimile section and a printer section and interchange predetermined information with the external equipment and CPU 82 via the serial port 105. The editor 116 is accessible for entering an editing function, i.e., it sends image editing data (masking, trimming, image shift, etc.) to the CPU 82 by the serial port 106. The calender IC 107 memorizes a data and a time. The CPU 82 is capable of calling the calender IC 107 any time t display the current time on the display of the operating section 113 and to control the ON/OFF of the machine by a timer.

The gate array 112 delivers image data (DATA0-DATA7) in the following three directions in response to a select signal from the CPU 82. First, the gate array 112 delivers the image data from the scanner control circuit 114 to the image control circuit 102. Specifically, the gate array 112 transfers 8-bit (or 4-bit or 1-bit, if desired) data sequentially fed from the CCD image sensor 23 via the ADC to the image control circuit 102 in synchronism with a sync signal PMSYNC fed from the writing section. Also, the gate array 112 transfers, in response to a select signal from the CPU 82, an image signal or 1-bit data (bilevel) sequentially fed from the CCD image sensor 23 via the ADC to the applications 115 in parallel. The applications 115 output the image signal from the gate array 112 to the plotter or similar output unit. Furthermore, the gate array 112 transfers an image signal from the applications 115 to the image control circuit 102 in response to a select signal from the CPU 82. Specifically, the gate array 112 transfers an image signal or 1-bit data (bilevel) sequentially fed from the facsimile section or similar input unit connected to the applications 115 to the image control circuit 102 in synchronism with the sync signal PMSYNC.

FIG. 6 is a block diagram schematically showing the scanner. As shown, as a document 117 laid on the glass platen 20 is illuminated by the light source 15 and reflector 16, the resulting reflection is focused onto the CCD image sensor 26 and transformed to an analog image signal. In an image processing section 118, a signal processing circuit 119 amplifies the analog image signal to compensate for the irregularity in the quantity of light. The output of the signal processing circuit 119 is converted to a digital multilevel signal by an ADC 120, subjected to shading correction at a shading correction circuit 121, and then applied to an image processing unit (IPU) 122.

Figure 8:
FIG. 8 shows data for describing the image processing unit.

FIG. 7 shows a specific construction of the IPU 122. As shown, an MTF correction circuit 123 enhances the high frequency range of the 8-bit image signal from the shading correction circuit 121. Receiving the output of the MTF correction circuit 123, a magnification change circuit 124 electrically changes the magnification of the document image. A gamma correction circuit 125 corrects the ouput of the magnification change circuit 124 such that an optimal input/output characteristic matching the characteristic of the machine is set up. A 4-bit conversion circuit 126 converts the image signal from the gamma correction circuit 125 to a 4-bit image signal. A binarizing circuit 127 compares the 4-bit image signal with a fixed threshold value to binarize the image signal. A dither circuit 128 produces an area tone by 1-bit data from the image signal from the gamma correction circuit 125. As a result, three types of data, i.e., 8-bit data, 4-bit data and 1-bit data shown in FIG. 8 are produced by the 4-bit conversion circuit 126, binarizing circuit 127, and dither circuit 128. Switches 129 and 130 constitute a data depth selecting mechanism and select one of the three types of data. The data selected by the switches 129 and 130 is outputted as an image signal DATA0-DATA7.

Controlled by the CPU 82, the scanner control circuit 114 controls the ON/OFF and quantity of light of the fluorescent lamp 15 via a lamp stabilizer 131 and controls a timing control circuit 132, the magnification change circuit 124 of the IPU 122, and a scanner servo motor 133. A rotary encoder 134 is connected to the output shaft of the scanner servo motor 133 to send a signal representative of the rotation of the motor 133 to the scanner control circuit 114. A position sensor 135 sends, on detecting the first and second carriages arrived at their home position, a home position signal to the scanner control circuit 114. The magnification change circuit 124 changes the magnification of the image signal on the basis of magnification data in the main scanning direction as set by the scanner control circuit 114. The timing control circuit 132 outputs various signals in response to a command from the scanner control circuit 114. Specifically, when the document 117 is read, the timing control circuit 132 delivers to the CCD image sensor 26 a transfer signal for transferring one line of an image signal from photoelements to a shift register, and shift clock pulses for outputting the image signal from the shift register one bit at a time. At the same time, the timing control circuit 132 sends pixel sync clock pulses CLK, main scan sync pulses LSYNC, and main scan valid period signal LGATE.

The pixel sync clock pulses CLK are substantially identical with the shift clock pulses fed to the CCD image sensor 26. The main scan sync pulses LSYNC are substantially identical with the main scan sync signal PMSYNC from the sync sensor of the writing section, but they are outputted in synchronism with the pixel sync clock pulses CLK. The main scan valid period signal LGATE goes high at the time when the image signal DATA0-DATA7 is considered valid. In the embodiment, the CCD image sensor 26 outputs 4,800 bits of valid data for each line.

On receiving a document read command from the CPU 82, the scanner control circuit 114 turns on the fluorescent lamp 15, starts driving the scanner servo motor 133, and controls the timing control circuit 132 to cause the CCD image sensor 26 to start reading the document 117. Also, the scanner control circuit 114 causes a subscan valid period signal FGATE to go high and, on the elapse of a period of time necessary for the document to be read over the maximum length in the subscanning direction (A4 size on the embodiment), causes it to go low.

Figure 9:
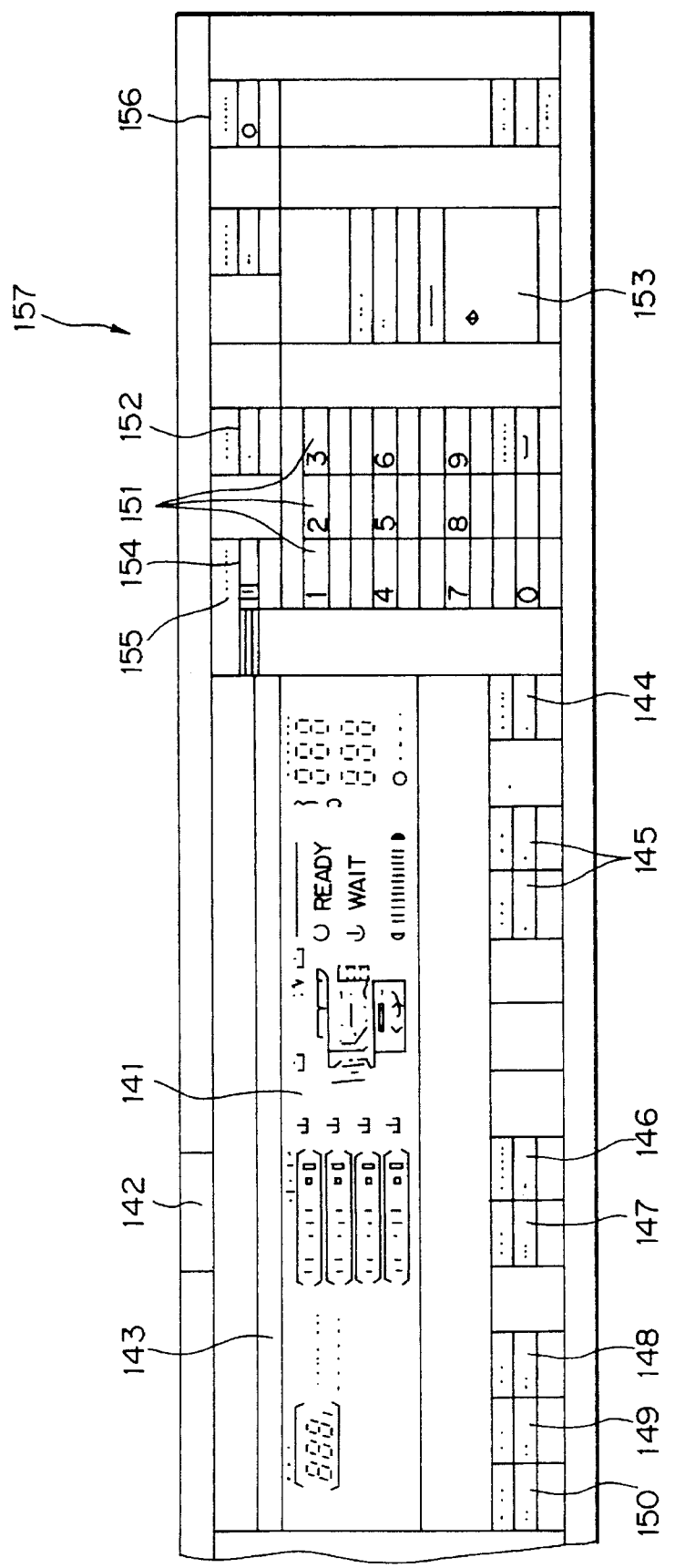
FIG. 9 is a plan view of an operating section included in the embodiment.

FIG. 9 shows a specific arrangement of the operating section. As shown, the operating section has a display panel 141 at the center thereof for displaying various kinds of information. A detecting portion 142 included in an operator detecting device and a guidance display portion 143 are located above the display panel 141. An automatic density key 144, a density adjust key 145, an automatic sheet select key 146, a sheet select key 147, a x1 key 148, an enlarge key 149 and a reduce key 150 are positioned below the display panel 141. Located at the right-hand side of the display panel 141 as viewed in the figure are numeral keys 151, an enter key 152, a start key 153, and a guidance key 154, and a key and indicator group 157 including a guidance key indicator portion 155 and a timer indicator portion 156.

A 400×256 dots liquid crystal display (LCD) and a touch panel are positioned at the right-hand side of the display panel 141. As shown in FIG. 11, the LCD and touch panel includes a menu key 158, a scroll key 159, a utility key 160, a guidance key 161, a contrast adjust knob 162, an extra function display portion 163, and a touch panel 164.

Figure 10:
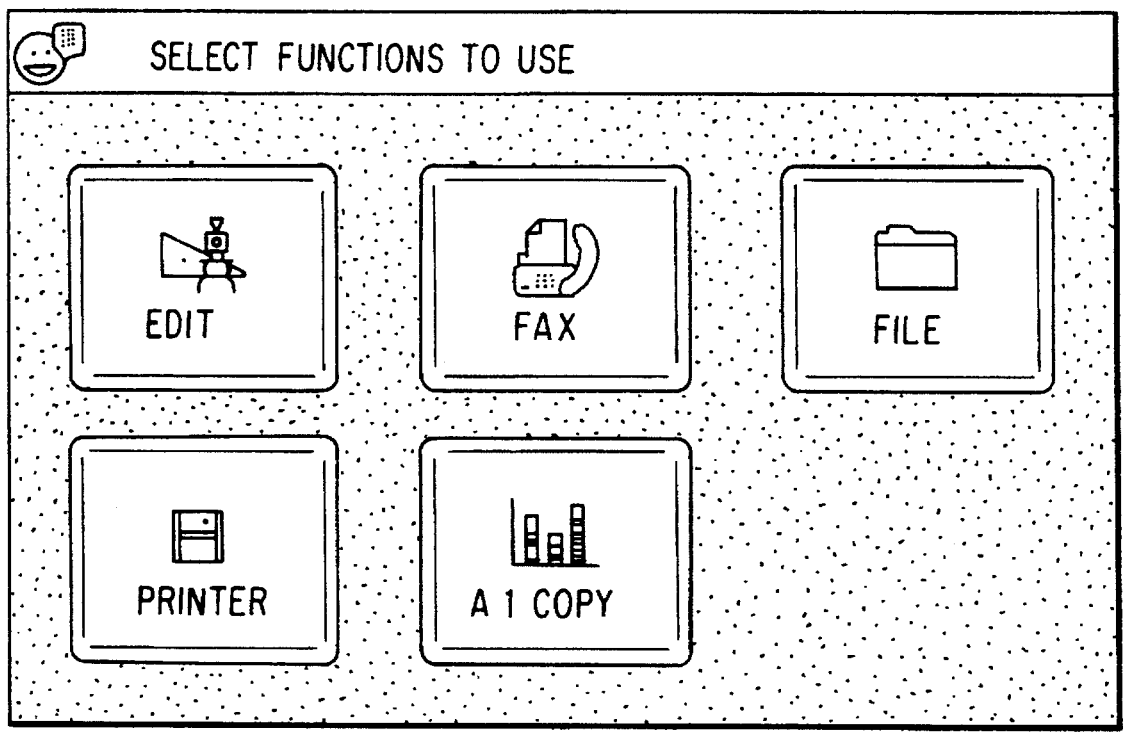
FIG. 10 shows a specific picture appearing on part of the operating section.

Usually, the LCD displays a menu picture shown in FIG. 10 specifically. The picture shows all the functions (functions of the applications) built in the machine. The operator can select any desired application by touching a corresponding part of the picture.

Figure 12A:
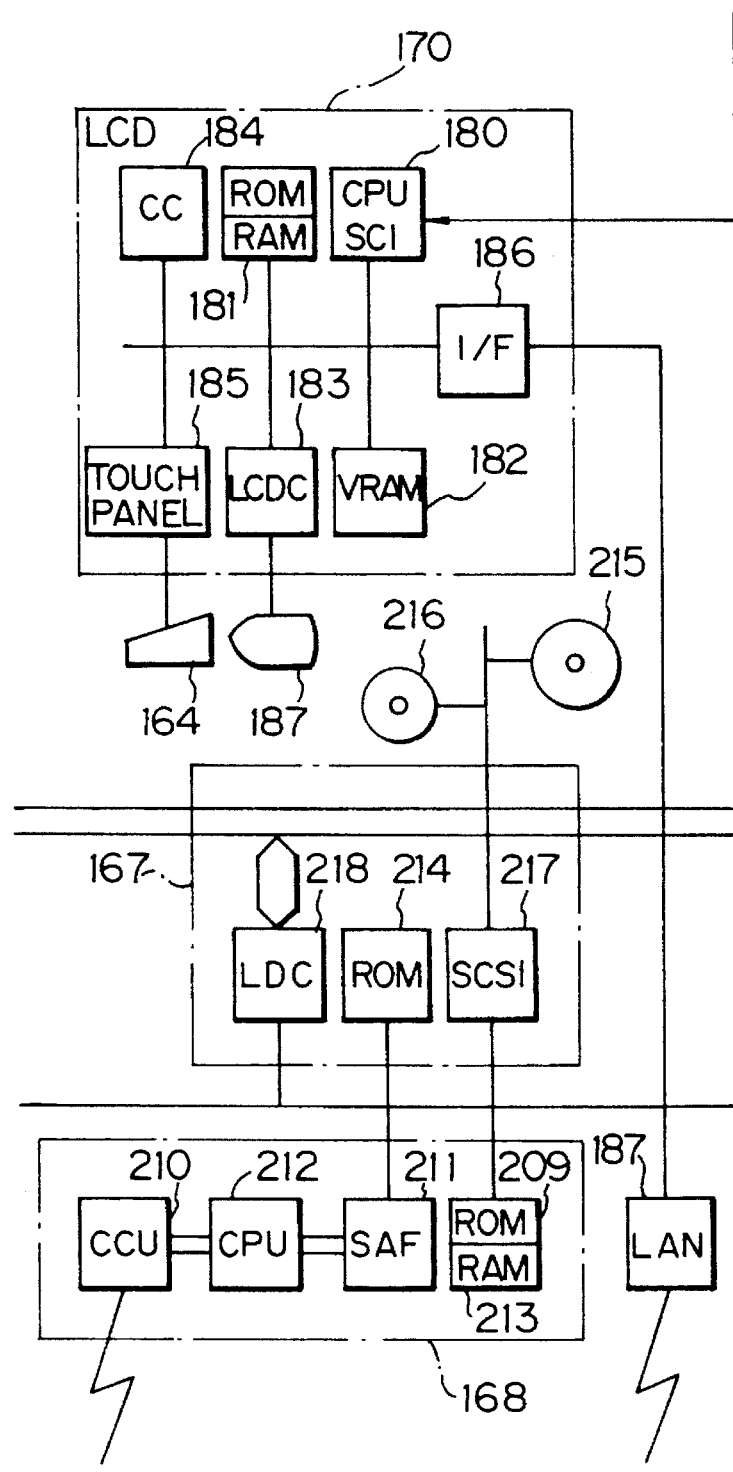
FIG. 12 is a block diagram schematically showing a system construction of the embodiment.
Figure 12B:
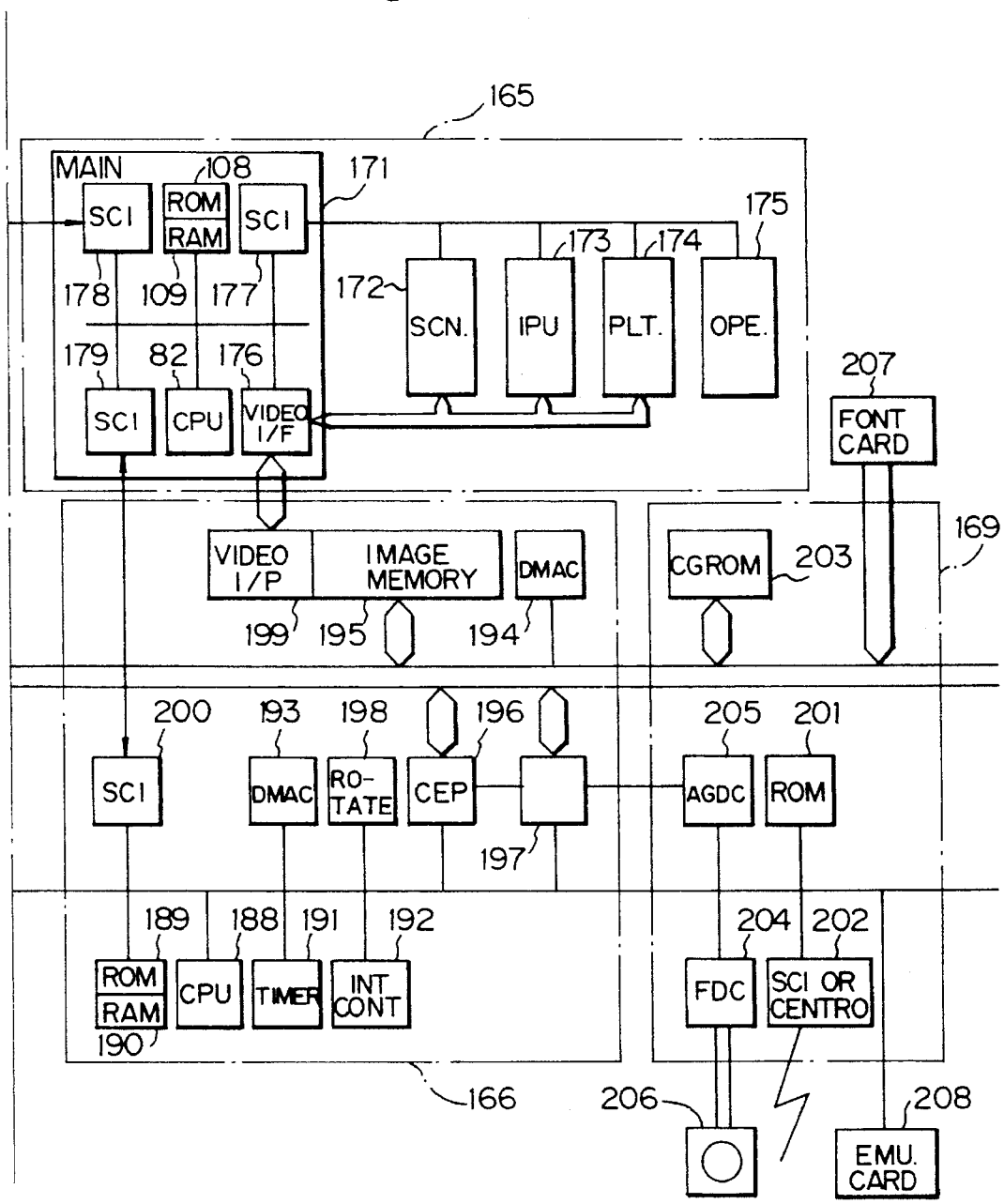

FIG. 12 is a block diagram schematically showing the entire system of the embodiment. The system is generally made up of a copy section 165 and an application section. The application section is constituted by an application controller 166, a file section 167, a facsimile section 168, and a printer section 169. An LCD section 170 forms part of the operating section. The copy section 165 is constructed as previously stated with reference to FIG. 5 and is made up of a main control section 171, a scanner section 172, an image processing section 173, a plotter section 174, and an operating section (LCD section 170 and another section 175). The main control section 171 has the previously stated CPU 82, ROM 108 and RAM 109, a video interface 176, and serial interfaces 177–179. The scanner section 172 controls the scanner. The image processing section 173 includes the image processing board 24 and processes the image signal from the scanner in the previously described manner. The plotter section 174 controls the plotter. The CPU 82 controls the scanner section 172, image processing section 173, plotter section 174 and operating section 175 via the video interface 176 and serial interface 171.

The LCD section 170 has a CPU SCI (serial interface) 180, a ROM/RAM 181, a VRAM 182, and LCD controller (LCDC) 183, a character generator (CG) 184, a touch panel input circuit 185, and an interface (IF) 186. The CPU (CPU and SCI 180) transfers information received from the touch panel 164 via the touch panel input circuit 185 to the CPU 82 via the SCI 178. At the same time, this CPU 180 causes, on receiving information from the CPU 82 via the SCI 178, the LCD 187 to display the above-mentioned information via the LCDC 183 by use of the CG 184. Further, the CPU 180 is connected to the application controller 166 via the IF 186. The CPU 180 transfers the information received from the touch panel 164 via the touch panel input circuit 185 to the application controller 166 via the IF 186, while causing the LCD 187 to display information received from the application controller 166 via the IF 186 via the LCDC 183 by use of the CG 184.

The application controller 166 is provided with a CPU 188, a ROM 189, a RAM 190, a timer 191, an interrupt control circuit 192, DMA controllers (DMACs) 193 and 194, an image memory 195, a CEP (Compression/Expansion Processor) 196, a bus arbiter 197, a rotating section 198 for rotating an image, a video interface 199, and an SCI 200. A multitask OS (Original Software) is stored in the ROM 189 for allowing a plurality of applications to be executed at the same time. Also implemented by the ROM 189 are the function of inputting the video data from the SCI 179 of the main control section 171 of the copy section 165 to the image memory 195 via the interface 199 or outputting the image data from the image memory 195, and a system portion for arbitrating the applications. The copy section 165, applications 267, 168 and 169 and a LAN (Local Area Network) 187 are connected to the application controller 166.

The printer section 169 includes a ROM 201 storing printer application software to operate on the multitask OS, a communication device 202 for receiving document files from an external system, e.g., RS232C or centronics, a CGROM 203, a floppy disk drive controller (FDC) 204, and an AGDC (Advanced Graphic Display Controller) 205. The CPU 188 receives a document file from an external system via the communication device 204 by use of the printer application software of the ROM201 and an emulation card 208 implemented by an IC card. Then, the CPU 188 stores the document file in the image memory 195 by using the CGROM 203 and a font card 207 also implemented by an IC card. Further, the CPU 188 controls a floppy disk drive 206 via the FDC 204 to reproduce data out of a floppy disk and stores the data in the image memory 195 via the AGDC 205.

The facsimile section 168 includes a ROM 209 storing facsimile application software to operate on the multitask OS, a CCU (Communication Control Unit) 210 for receiving data sent over a subscriber line, an SAF (Stack and Forward) memory 211 for holding the received data, a CPU 212 for controlling them, and a RAM 213. The CPU 188 expands the received data stored in the SAF memory 211 and then stores them in the image memory 195 by use of the facsimile application software of the ROM 209, and compresses the image data sent from the scanner to the image memory 195 by the CEP 196 and then writes them in the SAF memory 211. Further, the CPU 212 writes the data arrived at the CCU 210 over the subscriber line in the SAF memory 211 or reads them out of the SAF memory 211 and sends them over the subscriber line.

The file section 167 includes a ROM 214 storing file application software to operate on the multitask OS, an optical disk drive (ODD) 215, an SCSI device or similar interface 217 for connecting a hard disk drive 216, and an LDC 218 for changing magnification. The CPU 188 expands data read out of an OD (Optical Disk) by the ODD 215 based on the file application software by the CEP 196 and then stores them in the image memory 195. Also, the CPU 188 compresses image data fed from the scanner to the image memory 195 by the CEP 196 and then writes them in the OD by the ODD 215.

The CPU 82 of the main control section 171 supervises the plotter, image processing section 173 and operating section 170 and 175 via the scanner section 172 and plotter section 74. At the same time, the CPU 82 executes a copy mode by using the scanner, image processing section 173, plotter, and operating section 170 and 175. The application controller 166 executes the various applications while arbitrating the interchange of image data between the scanner and plotter and the applications via the image memory 195.

In operation, the main CPU 82 of the main control section 171 supervises the scanner, plotter and operating section while executing a copy mode. Assume that a print request signal is fed from any of the applications to the CPU 82 via the SCI 179 while a copying operation is under way. Then, the CPU 82 determines whether or not an interleave function (function of executing a plurality of functions at the same time) has been set. If such a function has been set, the CPU 82 conditions the gate array 112 such that data from the application of interest flows to the plotter at the next sheet feed timing (of course, the CPU 82 determines which application has generated the print request, and which function has priority as well as the ratio thereof). When the print request signal from the application does not arrive via the SCI 179 at the next sheet feed timing, the CPU 82 continuously operates the plotter in the copy mode.

Specifically, FIG. 13 demonstrates a specific procedure to occur when the application, e.g., the facsimile section 168, has sent a print request while the plotter is operating to produce four consecutive copes. As shown, the main CPU 82 sends a sheet feed signal indicative of a copy mode to the sequence control CPU 81. Here, the sequence control CPU 81 does not have to know which application has requested printing. In response to the sheet feed signal, the sequence control CPU 81 causes the sheet cassette of the plotter to start feeding a sheet. On the arrival of the sheet at the register roller 50, the lead edge sensor 51 turns on. Then, the sequence control CPU 81 returns a print ready signal to the main CPU 82. Since the main CPU 82 is executing a copy mode, it sends a scanner start signal to the scanner. In response, the scanner turns on the driveline thereof the start reading a document, thereby outputting image data. At this instant, the gate array 112 is so conditioned by the main CPU 82 as to transfer the image signal from the scanner to the image control circuit 102. Hence, the image signal from the scanner is routed through the image control circuit 102 to the writing section and then written on the drum 25. In synchronism with the image data, the sequence control CPU 81 rotates the register roller 50 of the plotter so as to transfer the image from the drum 25 to the sheet, as stated earlier.

The print request signal from the application is not fed from the SCI 179 until a predetermined period of time elapses after the feed of the first sheet from the cassette. Therefore, the main CPU 82 causes the cassette of the plotter to feed the second sheet in the same manner in the copy mode. Then, the plotter forms an image on the second sheet in the same manner to produce the second copy.

The print request signal from the application 168 is applied to the main CPU 82 via the SCI 179 within a predetermined period of time after the feed of the second sheet. Then, on the elapse of a predetermined period of time, the main CPU 82 causes the sequence control CPU 81 to feed the third sheet for the application mode from the cassette of the plotter. Specifically, the main CPU 82 determines which application has sent the print request signal and, if the application of interest needs printing (i.e. application of a timing at which a sheet can be fed by the function set as the interleave mode), sends a sheet feed signal indicative of the application mode to the sequence control CPU 81. In response, the sequence control CPU 81 causes the cassette of the plotter to starting feeding the third sheet. As soon as the lead edge sensor 51 senses the third sheet arrived at the register roller 50, the sequence control CPU 81 returns a print ready signal to the main CPU 82.

Since the main CPU 82 is executing the application mode, it sends a print ready signal to the application control section 166. This signal is sent to one of the applications which the main CPU 82 has determined to be the application needing printing at the time of sheet feed. On receiving the print ready signal, the CPU 188 of the application control section 166 sends image data stored in the image memory 195 by the application designated by the main CPU 82 (facsimile section 168 in this case) to the copy section 165 via the video interface 199. At the same time, the sequence control CPU 81 rotates the register roller 50 to transfer the image from the drum 25 to the third sheet, thereby producing a printing. At this instant, the gate array 112 is so conditioned by the main CPU 82 as to transfer image data from the application to the image control circuit 102. Hence, the image data read out of the image memory 195 and routed through the interfaces 199 and 176 are transferred to the writing section via the image control circuit 102 to be written on the drum 25.

Regarding the print request signal from the application, on storing image data in the image memory 195, the function operating on the CPU 188 of the application controller 166 (function based on the facsimile application software in this case) sends a print request signal to the CPU 188 which controls the entire application system (at this time, the CPU 188 is informed of the addresses of the image memory 195 storing the image data at the same time on the basis of the facsimile application software). On detecting the print request signal, the CPU 188 sends a print request signal to the main CPU 82 via the SCIs 200 and 179. As the CPU 188 of the application control section 166 receives a print ready signal from the main CPU 82, it sequentially transfers the image data from the addresses of the image memory 195 to the copy section 165 via the video interface 199.

After the feed of the third sheet, the main CPU 82 does not receive a print request signal from the application within a predetermined period of time. Hence, the main CPU 82 causes the cassette of the plotter to feed the fourth sheet in the copy mode. The fourth sheet undergoes image formation in the same manner as the first sheet to become a copy.

Even after the feed of the fourth sheet, the main CPU 82 does not receive a print request signal from the application within a predetermined period of time. Then, the main CPU 82 again causes the cassette to feed the fifth sheet in the copy mode via the sequence control CPU 81. After an image has been formed on the fifth sheet, the main CPU 82 ends the copy mode.

After the fifth sheet has been fed, the main CPU 82 receives a print request signal from the application (facsimile section 168) via the SCI 179 within a predetermined period of time. Then, the main CPU 82 causes the plotter to feed the sixth sheet via the sequence control CPU 81 in the application mode. An image is formed on the sixth sheet in the same manner as on the third sheet by the plotter to produce a printing.

The main CPU 82 does not receive a print request signal from the application via the SCI 179 within a predetermined period of time after the feed of the sixth sheet. Therefore, the main CPU 82 does not send a print signal to the sequence control CPU 81, preventing the plotter from operating. Subsequently, on receiving a print request signal from the application (facsimile section 168), the main CPU 82 sends a print signal to the sequence control CPU 81 to cause the plotter to feed the seventh sheet in the application mode. An image is formed on the seventh sheet in the same manner as on the third sheet to produce a printing.

As stated above, the interleave function handling the image data read by the scanner and the image data written to the image memory 195 by the application is implemented.

When image data from a plurality of applications are written in the image memory 195, the system executes the interleave function, as follows.

As shown in FIG. 14, assume that the facsimile section 168 outputs a print request while three consecutive printings are being produced in a file mode. Then, the CPU 188 expands, by using the file application software stored in the ROM 214, image data reproduced from the OD by the ODD 215 by use of the CEP 196 and then writes them in the image memory 195. Subsequently, on receiving a print request signal from the file section 167, the CPU 188 sends a print request signal indicative of the file mode to the main CPU 82 via the SCIs 200 and 179. In response, the main CPU 82 sends a sheet feed signal indicative of the file mode to the sequence control CPU 81. Again, it is not necessary for the sequence control CPU 81 to know which application has sent the print request signal.

On receiving the sheet feed signal, the sequence control CPU 81 causes the cassette of the plotter to start feeding a sheet. As the lead edge sensor 51 senses the sheet arrived at the register roller 50, the sequence control CPU 81 returns a print ready signal to the main CPU 82. Since the main CPU 82 is executing a file mode, it sends a print ready signal to the application controller section 166. This signal is indicative of the application which the main CPU 82 has determined to be the application needing printing at the time of sheet feed. In response to the print ready signal, the CPU 188 included in the application controller 166 transfers the image data stored in the image memory 195 by the application identified by the main CPU 82 (file section 167 in this case) to the copy section 165 via the video interface 199. At the same time, the main CPU 82 rotates the register roller 50 to transfer an image from the drum 25 to the sheet. At this instant, the gate array 112 is so conditioned by the main CPU 82 as to transfer image data from the application to the plotter. Hence, the image data from the image memory 195 are transferred to the writing section via the image control circuit 102 and written on the drum 25.

Regarding the print request signal from the application, when the function operating on the application controller section 166 (function based on the file application software in this case) fully stores image data from the ODD 215 in the image memory 195 (this is not always necessary; the gist is that a format capable of outputting image data immediately in response to a print ready signal is formed), the file application 167 sends a print request signal to the CPU 188 which controls the entire application system. At this time, the file application 167 also informs the CPU 188 of the addresses of the image memory 195 storing the image data. On detecting the print request signal, the CPU 188 sends a print request signal to the main CPU 82. As the CPU 188 of the application control section 166 receives a print ready signal from the main CPU 82, it sequentially transfers the image data from the addresses of the image memory 195 to the copy section 165 via the video interface 199.

After the first sheet has been fed from the cassette, the main CPU 82 receives a print request signal from the file application (file section 167) via the SCIs 200 and 179 within a predetermined period of time. Then, the main CPU 82 causes the sequence control CPU 81 to feed the second sheet in the file mode. The second sheet is handled in the same manner as the first sheet to produce a printing.

After the feed of the second sheet by the plotter, the main CPU 82 receives a print request from the facsimile application (facsimile section 168) from the CPU 188 via the SCIs 200 and 179 (the facsimile application 168 expands data from the subscriber line by the CEP 196, writes them in the image memory 195, and then sends a print request signal to the CPU 188). At the same time, the main CPU 82 receives a print request signal from the file application 167. The main CPU 82 determines which application has generated the print request signal and, if the application needs printing (application of a timing at which a sheet can be fed by the function set as the interleave mode), sends a sheet feed signal to the sequence control CPU 81. In this case, the main CPU 82 determines that a facsimile mode should be executed and sends a sheet feed signal indicative of the facsimile mode to the sequence control CPU 81. In response, the sequence control CPU 81 causes the cassette to start feeding a sheet. As the lead edge sensor 51 turns on by sensing the leading edge of the sheet arrived at the register roller 50, the sequence control CPU 81 returns a print ready signal to the main CPU 82. Since the main CPU 82 is executing the facsimile mode, it sends a print ready signal to the application control section 166. This signal is meant for the application which the main CPU 82 has determined to be the application needing printing at the time of sheet feed. On receiving the print ready signal, the CPU 188 of the application control section 166 transfers the image data stored in the image memory 195 by the application identified by the main CPU 82 (facsimile section 168 in this case) to the copy section 165 via the video interface 199. At the same time, the main CPU 82 causes the sequence control CPU 81 to rotate the register roller 50. As a result, an image is formed on the sheet to produce a printing.

Although a print request signal does not appear within a predetermined period of time after the feed of the third sheet, the print request signal received from the file application at the time of feed of the second sheet exists. Hence, the main CPU 82 causes the sequence control CPU to feed the fourth sheet in the file mode. An image is formed on the fourth sheet in the same manner as on the first sheet to produce a printing.

As stated above, the interleave function handling the image data written to the image memory 195 by a plurality of applications is implemented.

Figure 15:
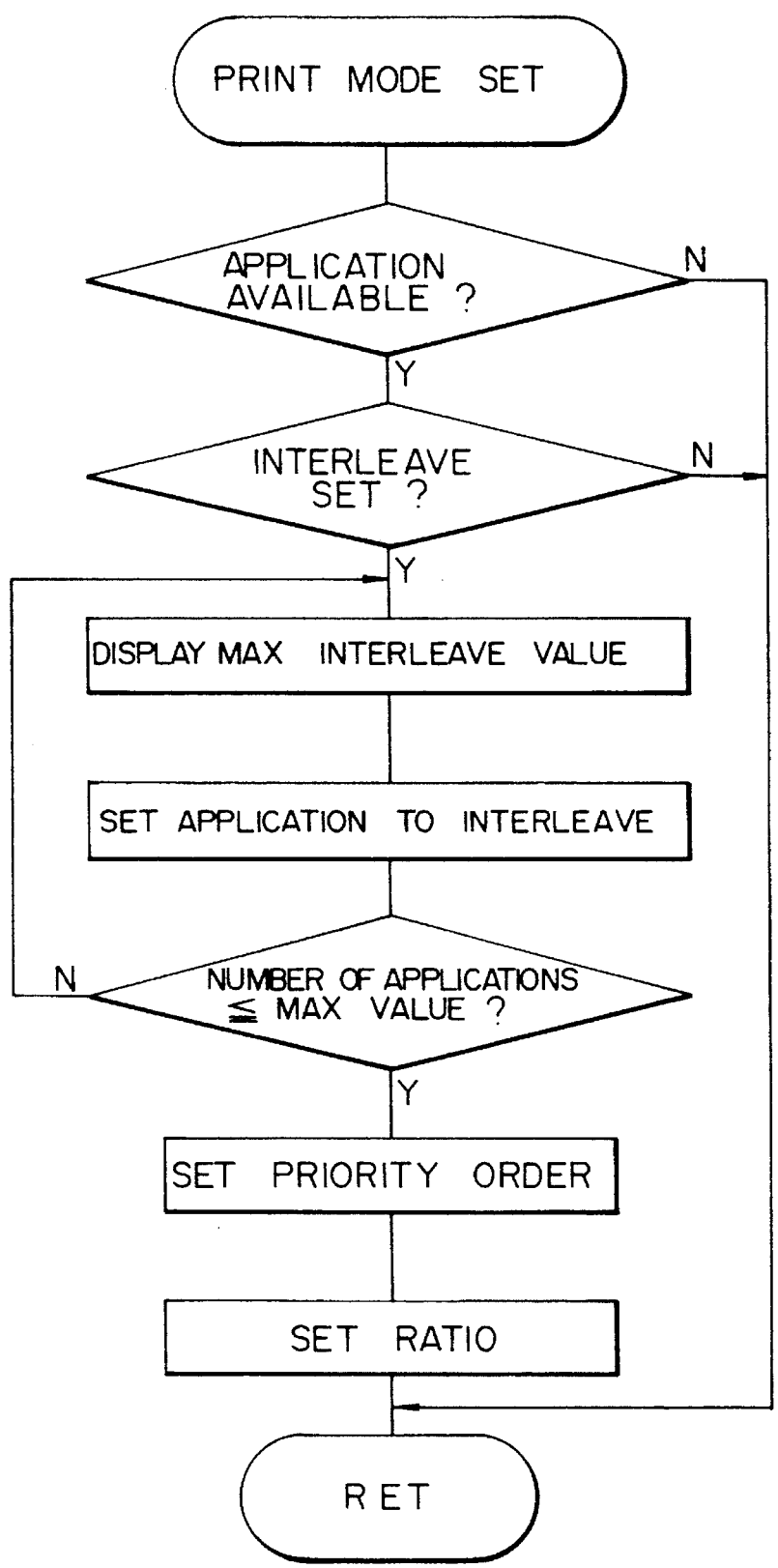
FIGS. 15–25 are flowcharts each showing a particular procedure to be executed by a CPU (Central Processing Unit) included in the embodiment.

A reference will be made to FIG. 15 for describing a procedure for setting the interleave function. The interleave function is set by the user or the serviceman. As the user or the serviceman manipulates the operating section to enter an SP (serviceman Program) mode or similar predetermined mode, the main CPU 82 checks the input signal from the operating section and, if applications are not available, returns. In this case, the main CPU 82 displays a message, e.g., "NO APPLICATIONS AVAILABLE" on the guidance display portion 143 and then ends the mode.

If applications are available, the main CPU 82 displays a message, e.g., "SET INTERLEAVE? 0:NO 1:YES_" on the guidance display portion 143. When "0" is selected as indicated by a signal from the operating section, the main CPU 82 ends the mode. When "1" is selected, the main CPU 82 displays on the guidance display portion 143 a message, e.g., "XX APPLICATIONS MAX AVAILABLE. SET APPLICATIONS TO INTERLEAVE. 1:COPY 2:FACSIMILE 3:PRINTER 4:FILE_". With such a message, the main CPU 82 informs the user or the serviceman of the maximum number of applications to interleave (number of bins of the sorter/stacker 13) and the applications capable of being interleaved. Watching the message, the user or the serviceman enters the desired applications to interleave and the number of bins of the sorter/stacker 13 for receiving printings. Assume that the sorter/stacker 13 is absent, and that the copier body 11 is provided with a single tray. Then, in response to a signal distinguishing the sorter/stacker 13 and the tray, the main CPU 82 displays a message, e.g., "IMPOSSIBLE TO INTERLEAVE BECAUSE SORTER/STACKER IS ABSENT" on the guidance display portion 143 and then ends the mode.

The main CPU 82 sequentially sets the interleave function application by application, as stated above. When the maximum number of bins available with the sorter/stacker 13 is reached or when all the interleave settings are completed, the main CPU 82 displays a message, e.g., "SET INTERLEAVE PRIORITY ORDER. 1:COPY 2:FACSIMILE 3:PRINTER 4:FILE_, _, _", thereby urging the serviceman or the user to set a desired priority order.

On completing the interleave setting, the main CPU 82 shows a message, e.g., "SET INTERLEAVE RATIO. COPY:FAX:PRINTER:FILE=_:_:_:_" on the guidance display portion 143 to urge the user or the serviceman to enter a desired ratio. By storing the resulting signals from the operating section, the main CPU 82 sets up a desired interleave ratio of the copy section 165, facsimile section 168, printer section 169, and file section 167. At such a set ratio, the copy section 165, facsimile section 168, printer section 169 and file section 167 will be accepted when they output a print request signal at the same time.

Specifically, assume that priority is given to copy, facsimile, printer, and file in this order, and that the ratio is copy:facsimile:printer:file=3:1:2:1. Then, the main CPU 82 executes printing at the specified ratio, i.e., executes printing with three sheets in the copy mode, with a single sheet in the printer mode, with a single sheet in the file mode, and then with three sheets in the copy mode again. Alternatively, the sequence may be divided so long as the ratio is identical with the set ratio. For example, one printing may be sequentially produced for the copy section, facsimile section, copy section, printer section, file section, copy section, and printer section in this order.

Figure 16:
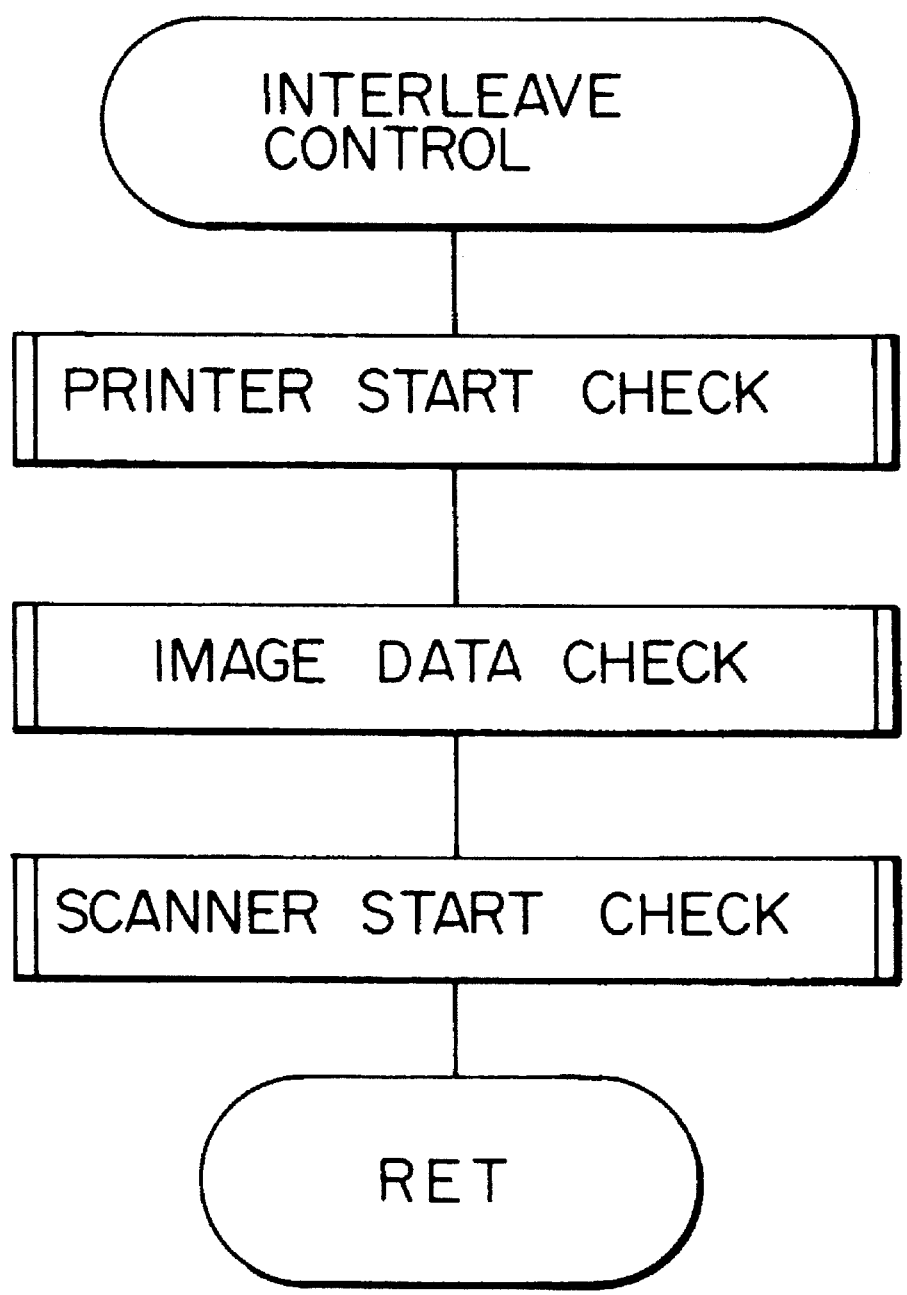

FIG. 16 shows an interleave control routine to be executed by the main CPU 82. The main CPU 82 executes the interleave control routine once every time a software main routine is executed. In the interleave control routine, the main CPU 82 executes a print start check routine shown in FIG. 17, an image data check routine shown in FIG. 18, and a scanner start check routine shown in FIG. 19.

Figure 17B:
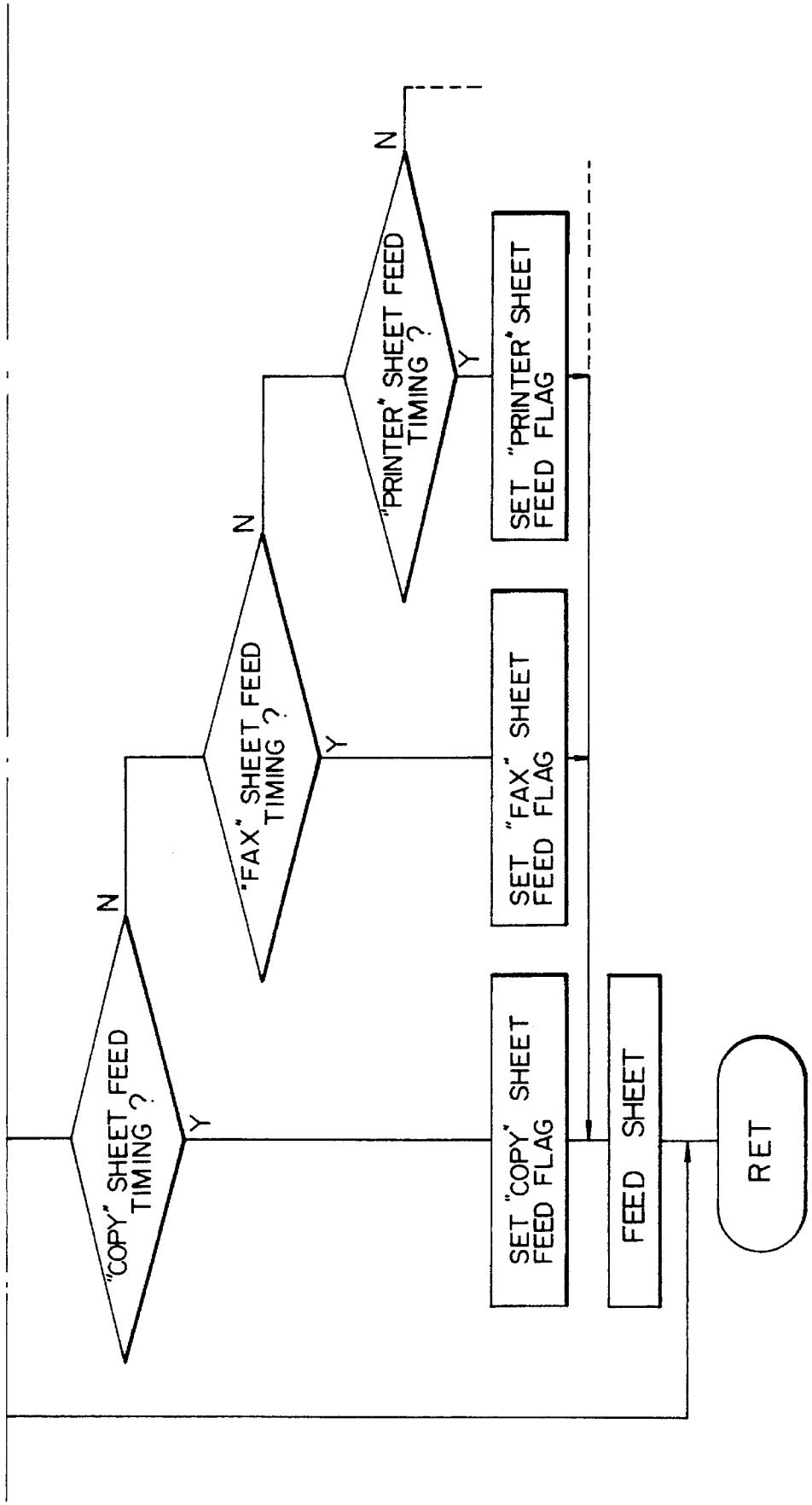

The print start check routine shown in FIG. 17 will be described first. This routine is executed when the interleave mode is set. First, the main CPU 82 determines whether or not an interrupt mode is set. Since an interrupt mode is used in the event of urgency, executing the interleave mode would be a serious obstacle for the user. Therefore, when the interrupt mode is set, the main CPU 82 returns without executing the interleave processing. If the interrupt mode is not set, the main CPU 82 determines whether or not a print request signal is present and, if the answer is negative, returns.

When a print request signal is present, the main CPU 82 determines whether or not a sheet having been fed but not discharged is present in the plotter in response to, for example, the output of a particular sensor. If such a sheet is present in the plotter, the main CPU 82 determines whether or not a predetermined period of time has elapsed after the feed of the preceding sheet. It is to be noted that the predetermined period of time mentioned above is determined by the maximum printing speed of the plotter beforehand and is also dependent on the image forming process of the plotter, e.g., laser writing or thermal writing, as well as the sheet transport system.

As such a predetermined period of time expires, the main CPU 82 determines that the plotter is ready to print by regarding that the above-mentioned sheet is absent in the plotter. Then, the main CPU 82 selects a mode in which a sheet should be fed on the basis of the contents produced by the routine of FIG. 15. Specifically, the main CPU 82 determines for which of the applications a sheet should be fed on the basis of the kinds of applications to interleave, the priority order, and the ratio. On identifying the application, the main CPU 82 sets one of sheet feed flags associated with the application and then causes the plotter to start feeding a sheet.

Figure 18B:
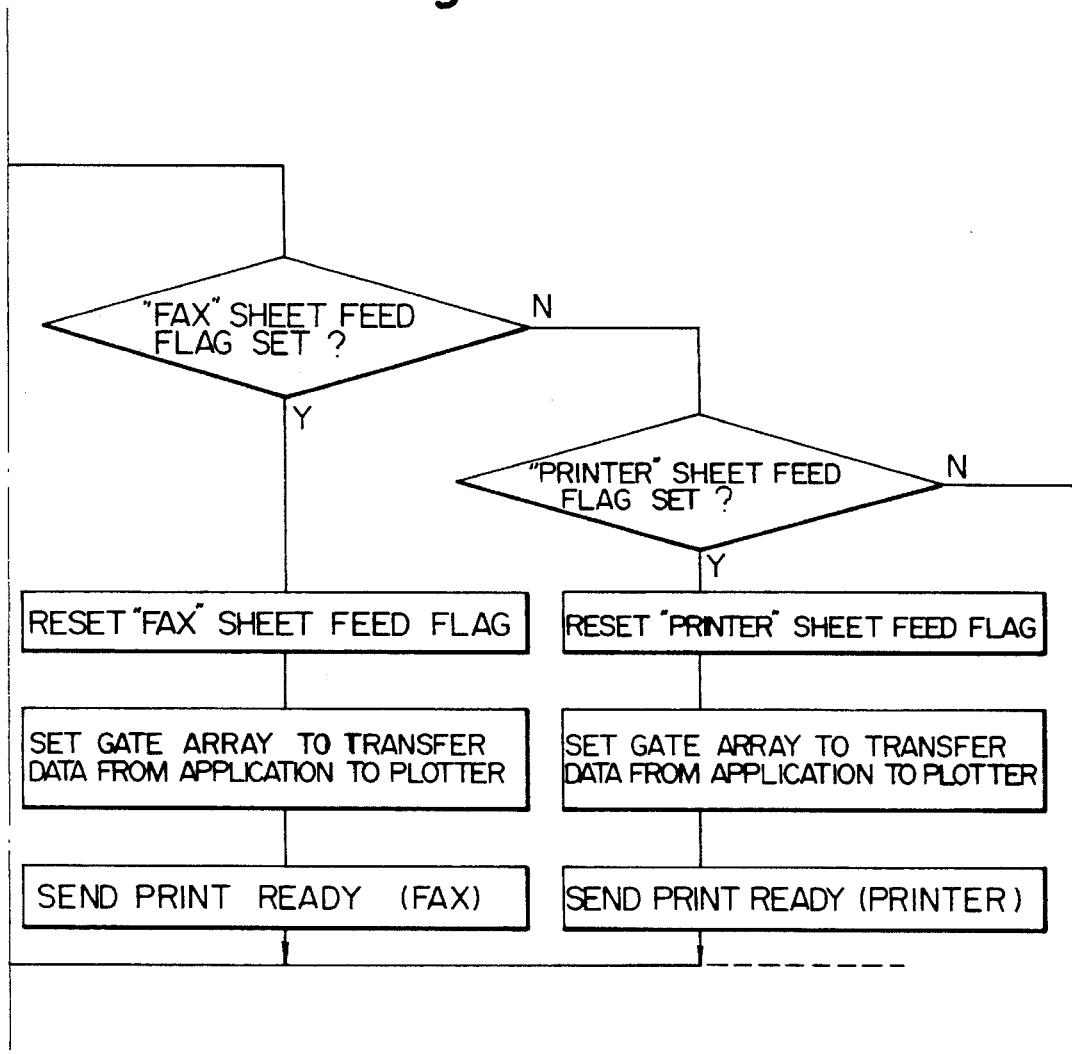

The image check routine shown in FIG. 18 is executed by the main CPU 82 when the lead edge sensor 51 senses the leading edge of a sheet arrived at the register roller 50, i.e., when a print ready state is reached. As shown, the main CPU 82 determines whether or not the sheet has reached the register roller 50 by referencing the output of the lead edge sensor 51. If the sheet has not reached the register roller 50, the main CPU 82 returns without executing any processing.

When the sheet has reached the register roller 50, the main CPU 82 checks the sheet feed flag set at the start of sheet feed. If a "copy" sheet feed flag is set, the main CPU 82 resets it and sends a scanner start signal to the scanner. If the "copy" sheet feed flag is not set, the main CPU 82 checks a "facsimile" sheet feed flag. If the "facsimile" sheet feed flag is set, the main CPU 82 resets it, conditions the gate array 112 for transferring image data from the application to the plotter, and then sends a print ready (facsimile) signal to the application control section 166. If the "facsimile" sheet feed flag is not set, the main CPU 82 checks a "printer" sheet feed flag. If the "printer" sheet feed flag is set, the main CPU 82 resets it, conditions the gate array 112 for transferring image data from the application to the plotter, and then sends a print ready (printer) signal to the application control section 166. The main CPU 82 sequentially executes such a checking and processing operation with each of the applications.

Figure 19B:
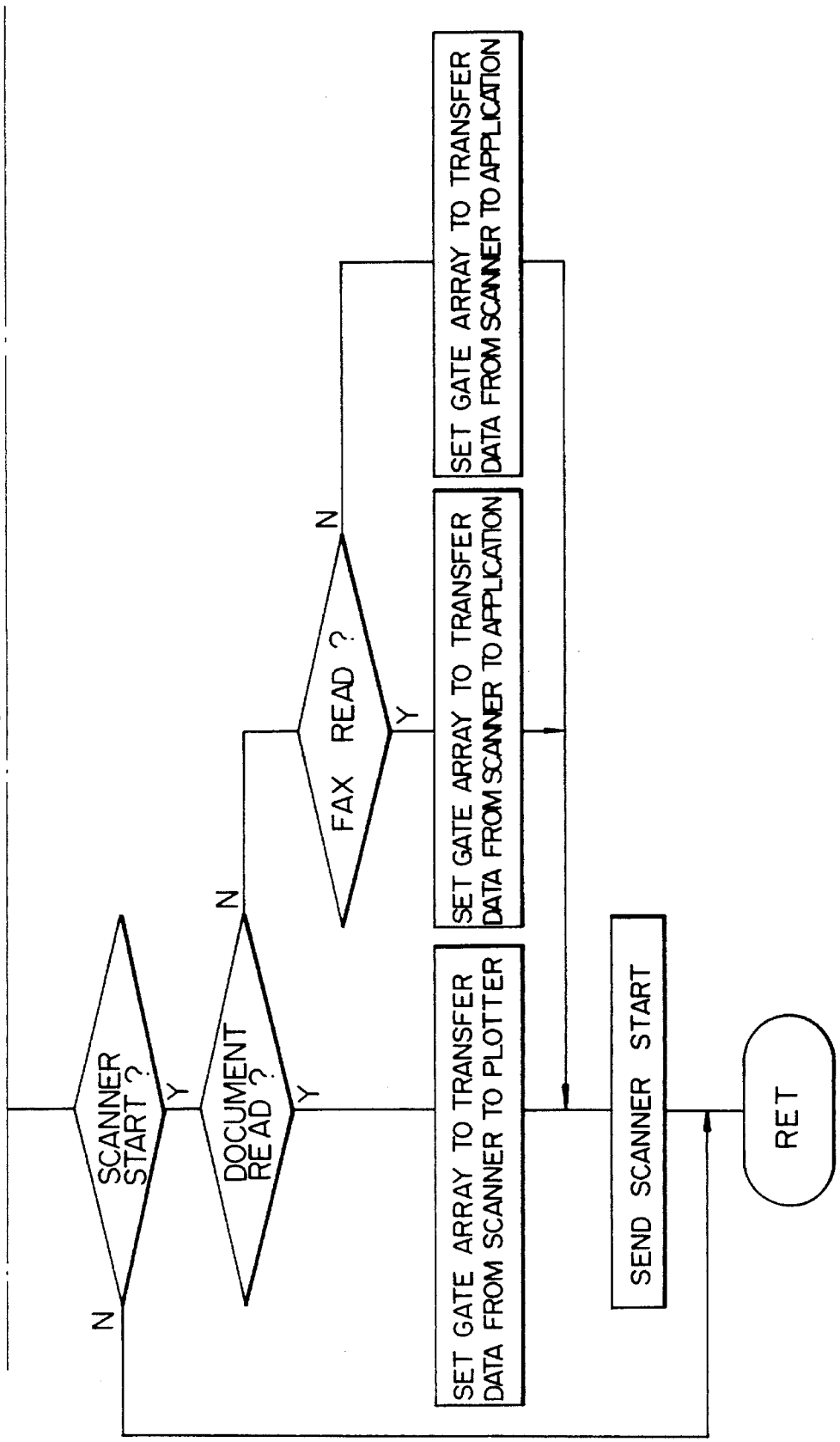

The scanner start check routine shown in FIG. 19 is executed to send a start request to the scanner by determining whether or not any of the applications is to use the scanner. First, the main CPU 82 determines whether or not to use the ADF 12 in response to a sensor responsive to the ADF 12 which may be mounted on the copier body 11. When the ADF 12 is to be used, the main CPU 82 sends a document feed command to the ADF 12 to cause it to feed a document. As soon as a sensor senses the document brought to a reference position on the glass platen 20, the main CPU 82 returns a scanner ready signal to the application generated a scanner request in response to the output of the sensor. When the ADF 20 is not necessary, the main CPU 82 returns a scanner ready signal to the application generated the scanner request in response to the output of the sensor.

On receiving a scanner start request signal form the application, the main CPU 82 identifies the application and then conditions the gate array 12 for a particular transfer direction. Specifically, when the scanner reads a document in the copy mode, the main CPU 82 causes the gate array 12 to transfer data from the scanner to the image control circuit 102. When the scanner reads a document in the facsimile transmission mode, the main CPU 82 conditions the gate array 12 for transferring data from the scanner to the application. In the other cases, the main CPU 82 causes the gate array 12 to transfer data from the scanner to the application. Then, the main CPU 82 sends a start signal to the scanner to cause it to start reading a document. Here, the scanner does not have to know which application has sent the scanner start request.

Figure 20:
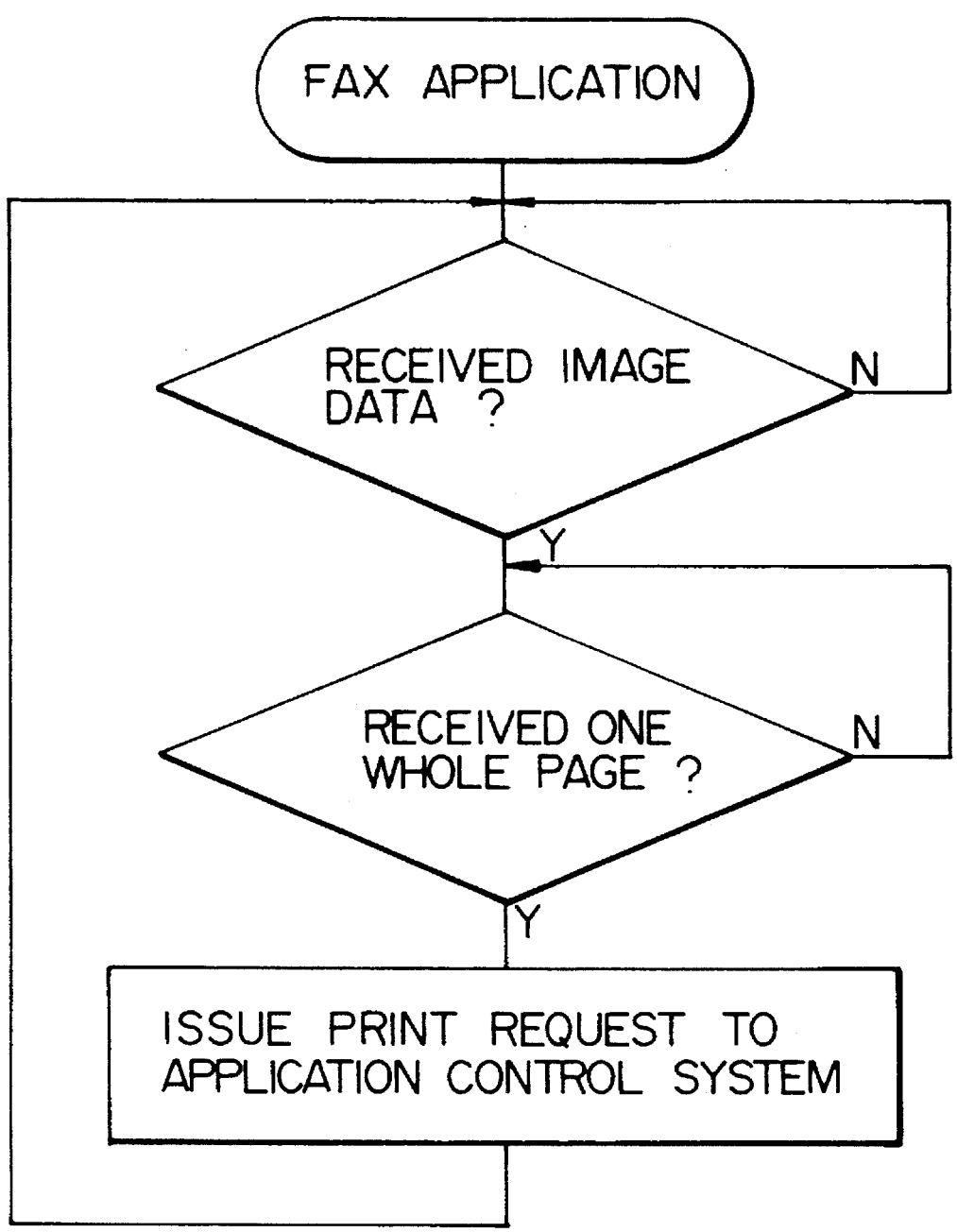

FIG. 20 shows a procedure to be executed by the CPU 212 of the facsimile section 168. As shown, as the CCU 210 receives data over the subscriber line, the CPU 212 stores the data in the SAF 211 page by page and issues a print request signal to the application control system section (application controller section 166).

Figure 21:
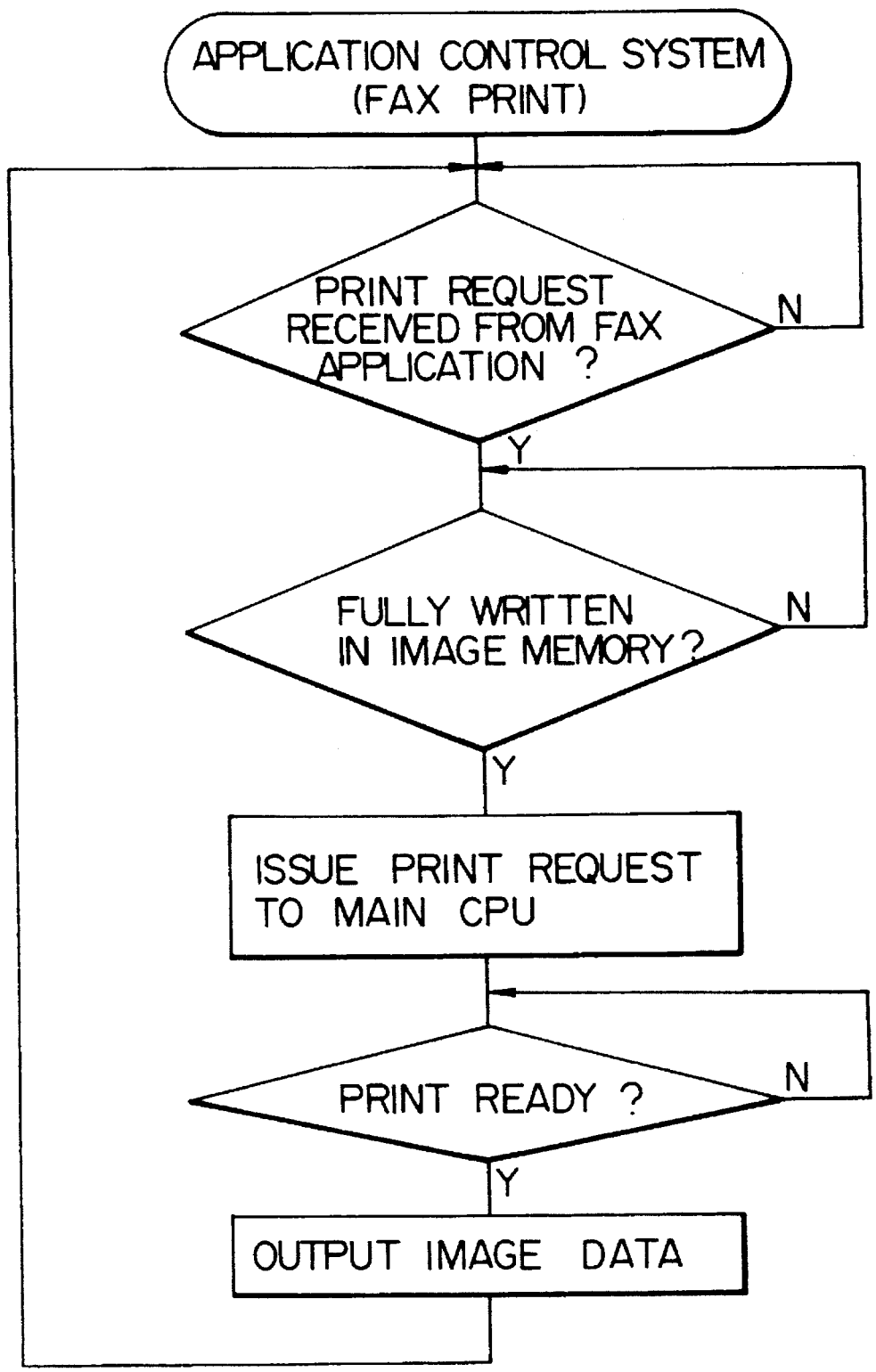

FIG. 21 shows processing which the application controller section 166 executes in response to the print request signal from the CPU 212 and on the basis of the facsimile application software stored in the ROM 209 of the facsimile section 168. As shown, on receiving the print request signal, the CPU 188 included in this section 166 writes the data of the SAF 211 in the image memory 195 and sends a print request signal to the main CPU 82 via the SCIs 200 and 179. Subsequently, as the CPU 188 receives a print ready signal from the main CPU 82 via the SCIs 179 and 200, it transfers the image data from the image memory 195 to the gate array 112 via the video I/Fs 199 and 176. The print request signal sent from the CPU 188 to the main CPU 82 is checked by the latter as the facsimile sheet feed timing shown in FIG. 14. On the other hand, the print ready signal is sent from the main CPU 82 on the basis of a print ready state as decided by the print start check routine of FIG. 17.

Figure 22:
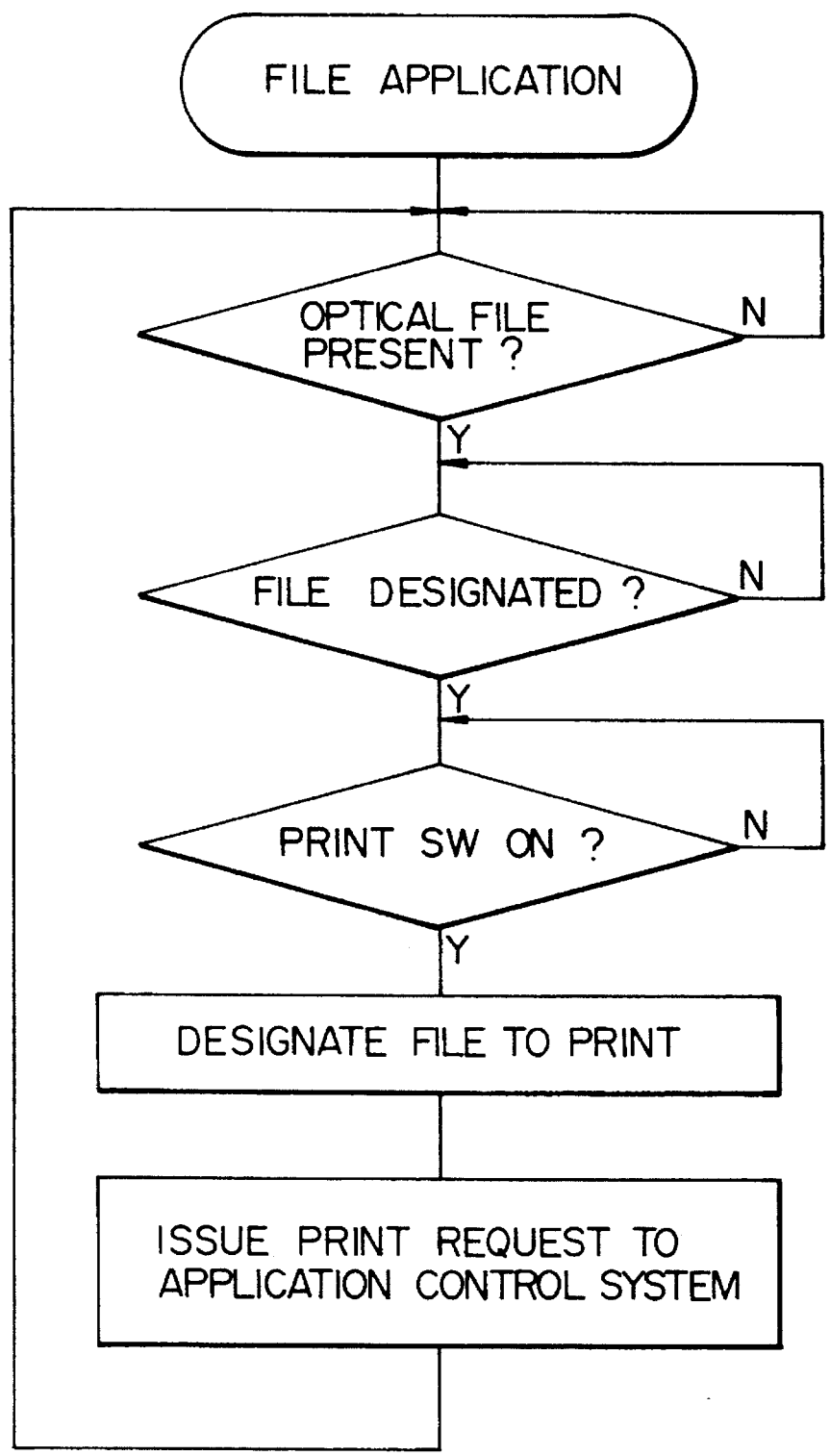

FIG. 22 demonstrates a file print request procedure particular to the file section 167. As shown, based on the file application software stored in the ROM 214, the SCSI 217 determines whether or not files are stored in the hard disk of the hard disk drive 217. On finding files in the hard disk, the SCSI 217 determines whether or not a file to print has been entered on the operating section. When the file to print is entered and a print switch provided on the operating section is pressed, the SCSI 217 sends a print request signal indicative of the entered file to the application controller section 166.

Figure 23:
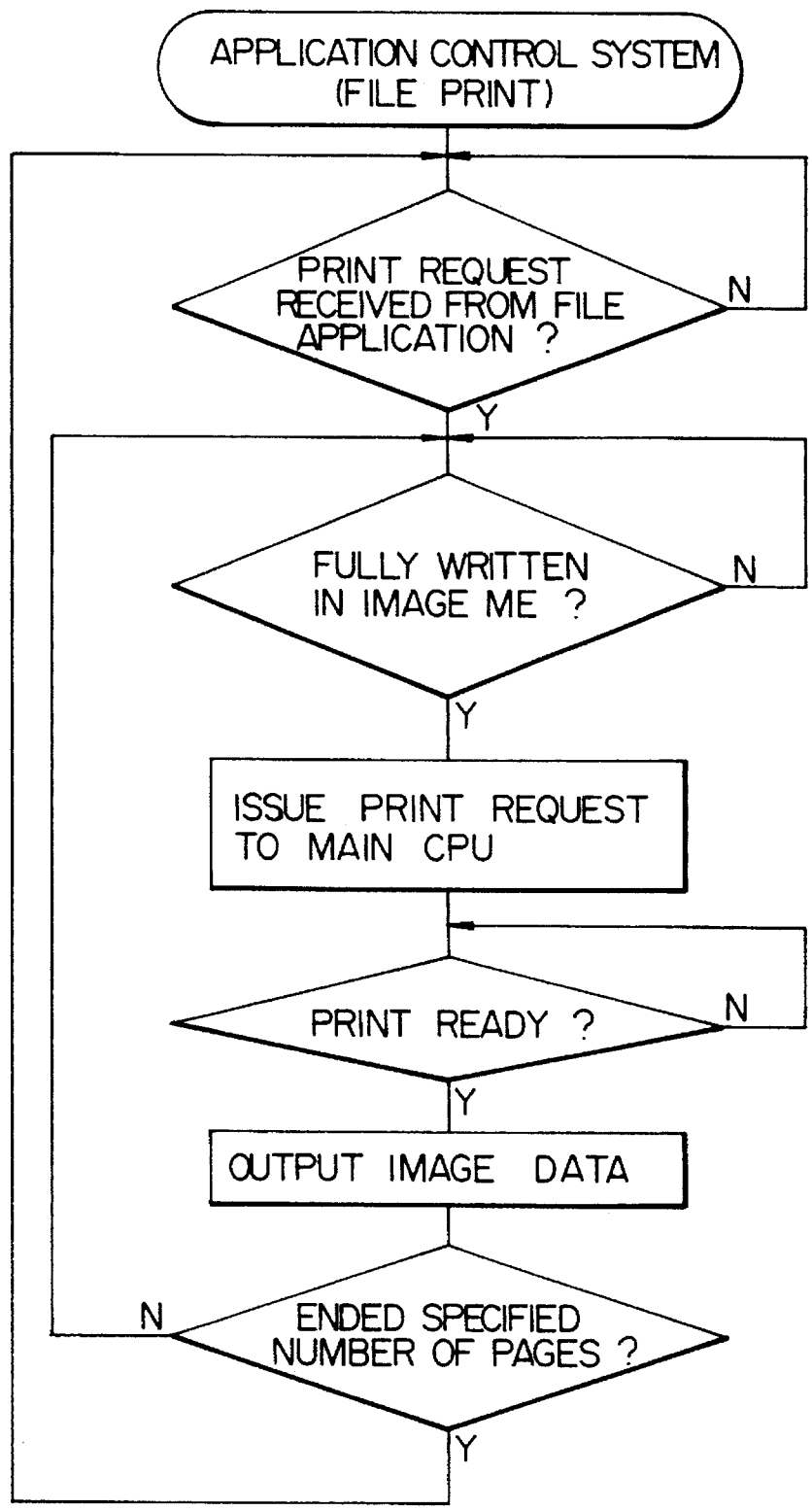

FIG. 23 shows file print processing to be executed by the application controller section 166. As shown, based on the file application software stored in the ROM 214 of the file section 167, the CPU 188 writes, in response to the print request signal from the file section 167, the designated file from the ODD 215 or the hard disk drive 217 in the image memory 195 page by page and then sends a print request to the main CPU 82 via the SCIs 200 and 179. Subsequently, on receiving a print ready signal from the main CPU 82 via the SCIs 179 and 200, the CPU 188 delivers the image data of the image memory 195 to the gate array 112 via the video I/Fs 199 and 176. The print request signal sent from the CPU 188 to the main CPU 82 is checked by the latter as a file sheet feed timing shown in FIG. 14. On the other hand, the print ready signal is sent from the main CPU 82 on the basis of the decision included in the print start check routine shown in FIG. 17. Such a procedure is executed with all of the designated files.

Figure 24B:
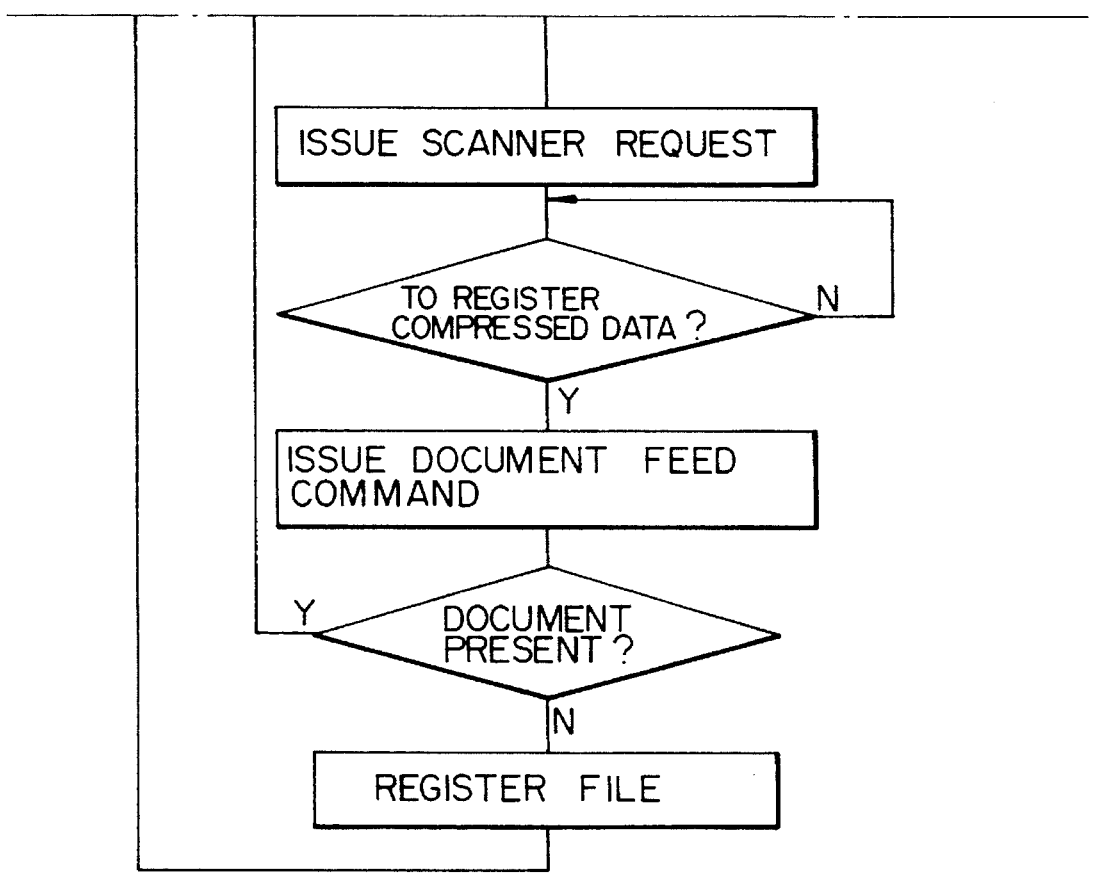

FIG. 24 shows a file registration procedure to be executed by the file section 167. As shown, based on the file application software stored in the ROM 214, the SCSI 217 of the file section 167 determines whether or not a file to register at the file section 167 is present in response to a signal from the operating section. If a file to register is present, the SCSI 217 determines whether or not the file has been designated on the operating section. When the file is designated on a file basis and the print switch is turned on, the SCSI 217 checks the output of the sensor responsive to a document on the document table 67 to see if a document is present on the table 67. If a document is present on the table 67, the SCSI 217 issues a document feed request to the application controller 166.

Subsequently, as the document is set at the reference position on the glass platen 20 of the copier body 11, the SCSI 217 receives a scanner ready signal. In response, the SCSI 217 issues a scanner request signal to the application controller section 166. Further, on receiving image data from the scanner via the image memory 195 (in practice, designated by a pointer in the image memory 195), the SCSI 217 causes the ODD 215 to register the image data at the OD or causes the hard disk drive 216 to register them at the hard disk. Then, the SCSI 217 sends a document discharge signal to the application controller 166, again determines whether or not a document is present on the table 67 of the ADF 12, and, if a document is present, repeats the above sequence. When no documents are found on the table 67, the CPU 188 of the application controller section 166 registers the file name, number of pages and so forth of the image data registered at the ODD 215 or the hard disk drive 216.

Figure 25:
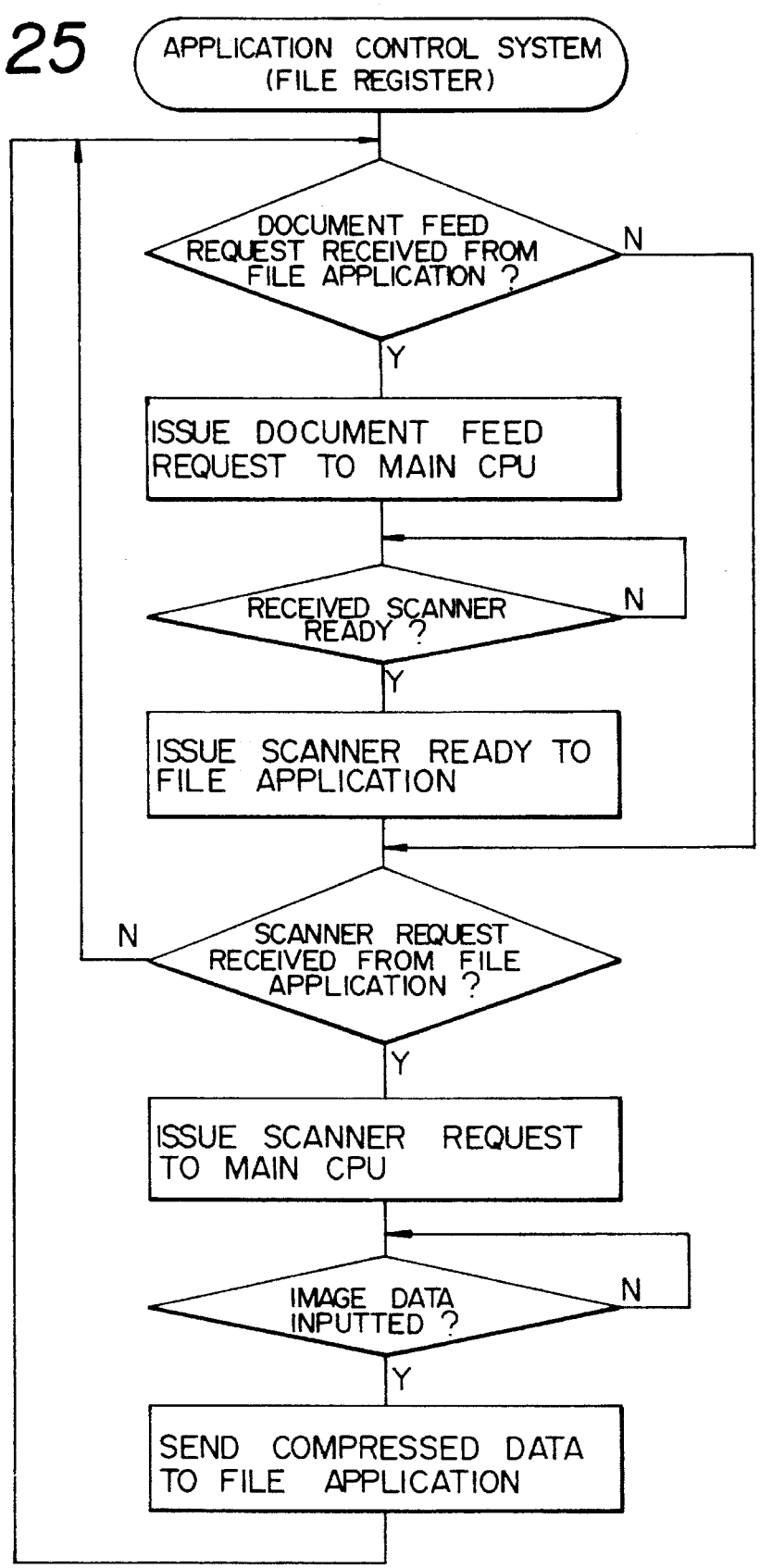

FIG. 25 shows file registration processing to be executed by the application controller 166, i.e., the CPU 188 on the basis of the file application software stored in the ROM 214. As shown, on receiving the document feed request signal from the file section 167, the CPU 188 issues a document feed request signal to the main CPU 82. In response, the main CPU 82 causes the ADF 12 to feed a document from the table 67. Subsequently, on receiving a scanner ready signal from the main CPU 82, the CPU 188 issues a scanner ready signal to the file section 167. As the file section 167 sends a scanner request signal to the CPU 188, the CPU 188 sends a scanner request signal to the main CPU 82. When image data are fed from the scanner to the image memory 195 via the gate array 112, the CPU 188 compresses the image data by the CEP 196 and then transfers the compressed image data to the file section 67 (in practice, designated by the pointer of the memory).

Assume that the main CPU 82 determines that an operator is manipulating the operating section in response to the signal from the operating section or the signal from the operator detecting device. Then, the main CPU 82 controls the operating section such that the display thereof accords to the operator's manipulation in respect of information and mode even when printing is under way at the background (i.e. by a function not used by the operator). Whether or not an operator is manipulating the embodiment can be easily determined on the basis of the period of time elapsed after the last key input on the operating section or in response to, for example, the output of the operator detecting device.

Also, when printing is effected at the background while an operator is not actually operating in front of the embodiment, the main CPU 82 does not change the display of the operating section except for the case wherein the display is associated with an application needing printing at the background. This is because, of the operating section shows the printing at the background on the display thereof, a person walking up to the embodiment for using it is likely to determine that the embodiment is not usable. In addition, the embodiment is capable of effecting interrupt copying during the course of copying in any one of the modes in substantially the same manner as described above.

As stated above, in a system wherein a single machine has a plurality of applications, the embodiment allows a single plotter to execute printing of a plurality of functions (i.e. causes it to operate without interruption). With the embodiment, therefore, it is possible to achieve the maximum performance (printing speed) available with the plotter at all times and, in addition, to make it needless for the operator to take account of applications other than one which he is using. Hence, the machine is ready to operate at all times. At the same time, since the applications other than one being used by the operator can be executed, data inputted to the embodiment can be offered to the user timely.

When an interrupt mode is used, the embodiment gives priority to the printing of an application designated by the interruption. Since the embodiment limits the number of applications to interleave on the basis of the number of bins of the sorter/stacker, it prevents sheets printed by different applications from being mixed together and, therefore, frees the operator from confusion. As environment optimal for a particular user is set up since the user can select desired applications to interleave and the priority order and ratio thereof. Moreover, since the embodiment causes the operating section to accord to the operator in respect of the display and mode, the operator does not have to take account of the applications other than one which he is using and, therefore, can manipulate the machine smoothly.

In the illustrative embodiment, the main CPU 82 of the main control section 171 supervises the scanner, plotter, and operating section while executing the copy mode. Assume that the main CPU 82 receives a print request signal from any one of the applications via the SCI 179 while a copying operation is under way. Then, if the printer section 169 is not used, the main CPU 82 sends a print signal to the sequence control CPU 81 to cause the cassette of the plotter to start feeding a sheet. At the same time, the main CPU 82 conditions the gate array 112 to transfer data from the application to the plotter via the image memory 195. As a result, the data from the application are printed by the plotter. Further, as an application sends a scan request signal to the main CPU 82 via the SCI 179 and if the scanner is not used then, the main CPU 82 sends a scan request signal to the scanner section 172. In response, the scanner section 172 reads a document lad on the glass platen 20. Such a procedure will be described with reference to FIG. 26 hereinafter.

Figure 26B:
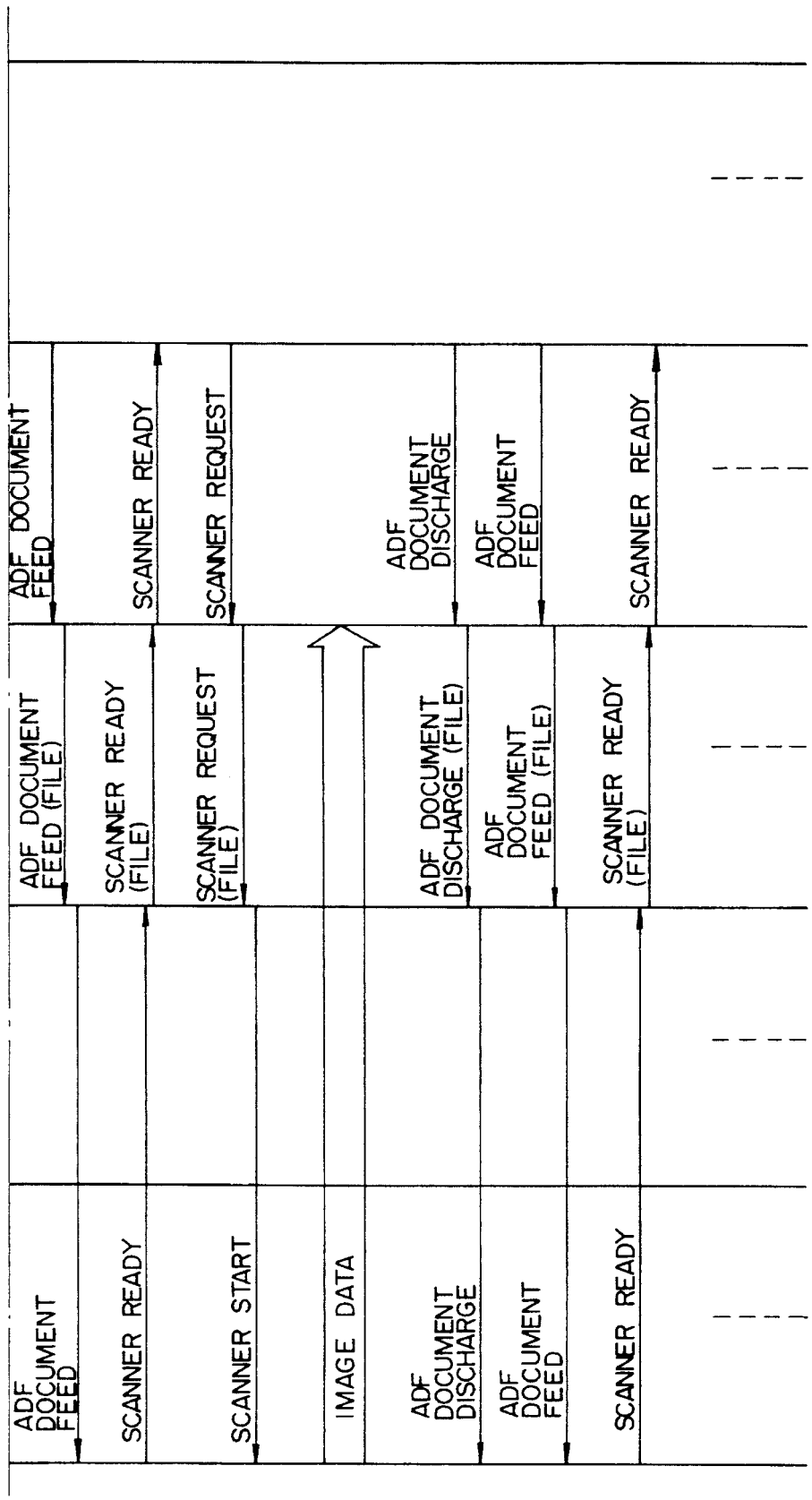
FIG. 26 is a timing chart demonstrating another specific operation of the embodiment.

FIG. 26 shows a specific condition wherein while the ADF 12 is operating in the file mode for continuously registering image data of documents, a print request signal from the facsimile section 168 is received via the SCI 179. As the operator stands in front of the embodiment and presses the "FILE" button on the LCD section 170 to turn on the corresponding touch switch, the CPU 188 starts operating by using the file application software stored in the ROM 214 in response to the resulting signal from the touch switch. Subsequently, the operator selects and presses the "REGIS- TER" button on the LCD section 170 to turn on the associated touch switch, sets documents on the ADF 12, and then presses the start key (print switch) 153 on the operating section 175. Then, the main CPU 82 transfers the resulting signals from the touch switch and start key 153 to the CPU 188 via the SCIs 179 and 200. In response, the CPU 188 sends an ADF feed signal to the CPU 82 via the SCIs 200 and 179 according to the file application software stored in the ROM 214. As a result, the CPU 82 feeds an ADF feed signal to the ADF 12 via the scanner control circuit 114 to cause it to feed a document to the glass platen 20.

As the sensor of the ADF 12 senses the document set at the reference position on the glass platen 20, it sends an output thereof to the CPU 188 via the main CPU 82 as a scan ready signal. In response, the CPU 188 returns a scan start signal to the main CPU 82 on the basis of the file application software of the ROM 214. Consequently, the main CPU 82 causes the scanner to start reading the document via the scanner control circuit 114. As the scanner reads the document, the resulting image data are written to the image memory 195 via the interfaces 176 and 199. When all the image data of the document are read by the scanner, the CPU 188 compresses the image data stored in the image memory 195 by the CEP 196 and writes the compressed data in the OD. The second document and successive documents are sequentially fed by the ADF 12, read by the scanner and written to the OD in the same manner as the first document and at predetermined timings.

On the other hand, assume that the facsimile section 168 has received image data over the subscriber line. Then, the CPU 188 reads the image data out of the SAF memory 211, expands them by the CEP 196, writes the expanded image data in the image memory 195, and then sends a print request signal to the main CPU 82. As the main CPU 82 receives the print request signal and if the printer section 169 is not used, the CPU 82 sends a print signal to the sequence control CPU 81 to cause the plotter to start feeding a sheet. In this case, the main CPU 82 effects the sheet feed in the facsimile mode.

In response to the print signal from the main CPU 82, the sequence control CPU 81 causes the cassette of the plotter to feed a sheet. As the lead edge sensor 51 senses the leading edge of the sheet arrived at the register roller 50, the sequence control CPU 82 returns a print ready signal to the CPU 82. On receiving the print ready signal, the main CPU 82 executing the facsimile mode sends a print ready (facsimile) signal to the application controller section 166. As the CPU 188 receives the print ready (facsimile) signal, it transfers the image data from the application identified by the main CPU 82 (facsimile section 168 in this case) and stored in the image memory 195 to the gate array 112 of the copy section 165 via the interface 199. At the same time, the main CPU 82 sends a signal to the sequence control CPU 81 for causing it to feed a sheet from the cassette of the plotter.

At this instant, the gate array 112 has been so conditioned as to transfer the image data from the image memory 195 to the image control circuit 102 by the main CPU 82. As a result, the image data from the image memory 195 are sent to the writing section via the image control section 102, written on the drum 25, developed by the developing unit, and then transferred to the sheet.

The print request signal from the application is sent to the application controller section 166 at the time when the function operating on the application controller section 166 (function based on the facsimile application software in this case) has fully written the image data in the image memory 195. At this instant, the facsimile application informs the application controller section 166 of the addresses of the image data in the image memory 195 also. In response to the print request signal, the CPU 188 of the application controller section 166 sends a print request signal to the main CPU 82. On receiving a print ready signal from the main CPU 82, the CPU 188 sequentially sends the image data stored in the addresses of the image memory 195 reported from the application (facsimile application in this case) to the application controller section 166.

In the above condition, the operating section being used by the operator for the registration of a file maintains the screen in the file registration state under the control of the main CPU 82. Hence, the operator can proceed with the operation with no regard to the printing of the received facsimile document at the background. Furthermore, since two entirely different devices, i.e., the scanner and the plotter, are used by the application of the operator and another application, each of them can be executed at the maximum speed particular to the machine and without lowering the performance.

As described above, the scanner for reading a document and the plotter for forming an image on a sheet are allowed to perform different operations at the same time by entirely different functions.

Also, when the operator is actually operating in front of the machine, the main CPU 82 controls the operating section 170 and 175 such that the display and mode being used by the operator are maintained despite the printing at the background. This is because, if the operating section shows a faxsimile print picture thereon even for a moment while the operator is continuously inputting a file, the operator will be confused. To maintain the display of the operating section as stated above, the main CPU 82 determines whether or not the operator is manipulating the operating section on the basis of the period of time elapsed after the last key input or the signal from the operator detecting device.

Also, when printing is effected at the background while an operator is not actually operating in front of the machine, the main CPU 82 does not change the display of the operating section except for the case wherein the display is associated with an application needing printing at the background. This is because, if the operating section shows the printing at the background on the display thereof, a person walking up to the machine for using it is likely to determine that the machine is not usable.

As stated above, in a system wherein a single machine has a plurality of applications, the embodiment allows a single plotter to execute printing of a plurality of functions (i.e. causes it to operate without interruption). With the embodiment, therefore, it is possible to achieve the maximum performance (printing speed) available with the plotter at all times and, in addition, to make it needless for the operator to take account of applications other than one which he is using. Hence, the machine is ready to operate at all times. At the same time, since the applications other than one being used by the operator can be executed, data inputted to the embodiment can be timely offered.

As described above, in a system wherein a single machine has a plurality of functions, the embodiment causes a scanner for reading a document and a plotter for forming an image on a sheet to perform different operations at the same time by entirely different functions. This promotes efficient use of the scanner and plotter. Since the operator does not have to take account of functions other than one which he is using, the machine is ready to operate at all times. At the same time, since even the functions other than one being used by the operator can be executed, data inputted to the embodiment can be timely offered to the operator. Moreover, when the embodiment effects printing by a function other than one being used by the operator, the operating section maintains the display and mode being used by the operator, i.e., the operating section does not change printing by printing. This allows the operator to manipulate the machine smoothly without being confused.

Figure 27B:
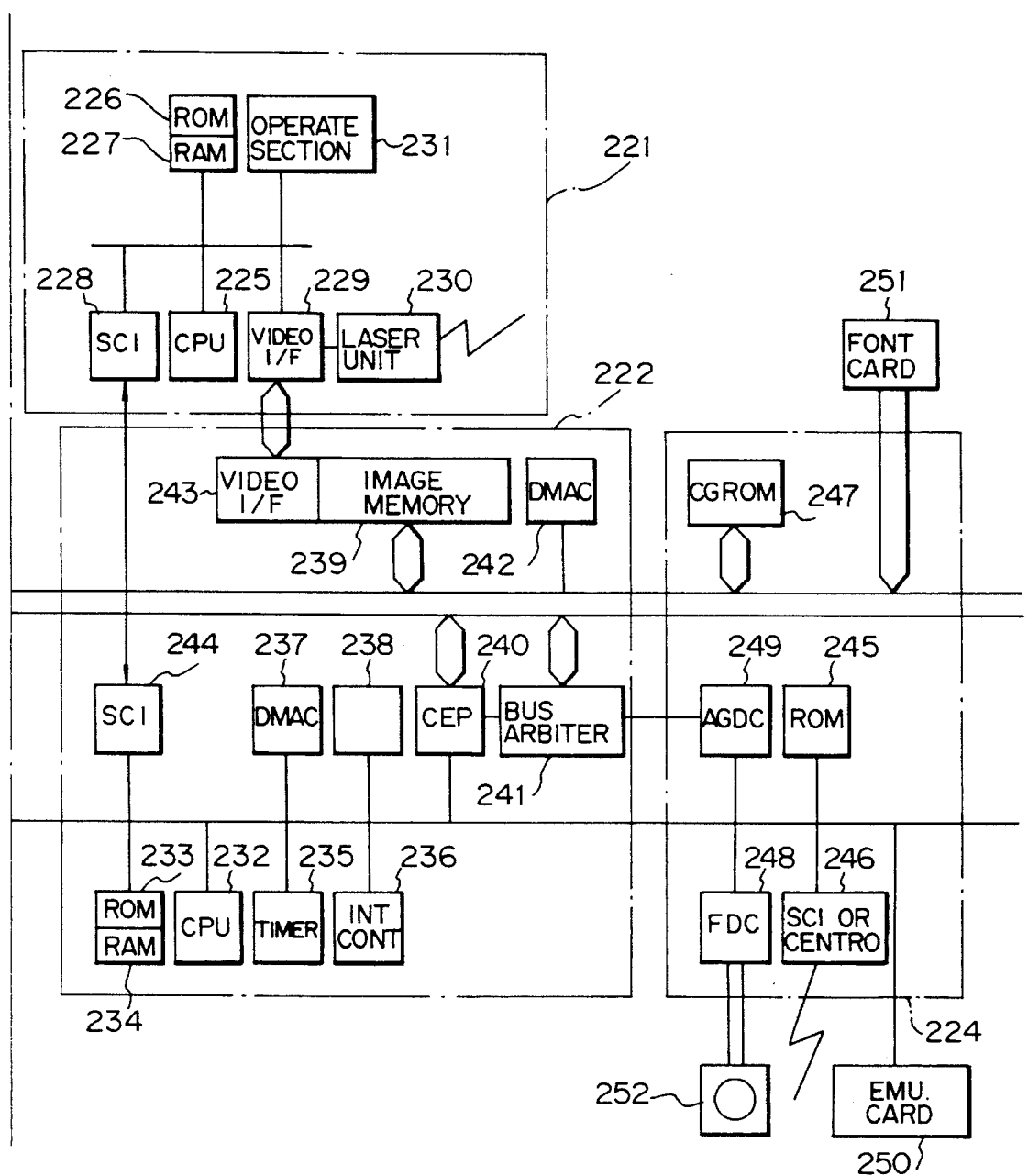
FIG. 27 is a block diagram schematically showing an alternative embodiment of the present invention.

Referring to FIG. 27, an alternative embodiment of the present invention will be described which executes a plurality of functions by using a single laser printer. This embodiment is generally made up of a laser printer section 221 and an application section. The application section has an application controller section 222, a faxsimile section 223, and a printer section 224.

The laser printer section 221 turns on a semiconductor laser thereof in response to image data from the application section, thereby causing it to print the image data. The laser printer section 221 has a CPU 225, a ROM 226, a RAM 227, an SCI 228, a video interface 229, a laser unit 230, and an operating section 231. The laser printer section 221 has a conventional laser printer body for turning on the semiconductor laser as stated above, and a sorter/stacker for distributing printings sequentially coming out of the laser printer body to bins thereof application by application. In the laser printer body, the laser unit 230 modulates the semiconductor laser by image data sent from an image memory 239 included in the application controller section 222 via video interfaces 243 and 229, thereby exposing a photoconductive drum imagewise. The photoconductive drum is rotated by a drive mechanism, uniformly charged by a main charger, and subjected to the exposure to electrostatically form a latent image thereon. The latent image is developed by a developing unit and then transferred to a sheet fed from a sheet feed unit via a register roller.

The application controller section 222 has a CPU 232, a ROM 233, a RAM 234, a timer 235, an interrupt control circuit 236, A DMA controller 237, a rotating section 238 for rotating an image, an image memory 239, a CEP 240, a bus arbiter 241, a DMA controller 242, a video interface 243, and an SCI 244. A multitask OS is stored in the ROM 233 for allowing a plurality of applications to be executed at the same time. The laser printer section 221, facsimile section 223, printer section 224 and LAN 220 are connected to the application controller section 222. Also stored in the ROM 233 are a function of outputting image data from the image memory 239 to the laser printer section 221 via the video interface 243, and a system section for arbitrating the applications.

The printer section 224 includes a ROM 245 storing printer application software to operate on the multitask OS, a communication device 246 for receiving document files from an external system, e.g., RS232C or centronics, a CGROM 247, an FDC 248, and an AGDC 249. The CPU 232 receives a document file from an external system via the communication device 246 by use of the printer application software stored in the ROM 245 and an emulation card 250 implemented by an IC card. Then, the CPU 232 stores the document file in the image memory 239 by using the CGROM 247 and a font card 251 also implemented by an IC card. Further, the CPU 232 controls a floppy disk drive 252 via the FDC 248 to reproduce data out of a floppy disk and stores the data in the image memory 239 via the AGDC 249.

The facsimile section 223 includes a ROM 253 storing faxsimile application software to operate on the multitask OS, a CCU 254 for storing data received over a subscriber line, and SAF memory 255 for holding the received data, a CPU 256 for controlling them, and a RAM 257. The CPU 232 expands the received data stored in the SAF memory 255 and then stores them in the image memory 239 by use of the facsimile application software of the ROM 253, and compresses the image data received from the scanner to the image memory 239 by the CEP 240 and then writes them in the SAF memory 255. Further, the CPU 256 writes the data received via the CCU 254 over the subscriber line in the SAF memory 255 and read them out of the SAF memory 255 to send it over the subscriber line.

In operation, the CPU 232 of the application controller section 222 supervises the laser printer section 221. Assume that while a certain application is printing image data by using the laser printer section 221, another application sends a print request signal to the application controller section 222. Then, the CPU 232 determines whether or not the interleave function is set for the above-mentioned another application and, if it is set, transfers data from the application to the laser printer 221 at the next print timing of the laser printer section 221. As a result, the laser printer section 221 prints the input image data on a sheet. At this instant, the CPU 232 determines which application has sent the print request signal and the priority order and printing ratio of the various functions. If the application of interest does not generate any print request up to the next sheet feed timing of the laser printer section 221, the CPU 232 causes the laser printer section 221 to stop operating. Such a sequence of steps will be described more specifically with reference to FIG. 28.

Figure 28B:
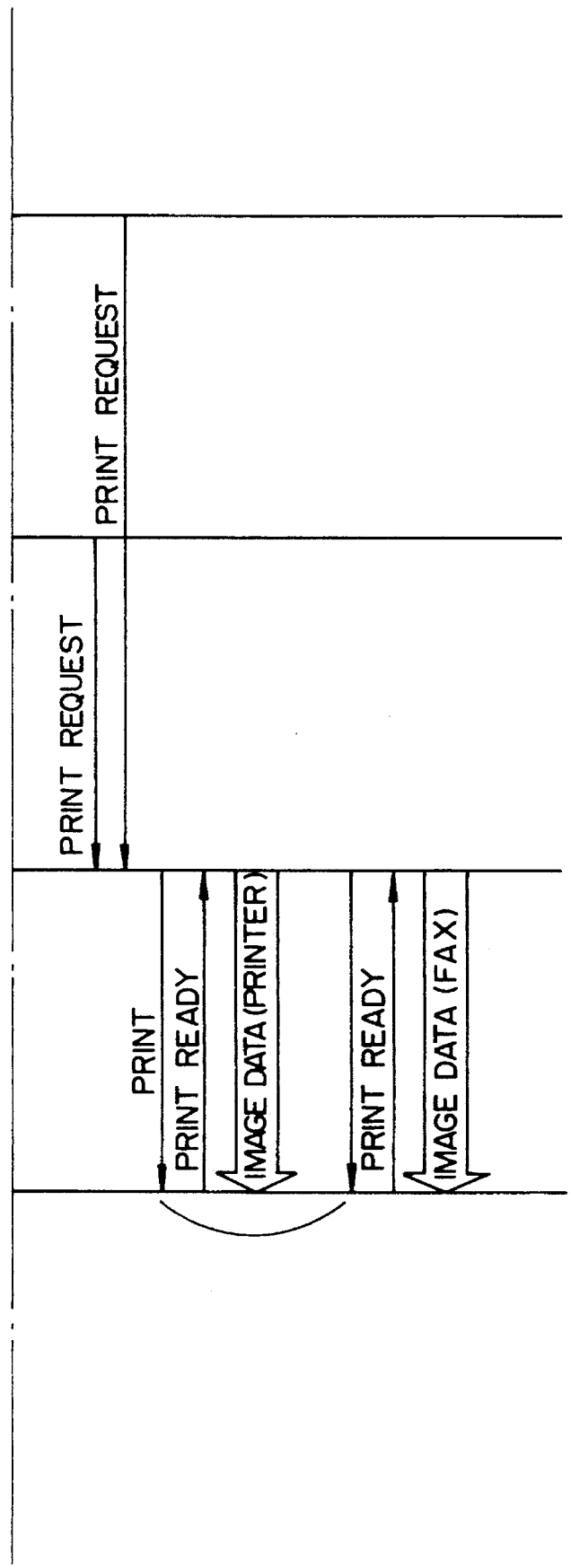
FIG. 28 is a timing chart representative of a specific operation of the embodiment of FIG. 27.

FIG. 28 shows a specific condition wherein while the laser printer section 221 is producing four consecutive printings in the printer mode in response to the data from the printer section 224, the facsimile section 223 generates a print request. As shown, to produce four consecutive printings in the printer mode, the CPU 232 of the application controller section 222 sets "4" in a sheet feed counter. The CPU 232 sends a sheet feed signal to the laser printer section 221 via the SCI 244 and decrements the sheet feed counter to "3". Again, the laser printer section 221 does not have to know which application has generated the print request. On receiving the sheet feed signal via the SCI 228, the CPU 225 causes the laser printer body to start feeding a sheet. As soon as a register switch turns on by sensing the sheet arrived at a register roller, the CPU 225 returns a print ready signal to the application controller section 222 via the SCI 228. The CPU 232 determines which application has sent the print request signal and then whether or not the application of interest (printer section 224) needs printing (application of a timing at which a sheet can be fed by the function to interleave). If the result of this decision is positive, the CPU 232 sends, on receiving a print ready signal from the laser printer section 221 via the SCI 244, image data written to the image memory 239 from the application (printer section 224) to the laser printer section 221 via the video interface 143, thereby causing it to print them out. At the same time, the laser printer body rotates the register roller. The laser unit 230 modulates a semiconductor laser thereof by the image data sent from the application controller section 222 via the video interface 143, thereby forming an image on a photoconductive drum. The image is transferred to a sheet fed from the register roller to produce the first printing.

The CPU 232 causes the laser printer section 221 to feed the second sheet within a predetermined period of time after the feed of the first sheet, while decrementing the sheet feed counter to "2".

As the facsimile section 223 sends a print request signal to the CPU 232 after the second printing has been produced, the CPU 232 increments the sheet feed counter from "2" to "3". The CPU 232 sends a sheet feed signal to the laser printer section 221 via the SCI 244 to cause it to feed the third sheet within a predetermined period of time after the feed of the second sheet, while decrementing the sheet feed counter to "2". On receiving the sheet feed signal from the application controller section 222 via the SCI 228, the CPU 225 of the laser printer section 221 causes the laser printer body to start feeding a sheet. As the register switch turns on by detecting the sheet arrived at the register roller, the CPU 225 returns a print ready signal to the application controller 222 via the SCI 228. At this instant, the CPU 232 determines which application has sent the print request and whether or not the application of interest is one needing printing. If the answer of this decision is positive, the CPU 232 sends, on receiving the print ready signal from the laser printer section 221 via the SCI 244, image data stored in the image memory 239 from the application (facsimile section 223) to the laser printer section 221 via the video interface 143, thereby causing it to print them out. At the same time, the laser printer body rotates the register roller. The laser unit 230 modulates the semiconductor laser by the image data sent from the application controller section 222 via the video interface 143, thereby forming an image on the photoconductive drum. The image is transferred to the sheet fed from the register roller to produce the third printing.

Regarding the print request signal from the application, when the functions operating on the application controller section (printer application software and facsimile application software in this case) fully write the image data in the image memory 239, the signal applies a print request to the CPU 232 which controls the entire application system. At this instant, the printer application and facsimile application also inform the CPU 232 of the addresses of the image memory 239 where the image data are stored. On detecting the print request signal, the CPU 232 sends a sheet feed signal to the laser printer section 221 via the SCI 244. When the CPU 232 receives a print ready signal from the laser printer section 221 via the SCI 244, it sequentially sends image data from the addresses of the image memory 239 designated by the printer application or the facsimile application to the laser printer section 221 via the interface 243.

The CPU 232 sends a sheet feed signal to the laser printer section 221 via the SCI 244 to cause it to feed the fourth sheet within a predetermined period of time after the feed of the third sheet, while decrementing the counter to "1". In the laser printer section 221, as the CPU 225 receives the sheet feed signal from the application controller section 222 via the SCI 228, it causes the laser printer body to start feeding a sheet. As the register switch turns on by detecting the sheet arrived at the register roller, the CPU 255 returns a print ready signal to the application controller section 222 via the SCI 228. On receiving the print ready signal from the laser printer section 221 via the SCI 244, it sends image data written to the image memory 239 from the application (printer section 224) to the laser printer section 221 via the video interface 143, thereby causing it to print them out. At the same time, the laser printer body rotates the register roller. The laser unit 230 modulates the semiconductor laser by the image data sent from the application controller 222 via the video interface 143, thereby forming an image on the photoconductive drum. The image is transferred to the sheet fed from the register roller to produce the fourth printing.

The CPU 232 sends a sheet feed signal to the laser printer section 221 via the SCI 244 to cause it to feed the fifth sheet within a predetermined period of time after the feed of the fourth sheet, while decrementing the sheet feed counter to "0". After the feed of the fifth sheet in the laser printer section 221, the application does not send any print request signal within a predetermined period of time, and the sheet feed counter is "0". Hence, the CPU 232 causes the laser printer section 221 to end the printing operation.

Subsequently, as the facsimile application and printer application send a print request signal to the CPU 232 at the same time, the CPU 232 causes the laser printer section 221 to print image data written to the image memory 239 from the printer section 224 as with the first printing. Thereafter, the CPU 232 causes the laser printer section 221 to print data written to the image memory 239 from the facsimile section 223 as with the third printing. The data from the printer section 224 are printed before the data from the facsimile section 223 since the printer application has priority over the facsimile application.

A reference will be made to FIG. 29 for describing a procedure for setting the interleave function particular to this embodiment. The interleave function is set by the user or the serviceman on the operating section 231. As the user or the serviceman manipulates the operating section 231 to enter an SP (Serviceman Program) mode or similar predetermined mode, the CPU 232 simply returns if only a single application is available. At this instant, the CPU 232 displays a message, e.g., "NO APPLICATIONS AVAILABLE" on the guidance display portion of the operating section 231 for a predetermined period of time and then ends the mode.

If two or more applications are available, the CPU 232 displays a message, e.g., "SET INTERLEAVE? 0:NO 1:YES_" on the guidance display portion. When "0" is selected as indicated by a signal sent from the operating section 231 via the SCIs 228 and 211, the CPU 232 ends the mode. When "1" is selected, the CPU 232 displays on the guidance display portion a message, e.g., "XX APPLICATIONS MAX AVAILABLE. SELECT APPLICATIONS TO INTERLEAVE. 1: FACSIMILE 2:PRINTER_". With such a message, the CPU 232 informs the user or the serviceman of the maximum number of applications which can be interleaved (number of bins of the sorter/stacker) and the applications capable of being interleaved. Watching the message, the user or the operator enters the applications to interleave and the number of bins of the sorter/stacker for receiving printings on the operating section 231. Assume that the sorter/stacker is absent, and that the laser printer body is provided with a single tray. Then, in response to a signal distinguishing the sorter/stacker and the tray, the CPU 232 displays a message, e.g., "IMPOSSIBLE TO INTERLEAVE BECAUSE SORTER/STACKER IS ABSENT" on the guidance display portion and then ends the mode.

The CPU 232 sequentially sets the interleave function application by application, as stated above. When the maximum number of bins available with the sorter/stacker is reached or when the entire interleave setting is completed, the CPU 232 displays a message, e.g., "SET INTERLEAVE PRIORITY ORDER. 1:FACSIMILE 2:PRINTER _, _", thereby urging the serviceman or the user to set a desired priority order.

On completing the interleave setting, the CPU 232 shows a message, e.g., "SET INTERLEAVE RATIO. FACSIMILE:PRINTER=_:_" on the guidance display portion to urge the user or the serviceman to enter a desired printing ratio. By storing the resulting signals from the operating section, the main CPU 82 sets up a desired interleave ratio between the facsimile section 223 and the printer section 224. At such a set printing ratio, the facsimile section 223 and printer section 224 will be accepted when they output a print request signal at the same time.

Specifically, assume that priority is given to facsimile over printer, and that the printing ratio is facsimile:printer= 1:2. Then, the CPU 232 executes printing at the specified ratio, i.e., executes printing with one sheet in the facsimile mode, with two sheets in the printer mode, and again with one sheet in the facsimile mode. Alternatively, the sequence may be divided so long as the ratio is identical with the set ratio. For example, one printing may be sequentially produced for the printer section, facsimile section and again printer section in this sequence.

Figure 30:
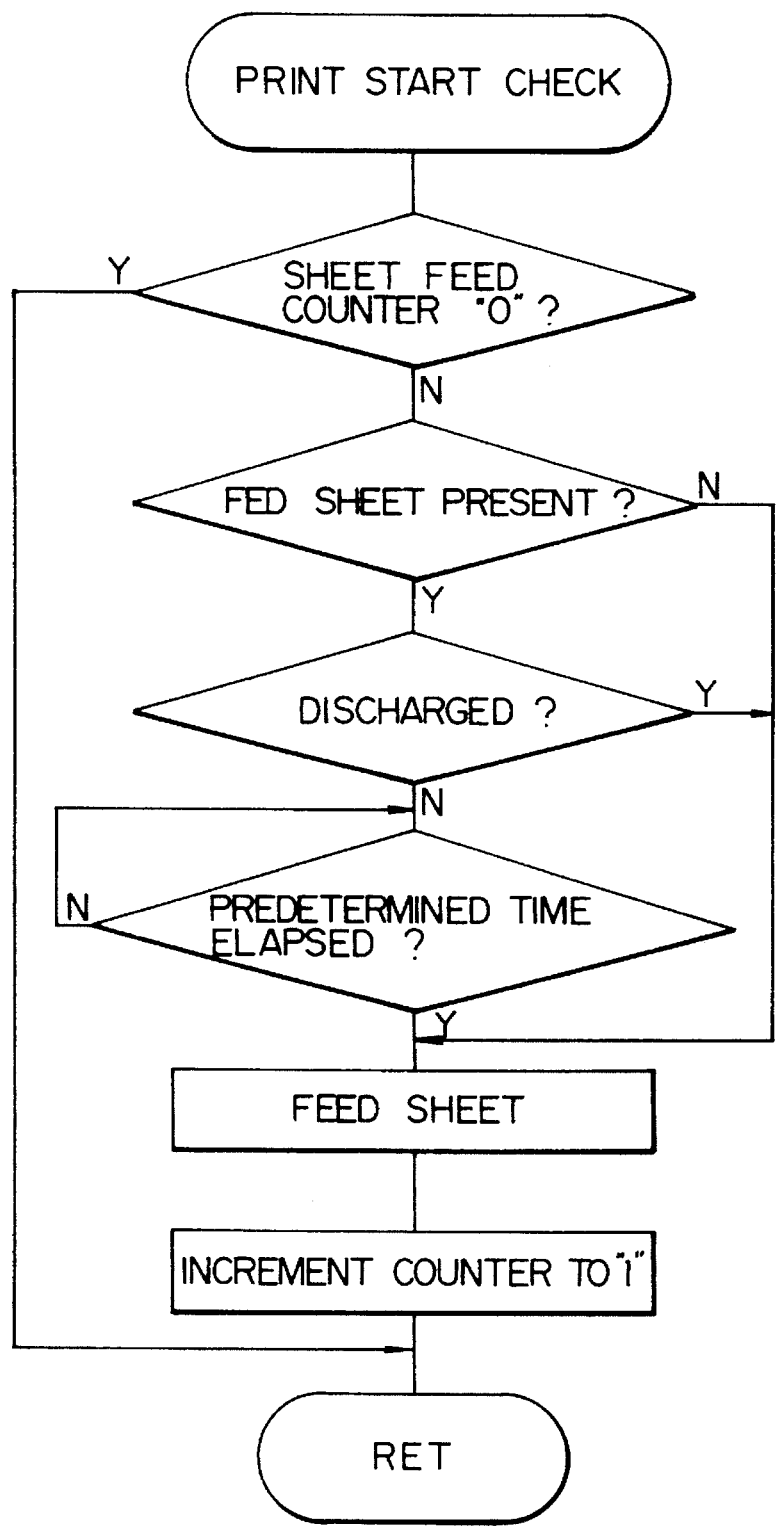

FIG. 30 shows a print start check routine to be executed by the CPU 232 when the interleave mode is set. As shown, the CPU 232 determines whether or not the sheet feed counter is "0" and, if it is "0", returns. If the sheet feed counter is not "0", the CPU 232 determines whether or not a sheet having been fed but not discharged exists in the laser printer body in response to, for example, the output of a particular sensor. If the result of this decision is positive, the CPU 232 determines whether or not a predetermined period of time has elapsed after the feed of the preceding paper. The predetermined period of time mentioned above is determined by the maximum printing speed of the laser printer body beforehand and is also dependent on the image forming process of the laser printer body, i.e., laser writing, of thermal writing as well as on the sheet transport system.

On the elapse of the above-mentioned predetermined period of time, the CPU 232 sets up a print ready state (the laser printer body is ready to operate), regarding that a sheet having been fed but not driven out of the printer body does not exist in the printer body. The CPU 232 causes the laser printer section 221 to start feeding a sheet and decrements the sheet feed counter by 1 (one).

Figure 31:
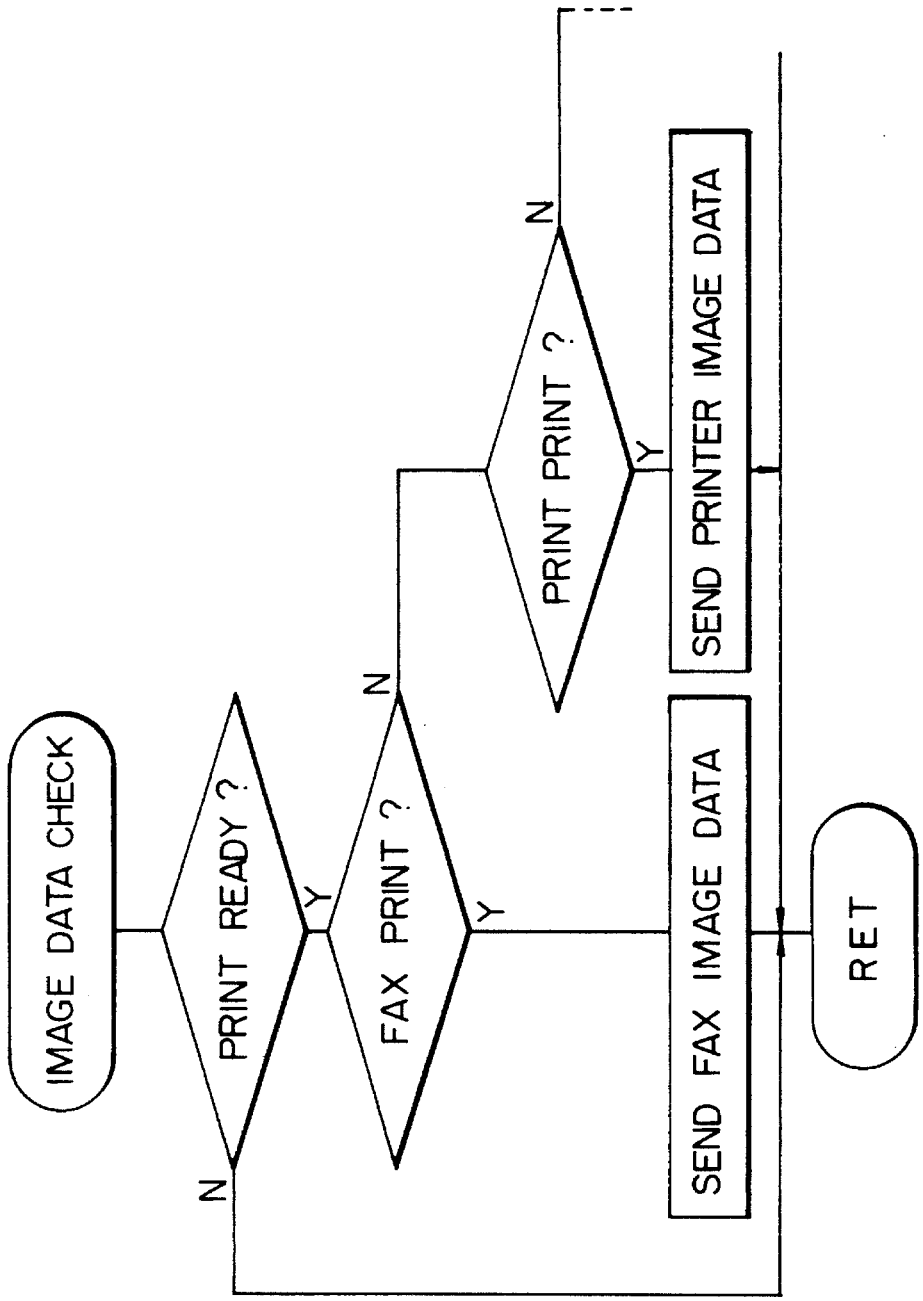

FIG. 31 shows an image data check routine to be also executed by the CPU 232. This routine is executed when the laser printer section 221 sends a print ready signal to the CPU 232 via the SCI 244 in response to the turn-on of the register switch. As shown, the CPU 232 determines whether or not a print ready signal from the laser printer section 221 has arrived via the SCI 244 and, if it has not arrived, simply returns.

Figure 29:
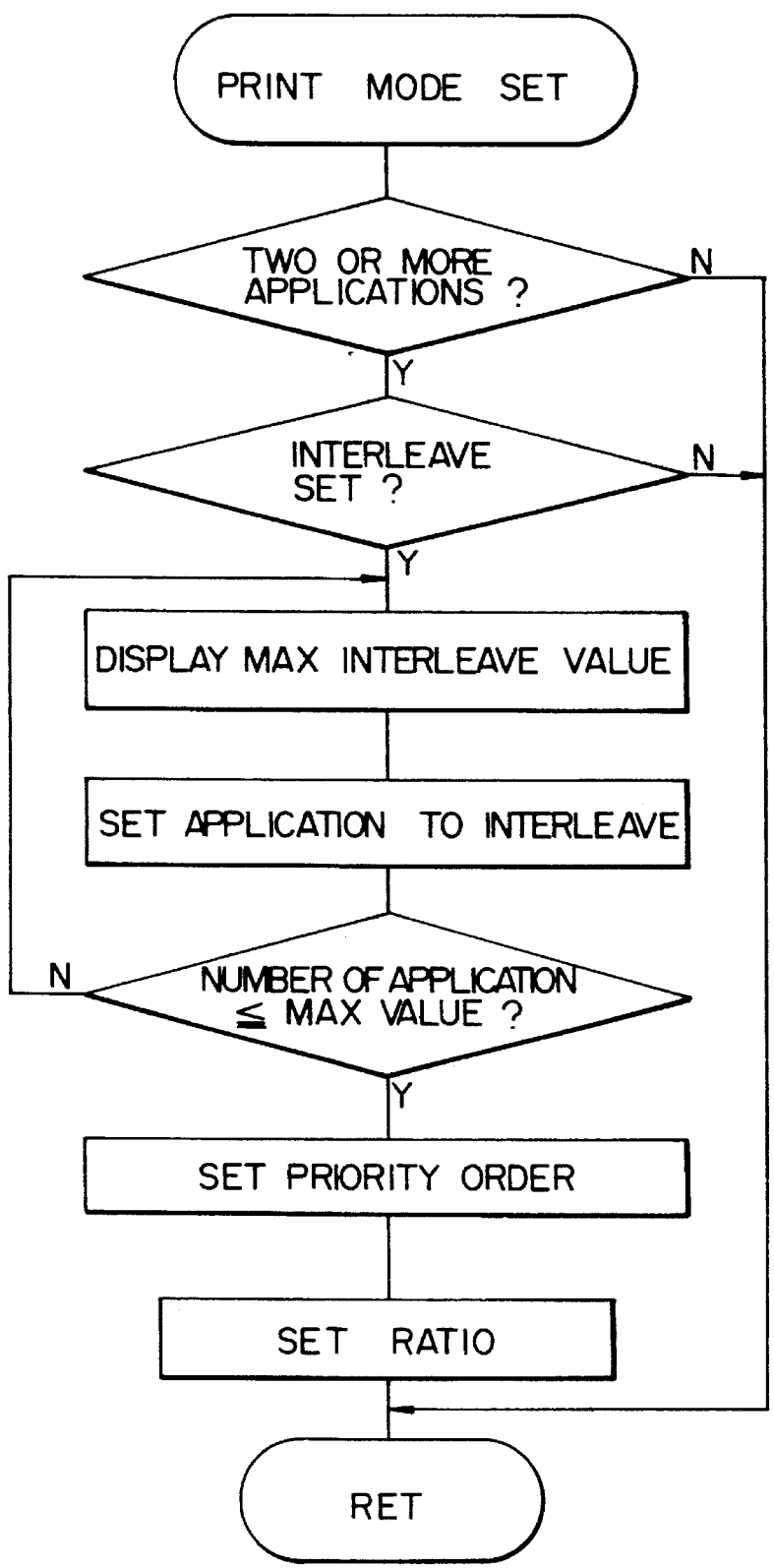
FIGS. 29–31 are flowcharts each demonstrating a particular procedure to be executed by a CPU included in the embodiment of FIG. 27.

On receiving a print ready signal from the laser printer section 221, the CPU 225 determines a mode in which the printer section 221 should print image data, using the contents resulted from the procedure of FIG. 29. Specifically, the CPU 225 determines an application to print on the basis of the kinds of applications to interleave as well as the priority order and printing ratio thereof. To print data from the facsimile section 223 in the facsimile mode, the CPU 225 sequentially sends image data stored in the addresses of the image memory 239 designated by the facsimile section 223 to the laser printer section 221 via the SCI 244. If the application to print is not the facsimile application, the CPU 225 checks the printer application. In the case of the printer application, to print data from the printer section 224 in the print mode, the CPU 225 sequentially sends image data from the addresses of the image memory 239 designated by the printer section 224 to the laser printer section 221 via the SCI 244.

In this embodiment, control means causes the laser printer section 221 to perform printing of a plurality of functions at the same time. Hence, the maximum performance originally available with the laser printer section 221 is attained at all times. This promotes efficient use of the laser printer section 221 and offers data timely to the user. Moreover, the operator does not have to take account of functions other than one which he is using and, therefore, can use the machine any time. Since the number of functions to be executed at the same time is limited to the number of bins available with the sorter/stacker at a maximum, printings produced by different functions are prevented from being mixed together, making it needless for the operator to sort such printings afterwards. Since the user can select functions to be executed together, wasteful printings are eliminated. By giving a desired priority order to the functions to be executed together, the user can obtain printings by the most necessary function first. In addition, by entering a desired printing ratio between the functions to be executed at the same time, the user can obtain the most necessary printings at a higher ratio than the other printings.

Figure 32B:
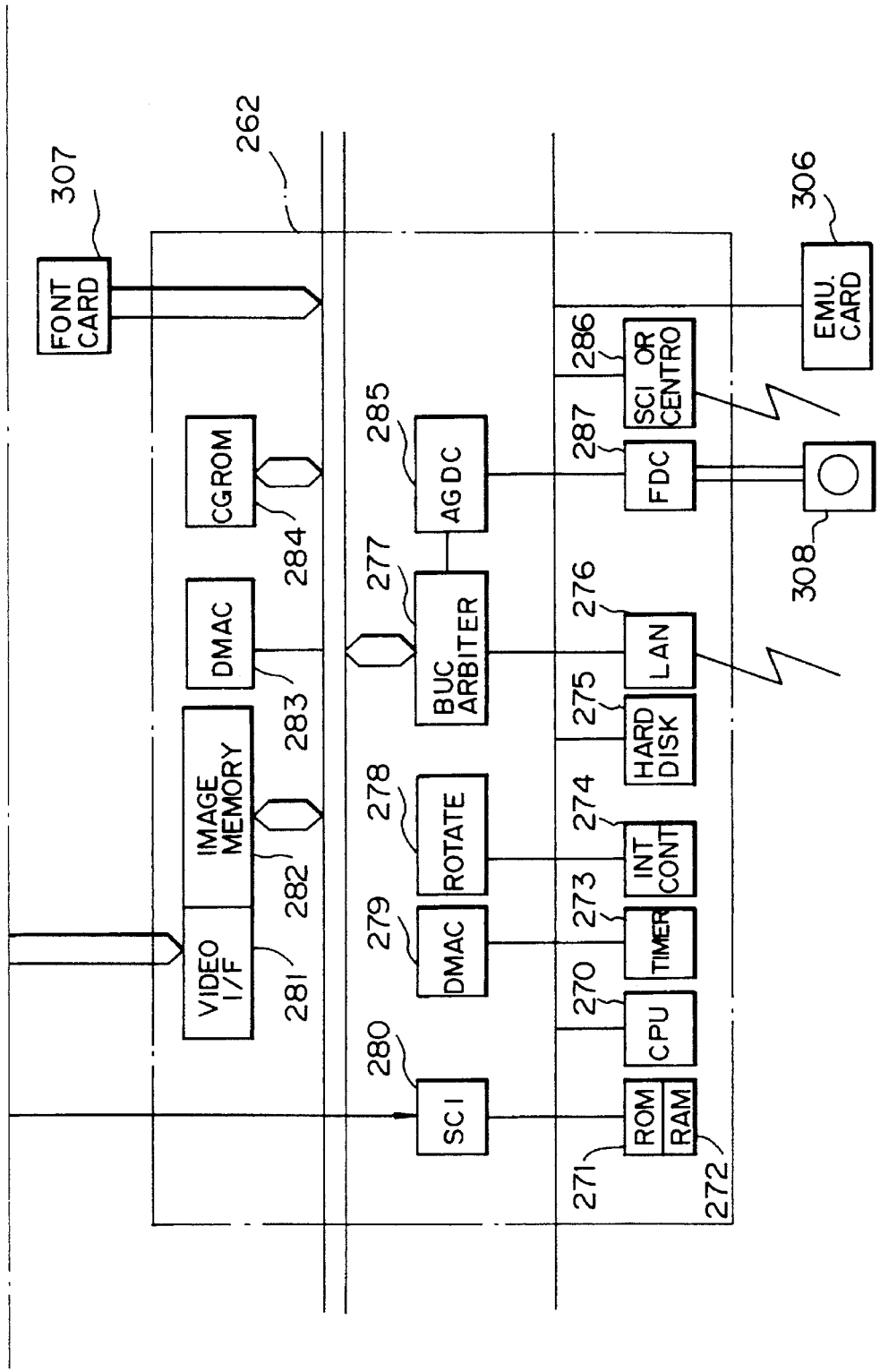
FIG. 32 is a block diagram schematically showing another alternative embodiment of the present invention.

FIG. 32 shows another alternative embodiment of the present invention which causes a single laser printer to print document files sent from a plurality of system equipment. This embodiment is generally made up of a laser printer section 261 and a printer controller section 262.

The laser printer section 261 turns on a semiconductor laser thereof in response to image data sent from the application section. The laser printer section 261 has a CPU 263, a ROM 264, a RAM 265, an SCI 266, a video interface 267, a laser unit 268, and an operating section 269. A laser printer body, which will be described, is included in the laser printer section 261 for turning on the semiconductor laser as mentioned above. A sorter/stacker for distributing printings sequentially coming out of the laser printer body to bins thereof or a single tray is selectively mounted on the laser printer body.

The printer controller section 262 has a CPU 270, a ROM 271, a RAM 272, a timer 273, an interrupt control circuit 274, a hard disk drive 275 capable of storing all the document files which may be sent from a plurality of external system equipment, a LAN 276 for receiving document files from the external system equipment, a bus arbiter 277, a rotating section 278 for rotating an image, a DMA controller 279, an SCI 280, a video interface 281, an image memory 282, a DMA controller 283, a CGROM 284, an AGDC 285, an RS232C for receiving document files from the external system equipment, a centronics or similar communication device 286, and an FDC 287. A multitask OS is stored in the ROM 271 for dealing with document files from the external system equipment at the same time. Also stored in the ROM 271 are a system portion for supervising the laser printer section 261 and image memory 282, and a writing portion for writing document files in the image memory 282. The CPU 270 receives a document file from the external system equipment via the communication device 286 or the LAN 276 by use of the multitask OS of the ROM 271 and an emulation card 306. Then, the CPU 270 writes the document file in the image memory 282 either directly or via the hard disk drive 275 by using the CGROM 284 and a font card 307 implemented by an IC card. Further, the CPU 270 writes the document file from the floppy disk drive 308 in the image memory 195 via the FDC 287 either directly or via the hard disk drive 275 by using the AGDC 285.

Figure 33:
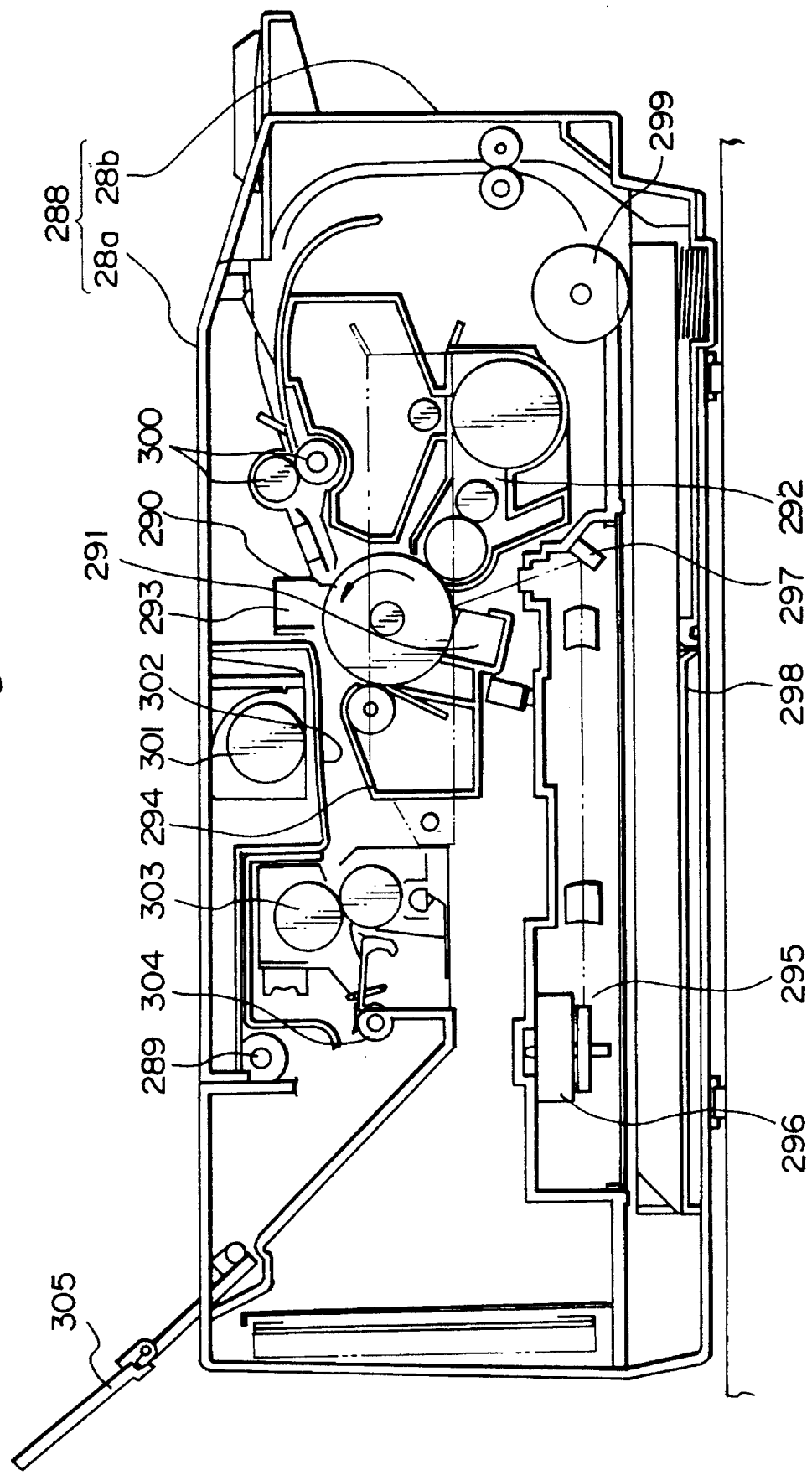
FIG. 33 is a timing chart representative of a specific operation of the embodiment of FIG. 32.

FIG. 33 shows the construction of the laser printer body. As shown, the laser printer body 288 has upper body part 288a and lower body part 288b. The upper body part 288a is hinged to the lower body part 288b by a shaft 289. An image carrier in the form of a photoconductive drum 290 is located at substantially the center of the laser printer body 288. A main charger 291, a developing unit 292, an image transfer unit 293 and a cleaning unit are sequentially arranged around the drum 290 in an intended direction of rotation of the drum 290.

The drum 290 is rotated by a drive mechanism in a direction indicated by an arrow in the figure, while being uniformly charged by the main charger 291. A laser beam issuing from an optical writing unit 295 scans the charged surface of the drum 290 to electrostatically form a latent image thereon. Specifically, the developing unit 292 develops the latent image to produce a corresponding toner image. The optical writing unit 295 has a laser unit 268 for modulating a semiconductor laser by image data from the video interface 267. As a result, a laser beam issuing from the laser has an intensity which varies with the image data. The laser beam is steered by a polygonal mirror 296 to scan the drum 290 via optics including a mirror 297.

Sheets stacked on a sheet cassette 298 may be fed one by one toward a register roller 300 by a pick-up roller 299. The register roller 300 drives a sheet from the cassette 298 at such a timing that the leading edge of the sheet meets that of the toner image formed on the drum 290. After the image transfer, the sheet is transported while being sucked onto a transport guide 302 by a suction fan 301. After the toner image has been fixed on the sheet by a fixing unit 303, the sheet is driven out to a tray 305 by a discharge roller 304. If desired, the discharge tray 305 may be replaced with the sorter/stacker included in the first-described embodiment. Then, the sorter/stacker will distribute sheets sequentially driven out by the discharge roller 304 to bins thereof while separating them on a system equipment basis.

In operation, the CPU 270 of the printer controller 262 supervises the laser printer section 261. Assume that while the laser printer section 261 is printing a document file sent from certain system equipment, another system equipment sends a document file to the CPU 270. Then, the CPU 270 determines whether or not the interleave function is set for another system equipment mentioned above. If the interleave function is set, the CPU 270 writes the document file from the system equipment of interest in the image memory 282 and causes it to be printed at the next sheet feed timing of the laser printer section 261. At this instant, the CPU 270 determines which system equipment has sent the document file as well as the priority order and printing ratio of the functions. When a document file from the system equipment is not written to the image memory 282 up to the next sheet feed timing of the laser printer section 261, the CPU 270 causes the laser printer section 261 to stop operating. Such a sequence of steps will be described more specifically with reference to FIG. 34.

Figure 34B:
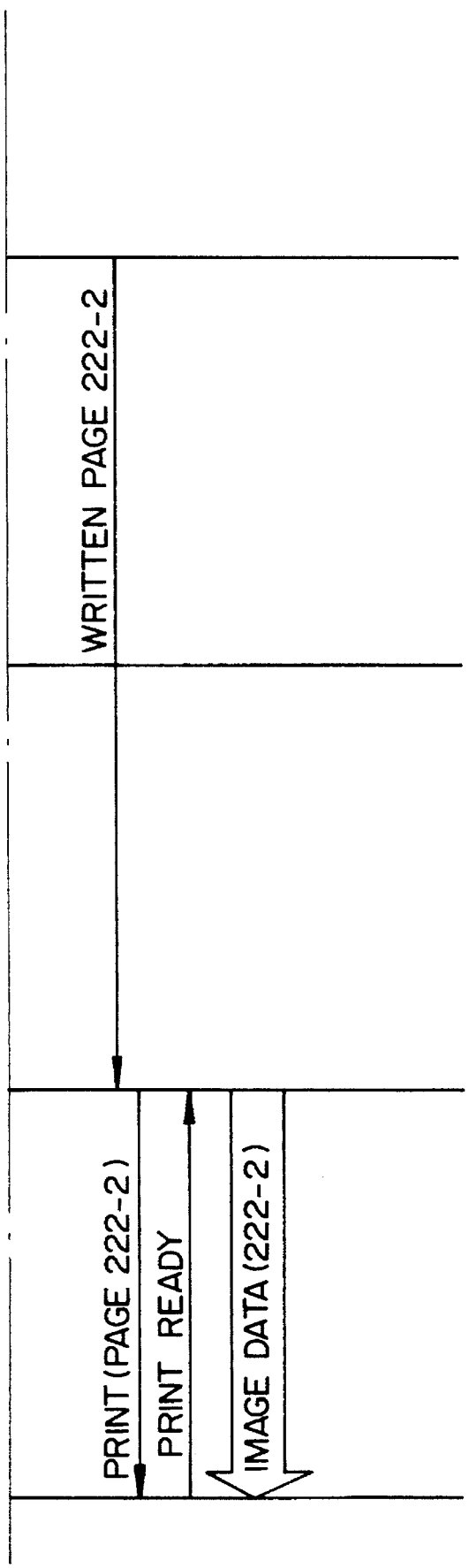
FIGS. 34–36 are flowcharts each demonstrating a particular procedure to be executed by a CPU included in the embodiment of FIG. 33.

FIG. 34 shows a specific condition wherein while three pages of a file are received from first system equipment 111 and are to be continuously printed, second system equipment 222 sends a document file. As shown, the CPU 270 writes the three pages of the document file from the first equipment 111 in the image memory 282 and then sends a sheet feed signal to the laser printer section 261 via the SCI 280. Here, the laser printer section 261 does not have to know which system equipment has sent the document file. On receiving the sheet feed signal via the SCI 266, the laser printer section 261 causes the laser printer body 288 to start feeding a sheet. As soon as the sheet arrives at the register roller 300, a register switch turns on with the result that the laser printer section 261 returns a print ready signal to the printer controller 262 via the SCI 266. The CPU 270 sends, among the image data of three pages of document file sent from the equipment 111 and stored in the image memory 282, the image data of the first page to the laser printer section 261 via the video interface 281. At the same time, the CPU 263 rotates the register roller. As the laser unit 268 receives the image data from the printer controller section 262 via the video interface 267, the laser printer body 288 forms an image on the drum 290. The image is transferred to a sheet to produce a printing.

The data of the document file from the second system equipment 222 are not fully written to the image memory 282 within a predetermined period of time after the feed of the first sheet. Hence, the CPU 270 sends a sheet feed signal to the laser printer section 261 via the SCI 280 in order to print the second page of the file received from the first system equipment 111. On receiving the sheet feed signal from the printer controller 262 via the SCI 266, the laser printer section 261 causes the laser printer body 288 to start feeding a sheet. As soon as the register switch detects the sheet arrived at the register roller 300, the laser printer section 261 returns a print ready signal to the printer controller section 262 via the SCI 266. The CPU 270 sends the image data of the second page stored in the image memory 282 to the laser printer section 261 via the video interface 281. As a result, the laser printer body 288 prints the second page in the same manner as with the first page.

The first page of the file from the second system equipment 222 is fully written to the image memory 282 within a predetermined period of time after the second sheet has been fed by the printer controller section 262. Hence, the CPU 270 sends a sheet feed signal to the laser printer section 261 via the SCI 280 to print the first page of the file on the elapse of the above-mentioned predetermined period of time.

At this instant, the CPU 270 determines which document file belongs to which system equipment and whether or not the system equipment needs printing (equipment of a timing at which a sheet can be fed by the function set in the interleave mode). If the result of this decision is positive, the CPU 270 sends a sheet feed signal to the laser printer section 261 via the SCI 280. On receiving the sheet feed signal from the printer controller section 262 via the SCI 266, the laser printer section 261 causes the laser printer body 288 to start feeding a sheet. As soon as the register switch turns on by detecting the sheet arrived at the register roller 300, the laser printer section 261 returns a print ready signal to the printer controller section 262 via the SCI 266. As the CPU 270 receives the print ready signal via the SCI 280, it sends the first page of the file from the second system equipment 222 stored in the image memory 282 and determined to need printing at the time of sheet feed to the laser printer section 261 via the video interface 281. As a result, the laser printer body 288 prints the first page.

As the CPU 270 fully writes a document file received from external system equipment via the communication device 286 or the LAN 276 in the image memory 282 by the writing portion of the ROM 271, it generates a print request while informing the addresses of the image memory 282 where the document file are stored and an equipment number. As the system portion of the ROM 271 detects the print request, a sheet feed signal is fed to the laser printer section 261 via the SCI 280. On receiving a print ready signal from the laser printer section 261 via the SCI 280, the CPU 270 sequentially sends the image data stored in the reported addresses to the laser printer section 261 via the video interface.

Even after the feed of the third sheet in the laser printer section 261, the document file from the second system equipment has not been fully written to the image memory 282 within a predetermined period of time. Hence, the CPU 270 sends a sheet feed signal to the laser printer section 261 via the SCI 280 to print the third page of the file received from the first system equipment 111. In response, the laser printer section 261 feeds the fourth sheet. On receiving a print ready signal from the laser printer section 261 via the SCI 280, the CPU 270 sends the image data of the third page from the image memory 282 to the laser printer 261 via the video interface 281. Consequently, the laser printer body 288 prints the third page of the file from the first system equipment 111. As a result, all the pages of the document file from the first system equipment 111 have been printed.

The document file from the second system equipment 222 has not fully been written to the image memory 282 within a predetermined period of time even after the feed of the fourth sheet. Hence, the CPU 270 does not send a sheet feed signal to the laser beam printer 261. Subsequently, as soon as the document file from the second system equipment 222 is fully written to the image memory 282, the CPU 270 sends a sheet feed signal to the laser printer section 261 via the SCI 280 to cause it to feed the fifth sheet. On receiving a print ready signal from the laser printer section 261, the CPU 270 sends the second page of the file from the second system equipment 222 to the laser printer section 261 via the video interface 281. As a result, the laser beam printer body 288 prints the second page from second system equipment 222.

Figure 35:
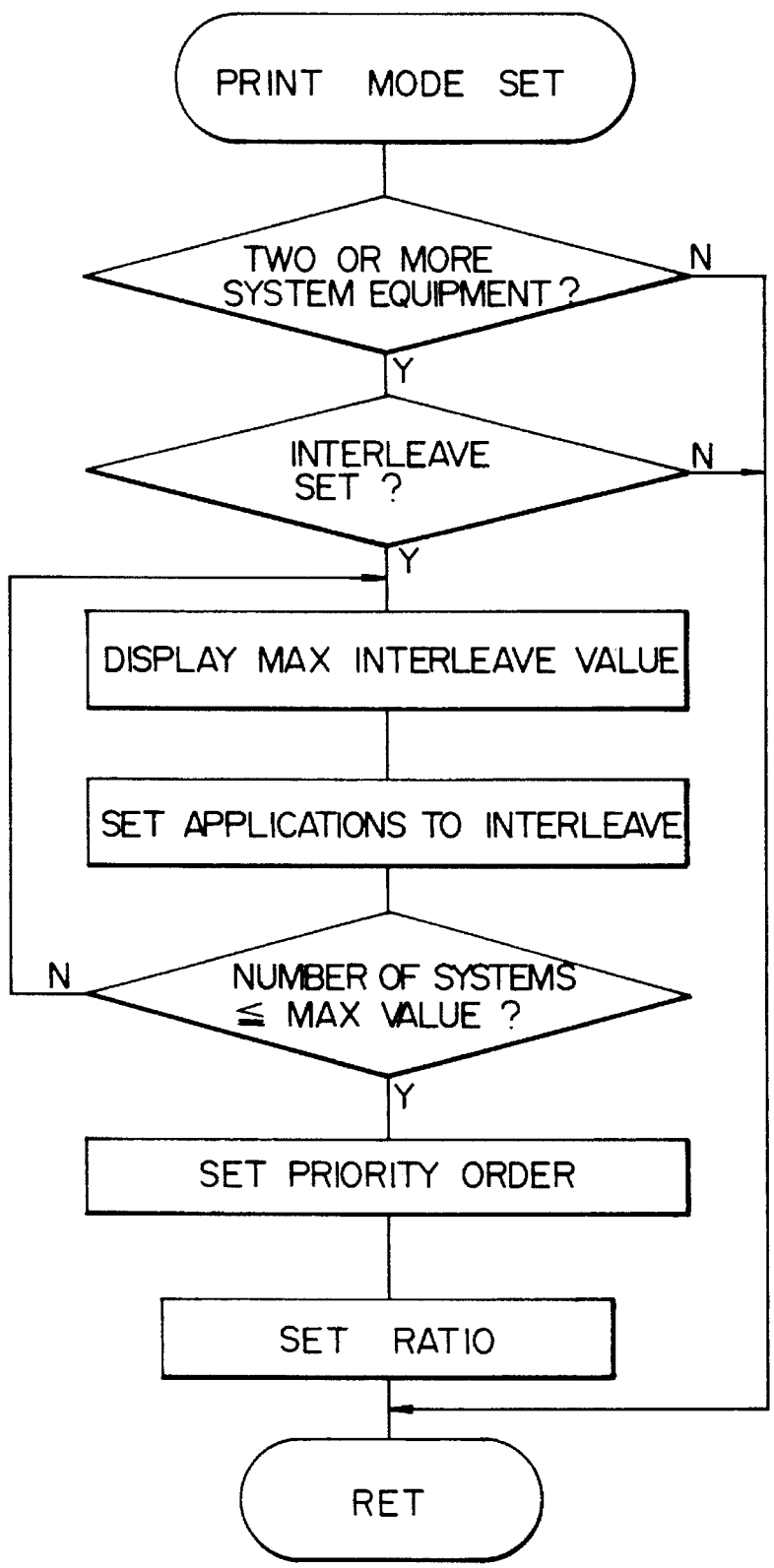

A reference will be made to FIG. 35 for describing a procedure for setting the interleave function particular to this embodiment. The interleave function is set by the use or the serviceman on the operating section 269. As the user or the serviceman manipulates the operating section 269 to enter an SP (Serviceman Program) mode or similar predetermined mode, the CPU 270 simply returns if only one system equipment is available as indicated by an input signal from the operating section 269 routed through the SCIs 266 and 280. At this instant, the CPU 232 displays a message e.g., "NO SYSTEM EQUIPMENT AVAILABLE" on the guidance display portion of the operating section 269 for a predetermined period of time and then ends the mode.

If two or more system equipment are available, the CPU 270 displays a message, e.g., "SET INTERLEAVE? 0:NO 1:YES_" on the guidance display portion. When "0" is selected as indicated by a signal sent from the operating section 269, the CPU 270 ends the mode. When "1" is selected, the CPU 270 displays on the guidance display portion a message, e.g., "XX APPLICATIONS MAX AVAILABLE SELECT SYSTEM EQUIPMENT TO INTERLEAVE. _, _, _". With such a message, the CPU 270 informs the user or the serviceman of the maximum number of system equipment which can be interleaved (number of bins of the sorter/stacker) and sets the system equipment to interleave by storing signals from the operating section (i.e. sets network addresses). Assume that the sorter/stacker is absent, and that the laser printer body 288 is provided with a single tray 305. Then, in response to a signal distinguishing the sorter/stacker and the tray, the CPU 270 displays a message, e.g., "IMPOSSIBLE TO INTERLEAVE BECAUSE SORTER/STACKER IS ABSENT" on the guidance display portion and then ends the mode.

The CPU 270 sequentially sets the system equipment by the above procedure. As soon as the maximum number of bins available with the sorter/stacker is reached or the interleave setting is completed, the CPU 270 displays a message, e.g., "SET INTERLEAVE PRIORITY ORDER. _, _, _" on the guidance display portion. Then, the operator gives a desired priority order to the system equipment in terms of network addresses.

Subsequently, the CPU 270 shows a message, e.g., "SET INTERLEAVE RATIO. XXX:XXX:XXX=_:_:_" in the guidance display portion. As the operator sets a desired printing ratio for document files from the various system equipment on the operating section 269, the CPU 270 memorizes the entered ratio in response to the resulting signals from the operating section 369. At such a printing ratio, document files from the various system equipment will be accepted when they generate a print request at the same time.

For example, assume that the operator has entered a priority order of A, C and B and selected a ratio of A:C:B= 2:1:1. Then, the CPU 270 causes two pages of a document file from the system equipment 111 to be printed, then one page of a document file from system equipment 333 to be printed, then one page of a document file from the system equipment 222 to be printed, and again two pages of the document file from the system equipment 111 to be printed. Of course, the printing ratio may be divided so long as the ratio is identical with the set ratio. For example, one page of a document file from the system equipment 111, one page of the document file from the system equipment 333, one page of the document file from the system equipment 111 and one page of a document file from the system equipment 222 may be sequentially printed in this order.

Figure 36:
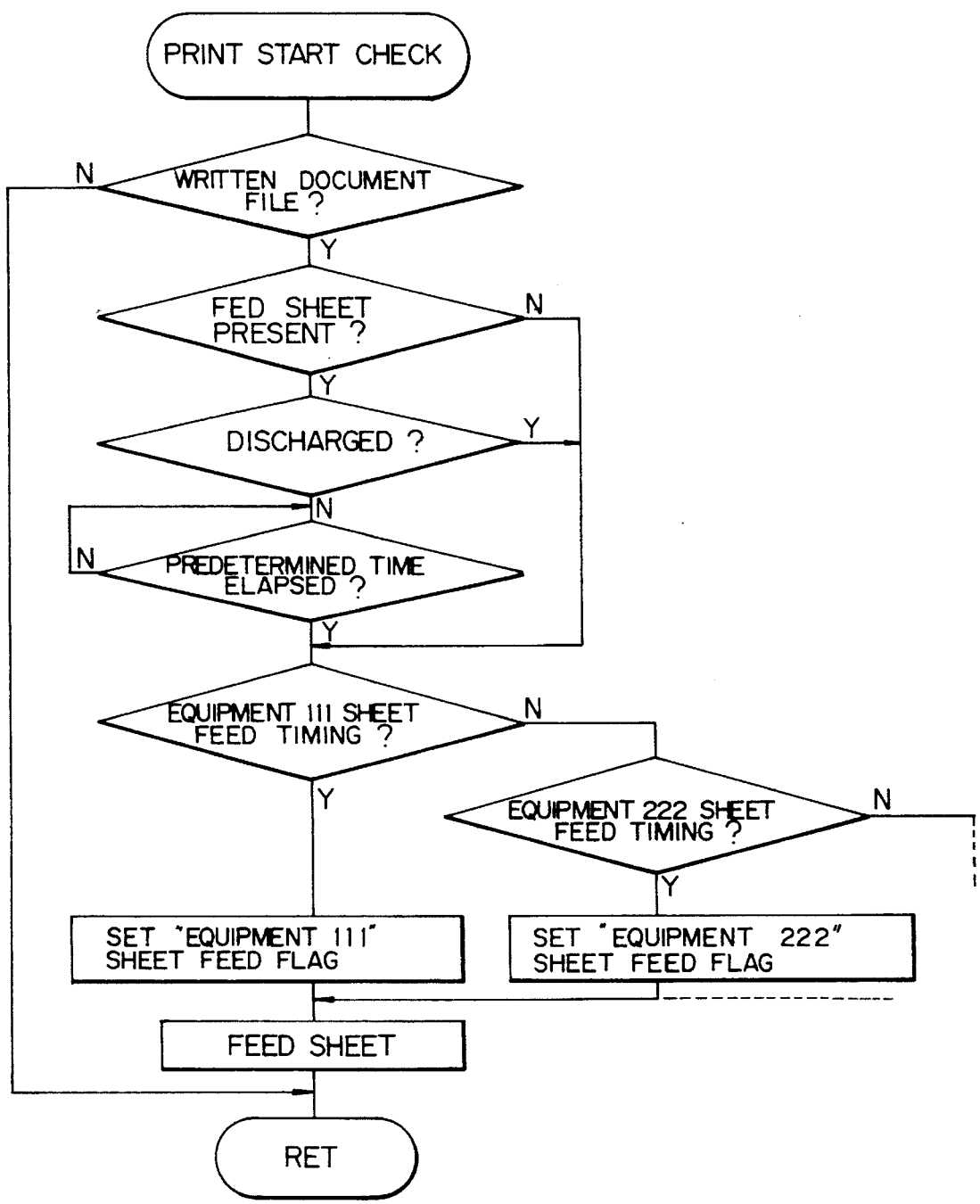

A print start check routine to be executed by the CPU 270 will be described with reference to FIG. 36. This routine is executed when the interleave mode is set. As shown, the CPU 270 determines whether or not a document file from any system equipment has been stored in the image memory 282 and, if the answer is negative, simply returns. If a document file or files are present in the image memory 282, the CPU 270 determines whether or not a sheet having been fed but not driven out of the laser printer body 288 exists in the printer body 288 in response to, for example, the output of a particular sensor. If such a sheet exists in the laser printer body 28, the CPU 270 determines whether or not a predetermined period of time has elapsed after the feed of the preceding sheet. This predetermined period of time is determined by the maximum printing speed of the laser printer body 288 beforehand and is also dependent on the image forming process of the printer body 288, i.e., laser writing or thermal writing as well as on the sheet transport system.

On the elapse of the predetermined period of time, the CPU 270 sets up a print ready state (the laser printer body 288 is ready to operate) by regarding that a sheet having been fed but not driven out of the printer body 288 is absent. Subsequently, the CPU 270 determines a mode in which a sheet should be fed on the basis of the contents resulted from the procedure of FIG. 35. Specifically, the CPU 270 determines system equipment for which the sheet feed is meant on the basis of the kinds of system equipment to interleave as well as the priority order and printing ratio thereof. Then, the CPU 270 sets, among sheet feed flags each being associated with respective ones of the system equipment 111, 222, 333 and so forth, a flag associated with the identified system equipment. As a result, the laser printer body 288 starts feeding a sheet.

FIG. 37 shows an image data check routine to be also executed by the CPU 270. This routine is executed when the laser printer section 261 sends a print ready signal in response to the turn-on of the register switch which is responsive to a sheet arrived at the register roller 300. As shown, the CPU 270 determines whether or not a print ready signal from the laser printer section 261 has arrived via the SCI 280 and, if the answer is negative, returns without executing the routine.

On receiving a print ready signal from the laser printer section 261, the CPU 270 checks the sheet feed flag set at the beginning of sheet feed. If the sheet feed flag associated with the system equipment 111 is set, the CPU 270 resets it and then sends a document file from the system equipment 111 stored in the image memory 282 to the laser beam printer 261 via the video interface 281. If the above-mentioned sheet feed flag is not set, the CPU 270 checks the sheet feed flag associated with the system equipment 222. If this flag is set, the CPU 270 resets is and then sends a document file from the system equipment 222 stored in the image memory 282 to the laser printer section 261 via the video interface 281. This is also true with the other system equipment.

In the illustrative embodiment, the CPU 270 determines particular system equipment whose document file should be printed at a sheet feed timing. However, such a decision should only be made before the laser printer section 261 sends a print ready signal. Specifically, assume that a plurality of document files have been stored in the image memory 282 when the laser printer section 261 sends a print ready signal to the CPU 270. Then, the CPU 170 has only to determine the printing order of such document files on the basis of the contents resulted from the procedure of FIG. 35.

The embodiment has been shown and described as writing document files received from a plurality of system equipment in the image memory 282 at the same time. When such document files cannot be stored in the image memory 282 at the same time, the CPU 270 will determine an order in which the document files are to be written to the image memory 282 on the basis of the contents set by the procedure of FIG. 35.

In this embodiment, document files received from a plurality of system equipment are printed by a single laser printer section at the same time. Hence, the maximum performance (printing speed) originally available with the laser printer section is attained at all times. This promotes efficient use of the laser printer section and offers data timely to the user. Since the number of system equipment capable of sharing the laser printer section at the same time is not greater than the number of bins available with the sorter/stacker, printings associated with different system equipment are prevented from being mixed together, making it needless for the operator to sort such printings afterwards. Since the user can select system equipment to share the laser printer section at the same time, wasteful printings are eliminated. By giving a desired priority order to system equipment capable of sharing the laser printer section, the user can obtain printings associated with the most necessary system equipment first. In addition, by entering a desired printing ratio of external system equipment to share the laser printer section, the user can obtain the most necessary printings at a higher ratio than the other printings.

Figure 38A:
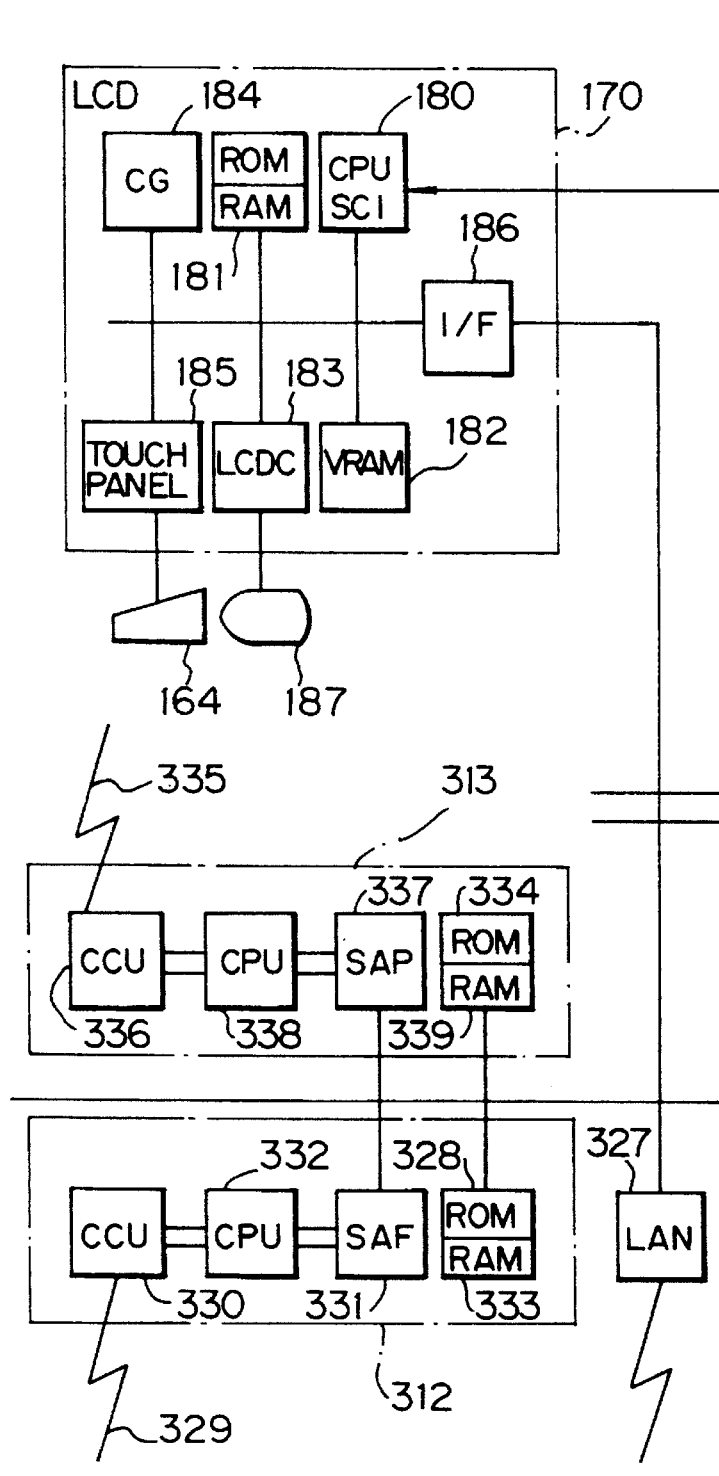
FIG. 38 shows a file format of an SAF (Stack And Forward) memory included in the embodiment of FIG. 37.
Figure 38B:
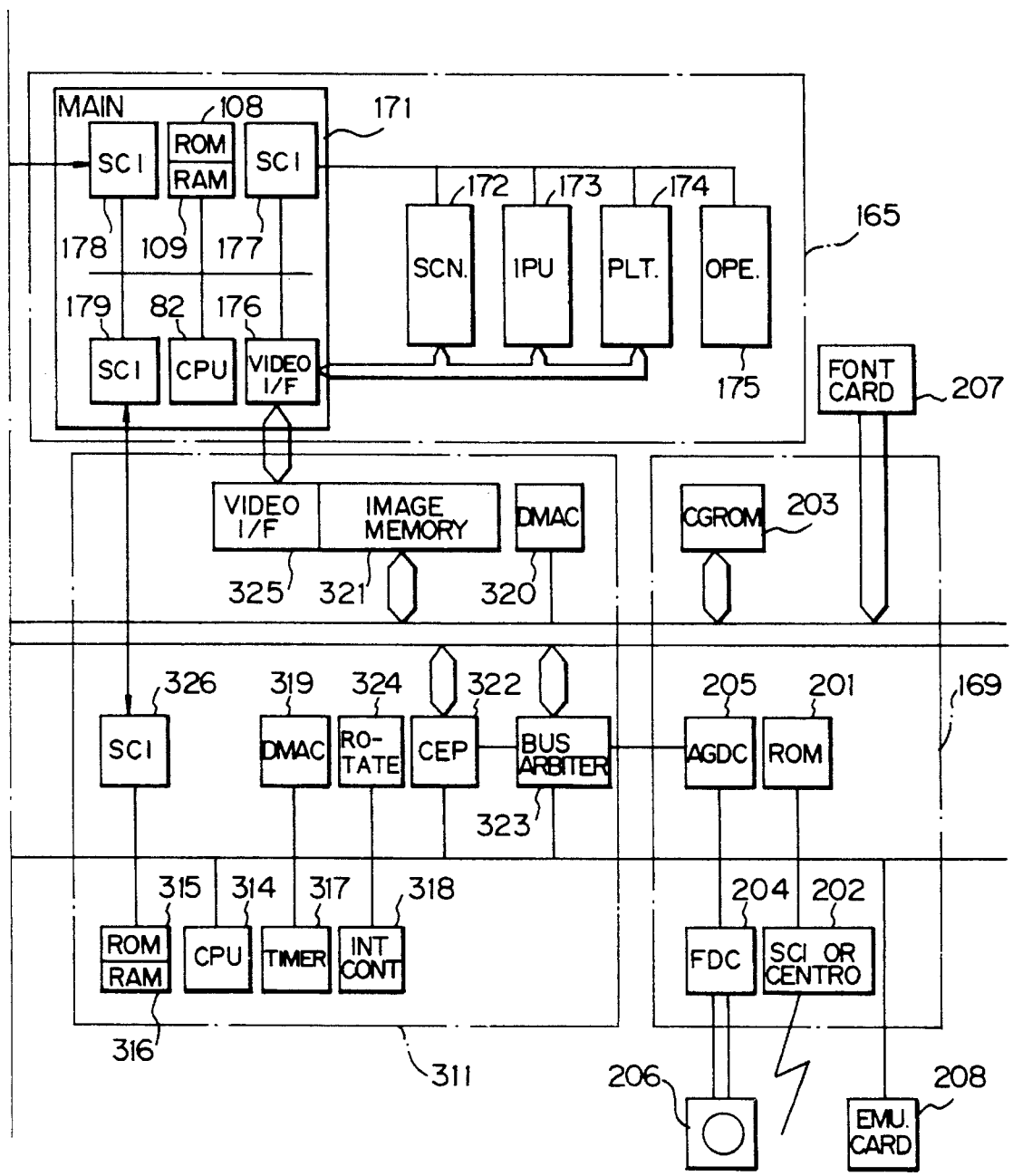

Referring to FIG. 38, another alternative embodiment of the present invention will be described. This embodiment is generally made up of the copy section 165 and an application section. The application section has an application controller section 311, a G3 facsimile section 312, a G4 facsimile section 313, and the printer section 169. The copy section 165 and printer section 169 are constructed in the same manner as those included in the first embodiment. This embodiment includes an operating section essentially similar to the operating section of the first embodiment. However, in this embodiment, the operating section does not display the file function built in the machine, but it displays the G3 and G4 facsimile sections. The operating section, therefore, allows the operator to select the facsimile functions by touching associated portions of the operating section.

The application controller section 311 has a CPU 314, a ROM 315, a RAM 316, a timer 317, an interrupt control circuit 318, DMACs 319 and 320, an image memory 321, a CEP 322, a bus arbiter 323, a rotating section 324 for rotating an image, a video interface 325, and an SCI 326. A multitask OS is stored in the ROM 315 to allow a plurality of applications to be executed at the same time. Also stored in the ROM 315 are a function of inputting image data from the SCI 179 of the main control section 171 to the image memory 321 or outputting image data from the image memory 321, and a system portion for arbitrating the various applications. The copy section 165 and the applications 169, 312, 313 and LAN 237 are connected to the application controller section 311.

The G3 facsimile section 312 has a ROM 328 storing facsimile application software to operate on the multitask OS, a CCU 330 for receiving data over a subscriber line 329, an SAF memory 331 for storing received data, a CPU 332 for controlling them, and a RAM 333. By using the facsimile application software stored in the ROM 328, the CPU 314 expands the received data stored in the SAF memory 331 by the CEP 322 and then writes them in the image memory 321. Further, the CPU 314 compresses image data sent from the scanner to the image memory 321 by the CEP 322 and then stores them in the SAF memory 331. In addition, the CPU 332 writes data received by the CCU 332 over the subscriber line 329 in the SAF memory 331 or delivers data read out of the SAF memory 331 to the subscriber line 329.

The G4 facsimile section 313 has a ROM 334 storing facsimile application software to operate on the multitask OS, a CCU 336 for receiving data received over another subscriber line 335, an SAF memory 337 for storing received data, a CPU 338 for controlling them, and a RAM 339. By using the facsimile software of the ROM 334, the CPU 314 expands received data of the SAF memory 337 by the CEP 322 and then writes them in the image memory 321 or compresses image data sent from the scanner to the image memory 321 by the CEP 322 and then writes them in the SAF memory 337. Further, the CPU 338 writes data received by the CCU 336 over the subscriber line 335 in the SAF memory 337 or sends data read out of the SAF memory 337 over the subscriber line 335.

The main CPU 82 supervises the plotter, image processing section 173 and operating section 170 and 175 via the scanner section 172 and plotter section 174. At the same time, the CPU 82 executes the copy mode by using the scanner, image processing section 173, plotter and operating section 170 and 175. Regarding the sorter/stacker included in the copy section, when files received by the facsimile sections 312 and 313 are printed, it sorts sheets coming out of the copier body 11 on a G3/G4 facsimile basis and on a file basis and distributes them to particular bins. The application controller section 311 executes the various applications and arbitrates the scanner and plotter and the applications via the image memory 195 regarding the interchange of image data.

In operation, the main CPU 82 supervises the scanner, plotter and operating section. Assume that while a copying operation is under way, the CPU 82 receives a print request from one of the applications. Then, at the next sheet feed timing of the plotter, the main CPU 82 so conditions the gate array 112 as to transfer data from the application to the plotter. If the application does not generate a print request up to the next sheet feed timing of the plotter, the main CPU 82 continuously operates the plotter in the copy mode.

While the application controller section 311 is capable of executing a plurality of applications, let the following description concentration on the facsimile sections 312 and 313. The operations of the copy section 165 and other applications are the same as in the first embodiment.

The facsimile sections 312 and 313 receive data over the subscriber lines 329 and 335, respectively, and write them in the SAF memories 331 and 337 by the CPUs 332 and 338, respectively. FIG. 39 shows a specific file format of each of the SAF memories 331 and 337. As shown, the SAF memory 331 or 337 is generally divided into a Boot area, an FAT (File Allocation Table) area, and a data area. The Boot area stores a sector size, the number of sectors and other information for supervising the SAF memory. The FAT area stores information indicating areas of the SAF memory which store files, idle sectors, and other information. The data area stores compressed data to be transmitted and received data. The data area is subdivided on a file basis. Regarding the data structure, a header representative of the attributes of the file (size, compression coding system, line density, DCS, TIS, etc) and compressed data are registered on a page basis.

In the application controller section 311, the CPU 314 decodes information stored in the FAT areas of the SAF memories 331 and 337 and thereby the header portions of the data areas, selects files to be printed, expands the files of interest by the CEP 322, writes the expanded files in the image memory 321, and then sends them to the copy section 165 via the video interface 325.

Figure 40A:
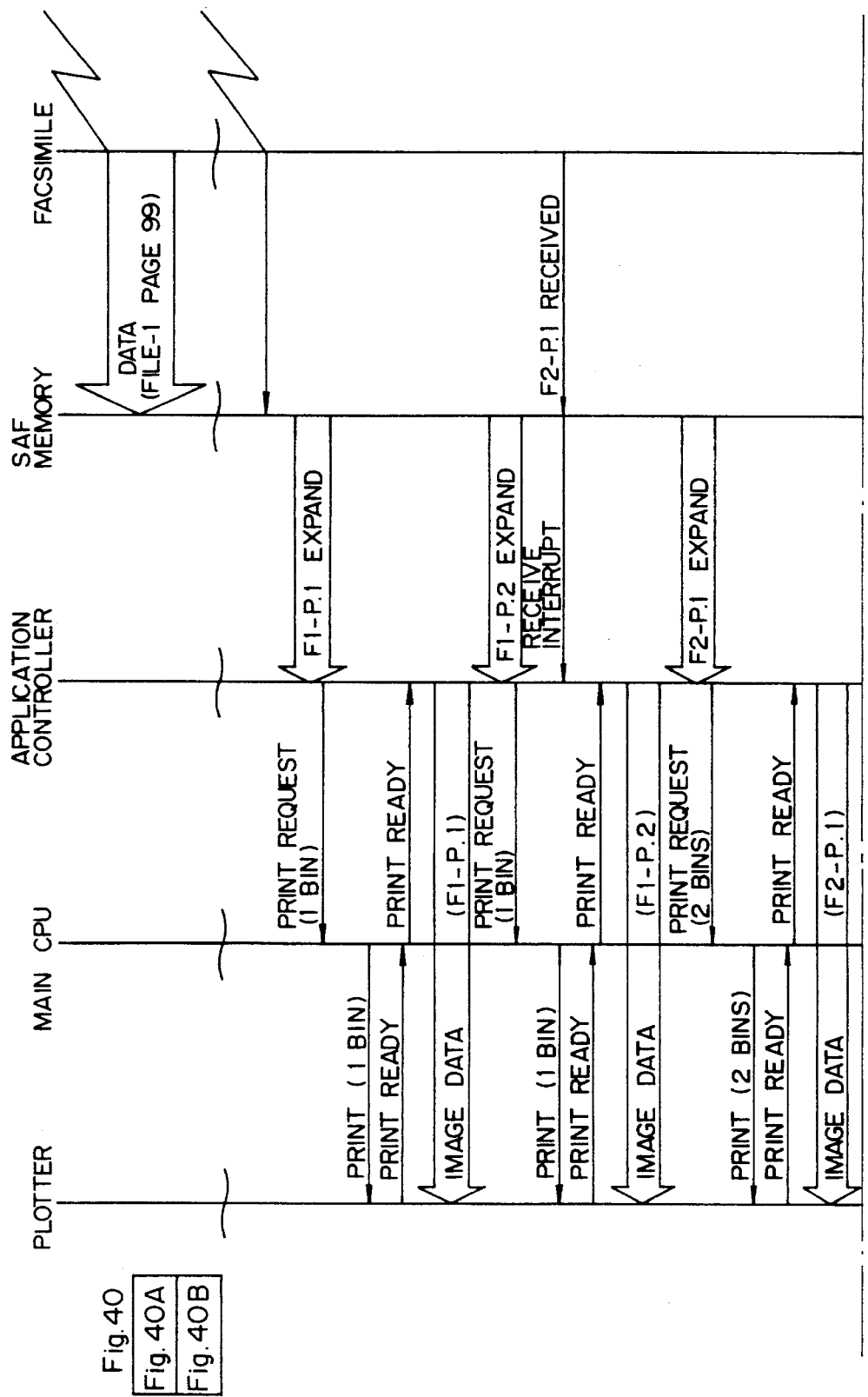
Figure 40B:
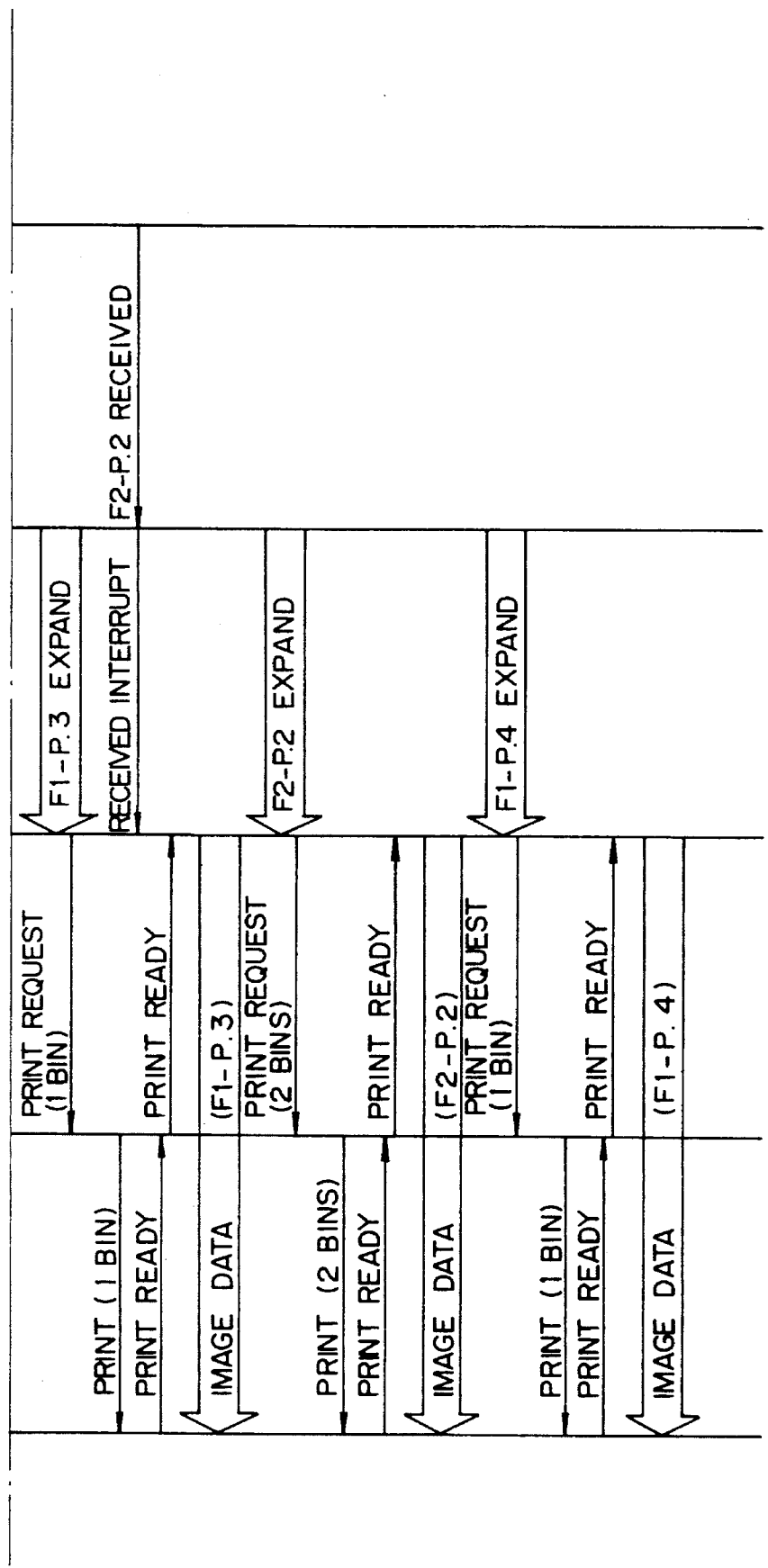

FIG. 40 shows a specific condition wherein while a received file stored in, for example, the SAF memory 331 of the facsimile section 312 is being printed, a file received by the other facsimile section 313 over the subscriber line 335 is printed at the same time. Assume that the received file of the SAF memory 331 is labeled "File-b 1" and has ninety-nine pages.

When the CPU 314 of the application controller section 311 is informed of a receive interruption by the CPU 332 of the facsimile section 312, it determines that data of a received file have been set in the SAF memory 331. Then, the CPU 314 decodes information stored in the FAT area of the SAF memory 331 and thereby the header portion of the data area, expands "P.1 (first page)" of "File-1 (F1)" by the CEP 322, writes the expanded data in the image memory 321, and then causes the plotter to print them as in the first embodiment. In the same manner, the CPU 314 causes the plotter to print "P.2 (second page)" of "File-1".

While the second page of "File-1" is being printed and before the third page of the same file is expanded, the facsimile section 313 receives data of the first page "P.1" of a file "File-2" over the subscriber line 335 with the CCU 336. Then, the CPU 338 writes such data in the SAF memory 337 and then informs the application controller section 311 of the storage of the received file data in the SAF memory 337 by a receive interruption. In response, the CPU 314 of the application controller section 311 determines whether or not the interleave function is set for the facsimile section 313. If the answer of this decision is positive, the CPU 314 expands, after transferring the image data of the second page of "File-1" to the plotter, "P.1" of "File-2" by the CEP 322, writes the expanded data in the image memory 321, and the causes the plotter to print them out. It is to be noted that when the image memory 321 has a sufficient margin, "P.1" of "File-2" may be expanded while the second page of "File-1" is being printed.

In the same manner, the received files are sequentially printed by the plotter in the interleave mode, i.e., "P.3" of "File-1", "P.2" of "File-2" and so on to produce the fourth and successive printings. After the fourth printing, the plotter continuously prints the pages of "File-1" up to "P.99".

As stated above, when one of the facsimile sections 312 and 313 receives a file over the associated subscriber line while the plotter is printing a received file stored in the SAF memory of the other facsimile section, both of the received files can be printed at the same time. Likewise, when both of the facsimile sections 312 and 313 receive files over the associated subscriber lines 329 and 335 at the same time, the CPUs 332 and 338 write them in the SAF memories 331 and 337 and allow them to be immediately printed at the same time. Further, a plurality of vicarious received files stored in the SAF memories 331 and 337 (i.e. files received by the CCUs 330 and 336 over the subscribe lines 329 and 335 and stored in the SAF memories 331 and 337 by the CPUs 332 and 338) can be printed at the same time.

Assume a conventional facsimile apparatus deals with the received files "File-1" and "File-2" stated above. Then, the apparatus has to print ninty-nine consecutive pages of "File-1" without interruption and then print "File-2". In practice, "File-2" is printed in several ten minutes after the reception thereof, putting the user to trouble. By contrast, the embodiment prints the first page of "File-2" immediately after the reception and sequentially prints the second and successive pages of "File-2" also, offering the printings of a received file timely to the user. Since a particular bin is assigned to each of the received files at the time of printing of the files, the sorter/stacker is capable of sorting the resulting printings on a file basis to free the user from confusion.

Figure 41B:
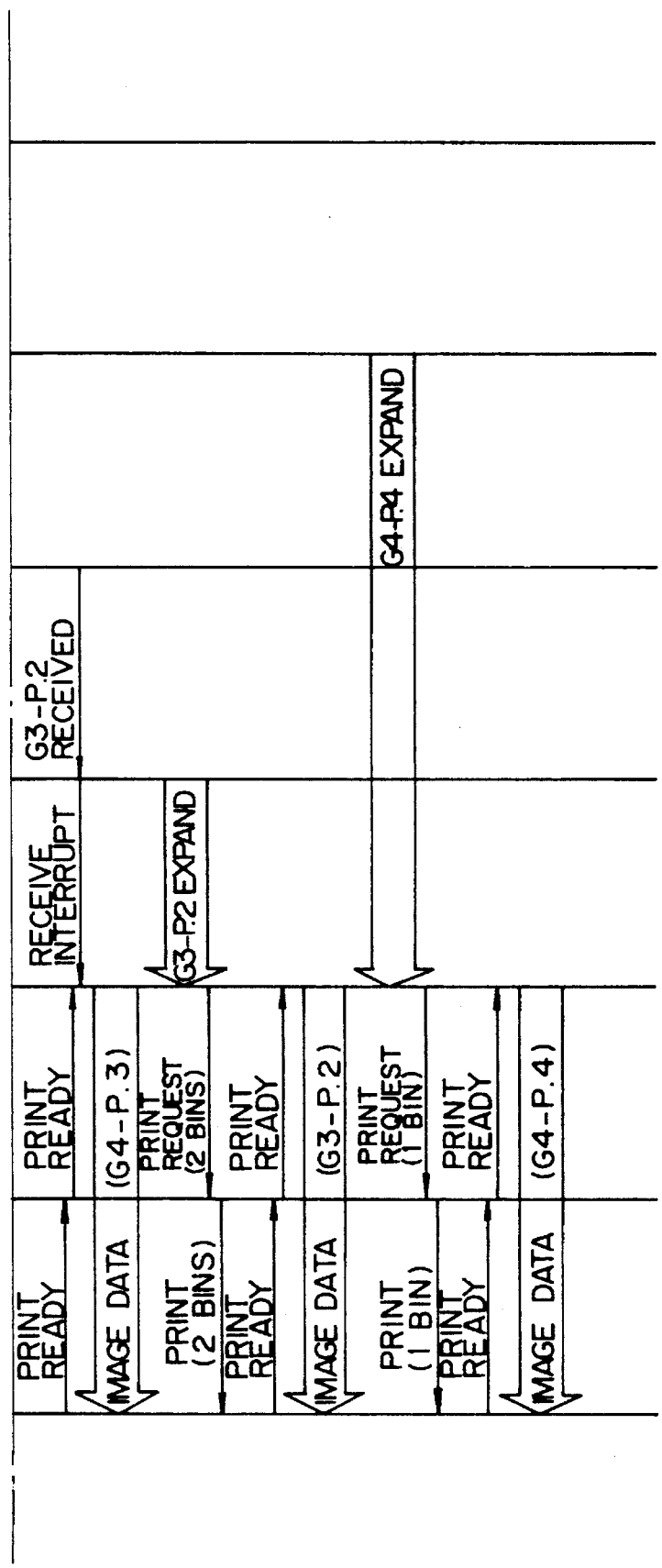

FIG. 41 shows a specific procedure wherein files received by the facsimile sections 312 and 313 over the associated subscriber lines 329 and 335 are printed at the same time. Assume that a file received over the subscriber line 335 and a file received over the subscriber line 329 have four pages and two pages, respectively.

First, the G3 facsimile section 312 starts receiving a file, and then the G4 facsimile section 313 start receiving a file. However, since the G4 line 335 is higher in rate than the G3 line 329, the G4 facsimile section 312 receives the data of the first page (G4-P.1) of the file by the CCU 336 first. Then, the CPU 338 writes the data of "G4-P.1" in the SAF memory 337 and then informs the application controller section 311 of the storage by a receive interruption. In response, the CPU 314 of the application controller section 311 determines that the data of the received file have been stored in the SAF memory 337, decodes the information of the FAT area of the memory 337 and thereby the header of the data area, expands the page "G4-P.1" by the CEP 322, writes the expanded data in the image memory 321, and then causes the plotter to print them out.

Before, the plotter fully prints the first page, the G4 facsimile section 313 generates a receive interruption associated with a file "G4-P.2" while the G3 facsimile section 312 generates a receive interruption associated with a file "G3-P.1". On detecting the interruptions, the CPU 314 of the application controller section 311 determines whether or not the interleave function is set for the facsimile sections 312 and 313. If the answer of this decision is positive, the CPU 314 expands, after transferring the image data of the file G4-P.1 to the copy section, the received file "G3-P.1" of the SAF memory 331 by the CEP 322, writes the expanded data in the image memory 321, and then causes the plotter to print them out. Again, if the image memory 321 has a sufficient margin, the CPU 314 may expand the next file by the CEP 322 and write it in the image memory 321 even when the plotter is printing a received file.

In the same manner, the plotter prints files "G4-P.2", "G4-P.3", "G3-P.2" and "G4-P.4" as the third to sixth printings in the interleave mode.

FIG. 42 shows an interleave setting procedure particular to the illustrative embodiment. The interleave function is set by the user or the serviceman on the operating section. As the user or the serviceman manipulates the operating section to enter an SP (Serviceman Program) mode or similar predetermined mode, the main CPU 82 simply returns if a facsimile function is not available as indicated by an input signal from the operating section. At this instant, the main CPU 82 displays a message e.g., "FAXIMILE FUNCTION UNAVILABLE" on the guidance display portion 143 of the operating section for a predetermined period of time and then ends the mode.

If a facsimile function is available, the main CPU 82 displays a message, e.g., "SET INTERLEAVE? 0:NO 1:YES_" on the guidance display portion. When "0" is selected as indicated by a signal sent from the operating section, the main CPU 82 ends the mode. When "1" is selected, the main CPU 82 displays on the guidance display portion a message, e.g., "XX APPLICATIONS MAX AVAILABLE. SET APPLICATIONS TO INTERLEAVE. 1:SPECIFY COMMUNICATION CODE 2:SPECIFY LINE 3:UNCONDITIONAL _". Here, the maximum number XX is the number of bins available with sorter/stacker 13. Assume that the sorter/stacker 13 is absent, and that the copier body 11 is provided with a single tray. Then, in response to a signal distinguishing the sorter/stacker 13 and the tray, the main CPU 82 displays a message, e.g., "IMPOSSIBLE TO INTERLEAVE BECAUSE SORTER/STACKER IS ABSENT" on the guidance display portion 143 and then ends the mode.

The main CPU 82 sequentially sets the communication codes from the operating section. As soon as the maximum number of bins available with the sorter/stacker is reached or the interleave setting is completed, the main CPU 82 displays a message, e.g., "SET INTERLEAVE PRIORITY ORDER. _, _, _" on the guidance display portion 143. Then, the operator gives a desired priority order to the communication codes. It is to be noted that the illustrative embodiment may include extra facsimile sections in addition to the sections 312 and 313 and cause them to operate in the above-described manner.

Subsequently, the main CPU 82 shows a message, e.g., "SET INTERLEAVE RATIO. A:B:C:D=_:_:_:_" in the guidance display portion. As the operator sets a desired printing ratio for the facsimile sections, the main CPU 82 memorizes the entered ratio in response to the resulting signals from the operating section. This ratio will also be used when a plurality of facsimile sections generate a receive interruption at the same time.

For example, assume that facsimile sections having communication codes 5701, 4277, 8111 and 7295 are available, and that the operator has given priority to 5701, 4277, 8111 and 7295 in this order and selects a ratio of 5701:4277:8111:7295=3:1:2:1. Then, the main CPU 82 causes three pages of a received file of the facsimile section 5707, to be printed, then one page of a received file of the facsimile section 4277 to be printed, then two pages of a received file of the facsimile section 8111 to be printed, then three pages of a received file of the facsimile section 7295 to be printed, and again three pages of the received file of the facsimile section 5707 to be printed. Of course, the printing ratio may be divided so long as the ratio is identical with the set ratio. For example, one page of the received file of the facsimile section 5707, one page of the received file of the facsimile section 4277, one page of the received file of the facsimile section 5707, one page of the received file of the facsimile section 8111, one page of the received file of the facsimile section 7295, one page of the received file of the facsimile section 5707, and one page of the received file of the facsimile section 8111 may be sequentially printed in this order.

Assume that the operator selects "2:SPECIFY LINE" on the operating section. Then, the main CPU 82 shows a message, e.g., "INPUT LINES 1:G3 2:G4-1 3:G4-2_" on the guidance display portion 143. Here, the kinds of lines are the information which the application controller section 311 obtains from the various facsimile sections at the time of initialization. In response to input signals from the operating section, the main CPU 82 sequentially sets the kinds of lines of the facsimile sections. As soon as the maximum number of bins available with the sorter/stacker is reached or the interleave setting is completed, the main CPU 82 displays a message, e.g., "SET INTERLEAVE PRIORITY ORDER. 1:G3 2:G4-1 3:G4-2_" on the guidance display portion 143. Then, the operator gives a desired priority order to the lines of the facsimile sections.

Subsequently, the main CPU 82 shows a message, e.g., "SET INTERLEAVE RATIO. A:B:C=_:_:_" in the guidance display portion. As the operator sets a desired printing ratio for the facsimile sections, the main CPU 82 memorizes the entered ratio in response to the resulting signals from the operating section. At such a printing ratio, the facsimile sections will be accepted when they generate a receive interruption at the same time.

Further, when the operator selects "3:UNCONDITIONAL", a mode for executing interleaving at the same time by the number of bins of the sorter/stacker is set up with no regard to the communication codes, lines, etc. In this case, the main CPU 82 does not set anything.

Figure 43:
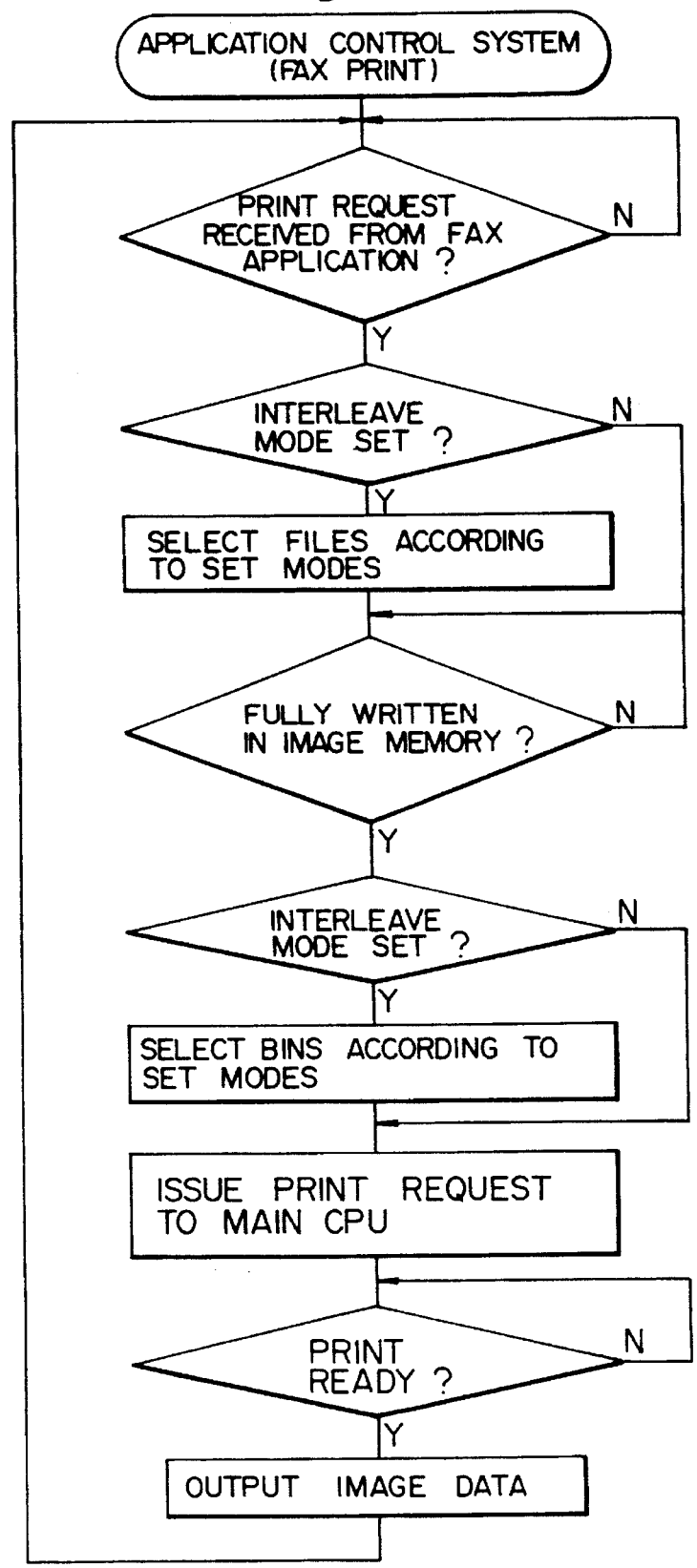

FIG. 43 shows faxsimile print processing particular to the application controller section 311. As shown, the CPU 314 of the application controller section 311 receives print request signals from the facsimile sections 312 and 313 no the basis of the facsimile application software stored in the ROMS 328 and 334 of the facsimile sections 312 and 313. In response, the CPU 314 determines whether or not the interleave mode (FIG. 42) is set for the facsimile sections 312 and 313. If the answer of this decision is positive, the CPU 314 selects received files to print according to the interleave mode, expands them by the CEP 322, and writes the expanded files in the image memory 321. Subsequently, if the interleave mode is set, the CPU 314 selects particular ones of the bins of the sorter/stacker according to the interleave mode and then sends a print request signal to the main CPU 82 via the SCIs 326 and 179. On receiving a print ready signal from the copy section 165 via the SCI 326, the CPU 314 delivers image data from the image memory 321 via the video interface 325.

In the specific flow shown in FIG. 40, at the time when the facsimile section 312 has received the file File-1, the plotter cannot be used and, therefore, the SAF memory 331 stores the file File-1; when all the pages (ninety-nine pages) of the file File-1 have been received, the plotter becomes usable. At the time when all the pages of the file File-1 have been received, no other files have been received. Hence, the CPU 314 expands P.1 of File-1 by the CEP 322 and then writes it in the image memory 321. Subsequently, the CPU 314 designates the first bin of the sorter/stacker and sends a print request signal to the main CPU 82 via the SCIs 326 and 179.

As the copy section 165 returns a print ready signal to the CPU 314 via the SCI 326, the CPU 314 delivers the image data from the image memory 321 to the plotter via the video interface 325. This is also true with P.2 of File-1. Before P.3 of File-1 is printed, the CPU 314 receives a receive interruption in the form of a print request signal from the facsimile section 313 meant for the next file File-2. After determining that the interleave mode (FIG. 42) is set for the facsimile section 313, the CPU 314 selects the file File-2 to print according to the interleave mode, expands it by the CEP 322, and writes the expanded file in the image memory 321. Subsequently, the CPU 314 designates the second bin of the sorter/stacker according to the interleave mode and sends a print request signal to the main CPU 82 via the SCIs 326 and 179. On receiving a print ready signal from the copy section 165 via the SCI 326, the CPU 314 delivers the image data from the image memory 321 via the video interface 325. Thereafter, the files File-1 and File-2 are printed in the same manner. Also, in the flow shown in FIG. 41, a plurality of received files are printed in the above-described manner.

As stated above, when a plurality of files are received over a plurality of subscriber lines, the embodiment prints all of the files at the same time. Therefore, the maximum performance (printing speed) originally available with the plotter is exhibited. Moreover, since the first page of a file is immediately printed after the reception of the file and then the second and successive pages are sequentially printed, printings of received files can be offered timely to the user. Since a particular bin of the sorter/stacker is assigned to each line or to each file at the time of printing, the printings derived from different files are prevented from being mixed together, thereby freeing the operator from confusion. In addition, the user can select desired modes to interleave and the priority and printing ratio thereof. This is also desirable for the reasons described in relation to the foregoing embodiments.

While the embodiments shown and described cause a plurality of functions to share a single image memory, an exclusive image memory may be assigned to each function for enhancing the performance of the function.

In summary, it will be seen that the present invention provides an image forming apparatus having various unprecedented advantages, as enumerated below.

(1) A plurality of different functions can be executed at the same time and, therefore, efficiently used, offering data timely to the user. Moreover, the operator does not have to take account of functions other than one which he is using. This allows the operator to use the apparatus at all times.

(2) Any urgent function which the operator desires can be executed immediately.

(3) Printings associated with different functions are prevented from being mixed together. Otherwise, the operator would separate printings resulted from the intended function from printings associated with the other functions.

(4) The user is freed from wasteful printings.

(5) The user can obtain the most necessary printings first.

(6) When printings associated with a plurality of functions are to be produced at the same time, the user can obtain desired printings first.

(7) The display and modes on an operating section do not change printing by printing, preventing the operator from being confused.

(8) When files received by a plurality of facsimile sections are to be printed at the same time, the user can give a higher printing ratio to the most necessary facsimile section than the others. The user, therefore, can obtain printings of files received by the desired facsimile section first.

Various modifications will become possible for those skilled in the art after receiving the teachings of the present disclosure without departing from the scope thereof.

What is claimed is:

1. An image forming apparatus capable of executing a plurality of functions comprising:

recording means for recording an image on sheets;

input means for inputting recording data of the image recorded by the recording means from at least a first source and a second source;

control means for controlling the recording means to interleave the recording data from the at least first source and second source at a set ratio so that the recording data from the at least first source and second source are recorded in an alternative interleaved manner.

2. An apparatus as claimed in claim 1, further comprising sorting/stacking means for sorting or stacking the sheets from said recording means, said control means limiting a number of sources from which said recording means performs interleaving recording to a number equal to or less than a number of bins available in said sorting/stacking means.

3. An apparatus as claimed in claim 1, further comprising source selecting means for selecting the sources in the alternate interleaved manner.

4. An apparatus as claimed in claim 1, further comprising priority order selecting means for giving a particular priority order to the sources to be recorded in the alternate interleaved manner.

5. An apparatus as claimed in claim 1, further comprising ratio selecting means for setting the set recording ratio of the sources in the alternate interleaved manner.

6. An apparatus as claimed in claim 1, wherein when a recording operation from a source other than a source being used by an operator is performed, an operating section does not change a display and modes associated with said source being used by said operator.

7. An apparatus as claimed in claim 1, wherein the recording means is a printer.

8. An apparatus as claimed in claim 1, further comprising reading means for reading a document, said reading means operating at a same time as the recording means.

9. An apparatus as claimed in claim 1, wherein the first source is an image document and the second source is a facsimile communication.

10. An apparatus as claimed in claim 1, wherein the at least first source and second source are facsimile communications from which data is received via communication ports.

\* \* \* \* \*